(12) United States Patent
Hardman et al.

(10) Patent No.: US 11,760,884 B2
(45) Date of Patent: Sep. 19, 2023

(54) CARBON PARTICLES HAVING HIGH PURITIES AND METHODS FOR MAKING SAME

(71) Applicant: Monolith Materials, Inc., Lincoln, NE (US)

(72) Inventors: Ned J. Hardman, Lincoln, NE (US); John W. Reese, Lexington, MA (US)

(73) Assignee: Monolith Materials, Inc., Lincoln, NE (US)

( * ) Notice: Subject to any disclaimer, the term of this patent is extended or adjusted under 35 U.S.C. 154(b) by 85 days.

(21) Appl. No.: 16/657,386

(22) Filed: Oct. 18, 2019

(65) Prior Publication Data

US 2020/0291237 A1   Sep. 17, 2020

Related U.S. Application Data

(63) Continuation of application No. PCT/US2018/028619, filed on Apr. 20, 2018.

(60) Provisional application No. 62/551,072, filed on Aug. 28, 2017, provisional application No. 62/551,059, filed on Aug. 28, 2017, provisional application No. 62/487,795, filed on Apr. 20, 2017.

(51) Int. Cl.
*C09C 1/50* (2006.01)
*C01B 32/05* (2017.01)

(52) U.S. Cl.
CPC ............... *C09C 1/50* (2013.01); *C01B 32/05* (2017.08); *C01P 2002/78* (2013.01); *C01P 2006/12* (2013.01); *C01P 2006/19* (2013.01); *C01P 2006/80* (2013.01)

(58) Field of Classification Search
CPC ....... C09C 1/485; C09C 1/56; C01P 2006/12; C01P 2006/19; C01P 2006/80; C01B 32/05; C01B 32/378; C01B 32/384
See application file for complete search history.

(56) References Cited

U.S. PATENT DOCUMENTS

| | | |
|---|---|---|
| 709,868 A | 9/1902 | Bradley et al. |
| 1,339,225 A | 5/1920 | Rose |
| 1,536,612 A | 5/1925 | Lewis |
| 1,597,277 A | 8/1926 | Jakowsky |
| 1,931,800 A | 10/1933 | Jakosky et al. |
| 2,002,003 A | 5/1935 | Otto et al. |
| 2,039,312 A | 5/1936 | Goldman |
| 2,062,358 A | 12/1936 | Frolich |
| 2,393,106 A | 1/1946 | Bernard et al. |
| 2,557,143 A | 6/1951 | Royster |
| 2,572,851 A | 10/1951 | Daniel et al. |

(Continued)

FOREIGN PATENT DOCUMENTS

| | | |
|---|---|---|
| AU | 2897071 A | 11/1972 |
| CA | 830378 A | 12/1969 |

(Continued)

OTHER PUBLICATIONS

Translation copy of JP 2002-121422 (Year: 2002).*

(Continued)

*Primary Examiner* — Hoa (Holly) Le
(74) *Attorney, Agent, or Firm* — Wilson Sonsini Goodrich & Rosati

(57) ABSTRACT

Particles with suitable properties may be generated using systems and methods provided herein. The particles may include carbon particles.

22 Claims, 6 Drawing Sheets

(56) References Cited

U.S. PATENT DOCUMENTS

| | | |
|---|---|---|
| 2,603,669 A | 7/1952 | Chappell |
| 2,616,842 A | 11/1952 | Charles et al. |
| 2,785,964 A | 3/1957 | Pollock |
| 2,850,403 A | 9/1958 | Day |
| 2,851,403 A | 9/1958 | Hale |
| 2,897,071 A | 7/1959 | Gilbert |
| 2,951,143 A | 8/1960 | Anderson et al. |
| 3,009,783 A | 11/1961 | Charles et al. |
| 3,073,769 A | 1/1963 | George et al. |
| 3,127,536 A | 3/1964 | McLane |
| 3,253,890 A | 5/1966 | De et al. |
| 3,288,696 A | 11/1966 | Orbach |
| 3,307,923 A | 3/1967 | Ruble |
| 3,308,164 A | 3/1967 | Shepard |
| 3,309,780 A | 3/1967 | Goins |
| 3,331,664 A | 7/1967 | Jordan |
| 3,342,554 A | 9/1967 | Jordan et al. |
| 3,344,051 A | 9/1967 | Latham, Jr. et al. |
| 3,408,164 A | 10/1968 | Johnson |
| 3,409,403 A | 11/1968 | Geir et al. |
| 3,420,632 A | 1/1969 | Ryan et al. |
| 3,431,074 A | 3/1969 | Jordan et al. |
| 3,453,488 A | 7/1969 | Cann et al. |
| 3,464,793 A | 9/1969 | Jordan et al. |
| 3,619,138 A | 11/1971 | Gunnell |
| 3,619,140 A | 11/1971 | Morgan et al. |
| 3,637,974 A | 1/1972 | Tajbl et al. |
| 3,673,375 A | 6/1972 | Camacho et al. |
| 3,725,103 A | 4/1973 | Jordan et al. |
| 3,852,399 A | 12/1974 | Rothbuhr et al. |
| 3,922,335 A | 11/1975 | Jordan et al. |
| 3,981,654 A | 9/1976 | Rood et al. |
| 3,981,659 A | 9/1976 | Myers |
| 3,984,743 A | 10/1976 | Horie |
| 3,998,934 A | 12/1976 | Vanderveen |
| 4,028,072 A | 6/1977 | Braun et al. |
| 4,035,336 A | 7/1977 | Jordan et al. |
| 4,057,396 A | 11/1977 | Matovich |
| 4,075,160 A | 2/1978 | Mills et al. |
| 4,088,741 A | 5/1978 | Takewell |
| 4,101,639 A | 7/1978 | Surovikin et al. |
| 4,138,471 A | 2/1979 | Lamond et al. |
| 4,199,545 A | 4/1980 | Matovich |
| 4,282,199 A | 8/1981 | Lamond et al. |
| 4,289,949 A | 9/1981 | Raaness et al. |
| 4,292,291 A | 9/1981 | Rothbuhr et al. |
| 4,317,001 A | 2/1982 | Silver et al. |
| 4,372,937 A | 2/1983 | Johnson |
| 4,404,178 A | 9/1983 | Johnson et al. |
| 4,431,624 A | 2/1984 | Casperson |
| 4,452,771 A | 6/1984 | Hunt |
| 4,460,558 A | 7/1984 | Johnson |
| 4,472,172 A | 9/1984 | Sheer et al. |
| 4,543,470 A | 9/1985 | Santen et al. |
| 4,553,981 A | 11/1985 | Fuderer |
| 4,577,461 A | 3/1986 | Cann |
| 4,597,776 A | 7/1986 | Ullman et al. |
| 4,601,887 A | 7/1986 | Dorn et al. |
| 4,678,888 A | 7/1987 | Camacho et al. |
| 4,689,199 A | 8/1987 | Eckert et al. |
| 4,755,371 A | 7/1988 | Dickerson |
| 4,765,964 A | 8/1988 | Gravley et al. |
| 4,766,287 A | 8/1988 | Morrisroe et al. |
| 4,787,320 A | 11/1988 | Raaness et al. |
| 4,864,096 A | 9/1989 | Wolf et al. |
| 4,977,305 A | 12/1990 | Severance, Jr. |
| 5,039,312 A | 8/1991 | Hollis, Jr. et al. |
| 5,045,667 A | 9/1991 | Iceland et al. |
| 5,046,145 A | 9/1991 | Drouet |
| 5,105,123 A | 4/1992 | Ballou |
| 5,138,959 A | 8/1992 | Kulkarni |
| 5,147,998 A | 9/1992 | Tsantrizos et al. |
| 5,206,880 A | 4/1993 | Olsson |
| 5,222,448 A | 6/1993 | Morgenthaler et al. |
| 5,352,289 A | 10/1994 | Weaver et al. |
| 5,399,957 A | 3/1995 | Vierboom |
| 5,427,762 A | 6/1995 | Steinberg et al. |
| 5,476,826 A | 12/1995 | Greenwald et al. |
| 5,481,080 A | 1/1996 | Lynum et al. |
| 5,486,674 A | 1/1996 | Lynum et al. |
| 5,500,501 A | 3/1996 | Lynum et al. |
| 5,527,518 A | 6/1996 | Lynum et al. |
| 5,578,647 A | 11/1996 | Li et al. |
| 5,593,644 A | 1/1997 | Norman et al. |
| 5,602,298 A | 2/1997 | Levin |
| 5,604,424 A | 2/1997 | Shuttleworth |
| 5,611,947 A | 3/1997 | Vavruska |
| 5,673,285 A | 9/1997 | Wittle et al. |
| 5,717,293 A | 2/1998 | Sellers |
| 5,725,616 A | 3/1998 | Lynum et al. |
| 5,749,937 A | 5/1998 | Detering et al. |
| 5,935,293 A | 8/1999 | Detering et al. |
| 5,951,960 A | 9/1999 | Lynum et al. |
| 5,989,512 A | 11/1999 | Lynum et al. |
| 5,997,837 A | 12/1999 | Lynum et al. |
| 6,058,133 A | 5/2000 | Bowman et al. |
| 6,068,827 A | 5/2000 | Lynum et al. |
| 6,099,696 A | 8/2000 | Schwob et al. |
| 6,188,187 B1 | 2/2001 | Harlan |
| 6,197,274 B1 | 3/2001 | Mahmud et al. |
| 6,277,350 B1 | 8/2001 | Gerspacher |
| 6,358,375 B1 | 3/2002 | Schwob |
| 6,380,507 B1 | 4/2002 | Childs |
| 6,395,197 B1 | 5/2002 | Detering et al. |
| 6,403,697 B1 | 6/2002 | Mitsunaga et al. |
| 6,441,084 B1 | 8/2002 | Lee et al. |
| 6,442,950 B1 | 9/2002 | Tung |
| 6,444,727 B1 | 9/2002 | Yamada et al. |
| 6,471,937 B1 | 10/2002 | Anderson et al. |
| 6,602,920 B2 | 8/2003 | Hall et al. |
| 6,703,580 B2 | 3/2004 | Brunet et al. |
| 6,773,689 B1 | 8/2004 | Lynum et al. |
| 6,955,707 B2 | 10/2005 | Ezell et al. |
| 7,167,240 B2 | 1/2007 | Stagg |
| 7,294,314 B2 | 11/2007 | Graham |
| 7,312,415 B2 | 12/2007 | Ohmi et al. |
| 7,360,309 B2 | 4/2008 | Vaidyanathan et al. |
| 7,431,909 B1 | 10/2008 | Rumpf et al. |
| 7,452,514 B2 | 11/2008 | Fabry et al. |
| 7,462,343 B2 | 12/2008 | Lynum et al. |
| 7,563,525 B2 | 7/2009 | Ennis |
| 7,582,184 B2 | 9/2009 | Tomita et al. |
| 7,623,340 B1 | 11/2009 | Song et al. |
| 7,635,824 B2 | 12/2009 | Miki et al. |
| 7,655,209 B2 | 2/2010 | Rumpf et al. |
| 7,777,151 B2 | 8/2010 | Kuo |
| 7,847,009 B2 | 12/2010 | Wong et al. |
| 7,968,191 B2 | 6/2011 | Hampden-Smith et al. |
| 8,147,765 B2 | 4/2012 | Muradov et al. |
| 8,221,689 B2 | 7/2012 | Boutot et al. |
| 8,257,452 B2 | 9/2012 | Menzel |
| 8,277,739 B2 | 10/2012 | Monsen et al. |
| 8,323,793 B2 | 12/2012 | Hamby et al. |
| 8,443,741 B2 | 5/2013 | Chapman et al. |
| 8,471,170 B2 | 6/2013 | Li et al. |
| 8,486,364 B2 | 7/2013 | Vanier et al. |
| 8,501,148 B2 | 8/2013 | Belmont et al. |
| 8,581,147 B2 | 11/2013 | Kooken et al. |
| 8,710,136 B2 | 4/2014 | Yurovskaya et al. |
| 8,771,386 B2 | 7/2014 | Licht et al. |
| 8,784,617 B2 | 7/2014 | Novoselov et al. |
| 8,850,826 B2 | 10/2014 | Ennis |
| 8,871,173 B2 | 10/2014 | Nester et al. |
| 8,911,596 B2 | 12/2014 | Vancina |
| 9,095,835 B2 | 8/2015 | Skoptsov et al. |
| 9,229,396 B1 | 1/2016 | Wu et al. |
| 9,315,735 B2 | 4/2016 | Cole et al. |
| 9,388,300 B2 | 7/2016 | Dikan et al. |
| 9,445,488 B2 | 9/2016 | Foret |
| 9,574,086 B2 | 2/2017 | Johnson et al. |
| 9,679,750 B2 | 6/2017 | Choi et al. |
| 10,100,200 B2 | 10/2018 | Johnson et al. |
| 10,138,378 B2 | 11/2018 | Hoermman et al. |
| 10,370,539 B2 | 8/2019 | Johnson et al. |

(56) References Cited

U.S. PATENT DOCUMENTS

| | | |
|---|---|---|
| 10,618,026 B2 | 4/2020 | Taylor et al. |
| 10,808,097 B2 * | 10/2020 | Hardman .............. C08J 5/005 |
| 2001/0029888 A1 | 10/2001 | Sundarrajan et al. |
| 2001/0039797 A1 | 11/2001 | Cheng |
| 2002/0000085 A1 | 1/2002 | Hall et al. |
| 2002/0021430 A1 | 2/2002 | Koshelev et al. |
| 2002/0050323 A1 | 5/2002 | Moisan et al. |
| 2002/0051903 A1 | 5/2002 | Masuko et al. |
| 2002/0141476 A1 | 10/2002 | Varela |
| 2002/0157559 A1 | 10/2002 | Brunet et al. |
| 2003/0103858 A1 | 6/2003 | Baran et al. |
| 2003/0152184 A1 | 8/2003 | Shehane et al. |
| 2004/0047779 A1 | 3/2004 | Denison |
| 2004/0071626 A1 | 4/2004 | Smith et al. |
| 2004/0081609 A1 | 4/2004 | Green et al. |
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0213728 A1 | 10/2004 | Kopietz et al. |
| 2004/0216559 A1 | 11/2004 | Kim et al. |
| 2004/0247509 A1 | 12/2004 | Newby |
| 2005/0063892 A1 | 3/2005 | Tandon et al. |
| 2005/0063893 A1 * | 3/2005 | Ayala .............. C09C 1/50 423/449.1 |
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0228290 A1 | 10/2006 | Green |
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0233402 A1 | 9/2008 | Carlson et al. |
| 2008/0279749 A1 | 11/2008 | Probst et al. |
| 2008/0292533 A1 | 11/2008 | Belmont et al. |
| 2009/0014423 A1 | 1/2009 | Li et al. |
| 2009/0035469 A1 | 2/2009 | Sue et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0147188 A1 | 6/2010 | Mamak et al. |
| 2010/0249353 A1 | 9/2010 | Macintosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0120137 A1 | 5/2011 | Ennis |
| 2011/0138766 A1 | 6/2011 | Elkady et al. |
| 2011/0150756 A1 | 6/2011 | Adams et al. |
| 2011/0155703 A1 | 6/2011 | Winn |
| 2011/0180513 A1 | 7/2011 | Luhrs et al. |
| 2011/0214425 A1 | 9/2011 | Lang et al. |
| 2011/0236816 A1 | 9/2011 | Stanyschofsky et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0177531 A1 | 7/2012 | Chuang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0105739 A1 | 5/2013 | Bingue et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0166496 A1 | 6/2014 | Lin et al. |
| 2014/0190179 A1 | 7/2014 | Baker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0345828 A1 | 11/2014 | Ehmann et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044105 A1 | 2/2015 | Novoselov |
| 2015/0044516 A1 * | 2/2015 | Kyrlidis .............. H01G 11/32 429/7 |
| 2015/0056127 A1 * | 2/2015 | Chavan .............. C09C 1/56 423/449.2 |
| 2015/0056516 A1 | 2/2015 | Hellring et al. |
| 2015/0064099 A1 | 3/2015 | Nester et al. |
| 2015/0087764 A1 | 3/2015 | Sanchez Garcia et al. |
| 2015/0180346 A1 | 6/2015 | Yuzurihara et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2015/0307351 A1 | 10/2015 | Mabrouk et al. |
| 2016/0030856 A1 | 2/2016 | Kaplan et al. |
| 2016/0152469 A1 | 6/2016 | Chakravarti et al. |
| 2016/0243518 A1 | 8/2016 | Spitzl |
| 2016/0293959 A1 | 10/2016 | Blizanac et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0349758 A1 | 12/2017 | Johnson et al. |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2018/0340074 A1 | 11/2018 | Wittmann et al. |
| 2018/0366734 A1 | 12/2018 | Korchev et al. |
| 2019/0048200 A1 | 2/2019 | Johnson et al. |
| 2019/0100658 A1 | 4/2019 | Taylor et al. |
| 2019/0153234 A1 | 5/2019 | Hoermann et al. |
| 2019/0338139 A1 | 11/2019 | Hoermann et al. |
| 2020/0140691 A1 | 5/2020 | Johnson et al. |
| 2020/0239697 A1 | 7/2020 | Wittmann et al. |
| 2021/0120658 A1 | 4/2021 | Moss et al. |
| 2021/0261417 A1 | 8/2021 | Cardinal et al. |
| 2022/0272826 A1 | 8/2022 | Hoermann et al. |

FOREIGN PATENT DOCUMENTS

| | | |
|---|---|---|
| CA | 964405 A | 3/1975 |
| CA | 2353752 A1 | 1/2003 |
| CA | 2621749 A1 | 8/2009 |
| CN | 86104761 A | 2/1987 |
| CN | 85109166 A | 4/1987 |
| CN | 1059541 A | 3/1992 |
| CN | 1076206 A | 9/1993 |
| CN | 1077329 A | 10/1993 |

(56) References Cited

FOREIGN PATENT DOCUMENTS

| | | |
|---|---|---|
| CN | 1078727 A | 11/1993 |
| CN | 1082571 A | 2/1994 |
| CN | 1086527 A | 5/1994 |
| CN | 1196032 A | 10/1998 |
| CN | 1398780 A | 2/2003 |
| CN | 1458966 A | 11/2003 |
| CN | 1491740 A | 4/2004 |
| CN | 1644650 A | 7/2005 |
| CN | 101092691 A | 12/2007 |
| CN | 101193817 A | 6/2008 |
| CN | 101198442 A | 6/2008 |
| CN | 201087175 Y | 7/2008 |
| CN | 101368010 A | 2/2009 |
| CN | 101657283 A | 2/2010 |
| CN | 101734620 A | 6/2010 |
| CN | 102007186 A | 4/2011 |
| CN | 102060281 A | 5/2011 |
| CN | 102108216 A | 6/2011 |
| CN | 102186767 A | 9/2011 |
| CN | 102350506 A | 2/2012 |
| CN | 102612549 A | 7/2012 |
| CN | 102666686 A | 9/2012 |
| CN | 202610344 U | 12/2012 |
| CN | 102869730 A | 1/2013 |
| CN | 102993788 A | 3/2013 |
| CN | 103108831 A | 5/2013 |
| CN | 103160149 A | 6/2013 |
| CN | 103391678 A | 11/2013 |
| CN | 203269847 U | 11/2013 |
| CN | 203415580 U | 1/2014 |
| CN | 204301483 U | 4/2015 |
| CN | 104798228 A | 7/2015 |
| CN | 105070518 A | 11/2015 |
| CN | 105073906 A | 11/2015 |
| CN | 105308775 A | 2/2016 |
| CN | 205472672 U | 8/2016 |
| CN | 107709474 A | 2/2018 |
| DE | 211457 A3 | 7/1984 |
| DE | 19807224 A1 | 8/1999 |
| EA | 200300389 A1 | 12/2003 |
| EP | 0315442 A2 | 5/1989 |
| EP | 0325689 A1 | 8/1989 |
| EP | 0616600 A1 | 9/1994 |
| EP | 0635044 B1 | 2/1996 |
| EP | 0635043 B1 | 6/1996 |
| EP | 0861300 A1 | 9/1998 |
| EP | 0982378 A1 | 3/2000 |
| EP | 1017622 A1 | 7/2000 |
| EP | 1088854 A2 | 4/2001 |
| EP | 1188801 A1 | 3/2002 |
| EP | 3099397 A1 | 12/2016 |
| EP | 3100597 A2 | 12/2016 |
| EP | 3253826 A1 | 12/2017 |
| EP | 3253827 A1 | 12/2017 |
| EP | 3253904 A1 | 12/2017 |
| EP | 3331821 A1 | 6/2018 |
| EP | 3347306 A1 | 7/2018 |
| EP | 3350855 A1 | 7/2018 |
| EP | 3448553 A1 | 3/2019 |
| EP | 3448936 A1 | 3/2019 |
| EP | 3592810 A1 | 1/2020 |
| EP | 3612600 A1 | 2/2020 |
| EP | 3676220 A1 | 7/2020 |
| EP | 3676335 A1 | 7/2020 |
| EP | 3676901 A1 | 7/2020 |
| EP | 3700980 A1 | 9/2020 |
| EP | 3774020 A1 | 2/2021 |
| FR | 1249094 A | 12/1960 |
| FR | 2891434 A1 | 3/2007 |
| FR | 2937029 A1 | 4/2010 |
| GB | 395893 A | 7/1933 |
| GB | 987498 A | 3/1965 |
| GB | 1068519 | 5/1967 |
| GB | 1400266 A | 7/1975 |
| GB | 1492346 A | 11/1977 |
| GB | 2419883 A | 5/2006 |
| JP | S5021983 B1 | 7/1975 |
| JP | S5987800 A | 5/1984 |
| JP | H0011074 | 1/1989 |
| JP | H04228270 A | 8/1992 |
| JP | H05226096 A | 9/1993 |
| JP | H06302527 A | 10/1994 |
| JP | H06322615 A | 11/1994 |
| JP | H07500695 A | 1/1995 |
| JP | H07307165 A | 11/1995 |
| JP | H08176463 A | 7/1996 |
| JP | H08319552 A | 12/1996 |
| JP | H09316645 A | 12/1997 |
| JP | H11123562 A | 5/1999 |
| JP | 2001164053 A | 6/2001 |
| JP | 2001253974 A | 9/2001 |
| JP | 2002121422 A | 4/2002 |
| JP | 2004300334 A | 10/2004 |
| JP | 2005235709 A | 9/2005 |
| JP | 2005243410 A | 9/2005 |
| JP | 5226096 B2 | 7/2013 |
| KR | 20030046455 A | 6/2003 |
| KR | 20080105344 A | 12/2008 |
| KR | 20140075261 A | 6/2014 |
| RU | 2425795 C2 | 8/2011 |
| RU | 2488984 C2 | 7/2013 |
| TW | 200418933 A | 10/2004 |
| WO | WO-9204415 A1 | 3/1992 |
| WO | WO-9312030 A1 | 6/1993 |
| WO | WO-9312031 A1 | 6/1993 |
| WO | WO-9312633 A1 | 6/1993 |
| WO | WO-9318094 A1 | 9/1993 |
| WO | WO-9320152 A1 | 10/1993 |
| WO | WO-9320153 A1 | 10/1993 |
| WO | WO-9323331 A1 | 11/1993 |
| WO | WO-9408747 A1 | 4/1994 |
| WO | WO-9618688 A1 | 6/1996 |
| WO | WO-9703133 A1 | 1/1997 |
| WO | WO-9813428 A1 | 4/1998 |
| WO | WO-0018682 A1 | 4/2000 |
| WO | WO-0224819 A1 | 3/2002 |
| WO | WO-03014018 A1 | 2/2003 |
| WO | WO-2004083119 A1 | 9/2004 |
| WO | WO-2005054378 A1 | 6/2005 |
| WO | WO-2007016418 A2 | 2/2007 |
| WO | WO-2010040840 A2 | 4/2010 |
| WO | WO-2012015313 A1 | 2/2012 |
| WO | WO-2012067546 A2 | 5/2012 |
| WO | WO-2012094743 A1 | 7/2012 |
| WO | WO-2012149170 A1 | 11/2012 |
| WO | WO-2013134093 A1 | 9/2013 |
| WO | WO-2013184074 A1 | 12/2013 |
| WO | WO-2013185219 A1 | 12/2013 |
| WO | WO-2014000108 A1 | 1/2014 |
| WO | WO-2014012169 A1 | 1/2014 |
| WO | WO-2014149455 A1 | 9/2014 |
| WO | WO-2015049008 A1 | 4/2015 |
| WO | WO-2015051893 A1 | 4/2015 |
| WO | WO-2015093947 A1 | 6/2015 |
| WO | WO-2015116797 A1 | 8/2015 |
| WO | WO-2015116798 A1 | 8/2015 |
| WO | WO-2015116800 A1 | 8/2015 |
| WO | WO-2015116807 A1 | 8/2015 |
| WO | WO-2015116811 A1 | 8/2015 |
| WO | WO-2015116943 A2 | 8/2015 |
| WO | WO-2016012367 A1 | 1/2016 |
| WO | WO-2016014641 A1 | 1/2016 |
| WO | WO-2016126598 A1 | 8/2016 |
| WO | WO-2016126599 A1 | 8/2016 |
| WO | WO-2016126600 A1 | 8/2016 |
| WO | WO-2017019683 A1 | 2/2017 |
| WO | WO-2017027385 A1 | 2/2017 |
| WO | WO-2017034980 A1 | 3/2017 |
| WO | WO-2017044594 A1 | 3/2017 |
| WO | WO-2017048621 A1 | 3/2017 |
| WO | WO-2017190015 A1 | 11/2017 |
| WO | WO-2017190045 A1 | 11/2017 |
| WO | WO-2018165483 A1 | 9/2018 |
| WO | WO-2018195460 A1 | 10/2018 |

(56) References Cited

FOREIGN PATENT DOCUMENTS

| WO | WO-2019046320 A1 | 3/2019 |
|---|---|---|
| WO | WO-2019046322 A1 | 3/2019 |
| WO | WO-2019046324 A1 | 3/2019 |
| WO | WO-2019084200 A1 | 5/2019 |
| WO | WO-2019195461 A1 | 10/2019 |

OTHER PUBLICATIONS

Carmer, et al., Formation of silicon carbide particles behind shock waves. Appl. Phys. Lett. 54 (15), Apr. 10, 1989. 1430-1432.
Co-pending U.S. Appl. No. 17/021,197, inventors Hardman; Ned J. et al., filed Sep. 15, 2020.
Co-pending U.S. Appl. No. 17/031,484, inventors Johnson; Peter L. et al., filed Sep. 24, 2020.
Co-pending U.S. Appl. No. 17/072,416, inventors Taylor; Roscoe W. et al., filed Oct. 16, 2020.
Co-pending U.S. Appl. No. 17/239,041, inventors Hardmanned; J. et al., filed Apr. 23, 2021.
Co-pending U.S. Appl. No. 17/245,296, inventors Johnsonpeter; L. et al., filed Apr. 30, 2021.
Co-pending U.S. Appl. No. 17/329,532, inventors Taylorroscoe; W. et al., filed May 25, 2021.
Co-pending U.S. Appl. No. 17/412,913, inventors Johnson; Peter L. et al., filed Aug. 26, 2021.
Co-pending U.S. Appl. No. 17/473,106, inventors Taylorroscoe; W. et al., filed Sep. 13, 2021.
Co-pending U.S. Appl. No. 17/487,982, inventors Hoermann; Alexander F. et al., filed Sep. 28, 2021.
Co-pending U.S. Appl. No. 17/529,928, inventors Hardmanned; J. et al., filed Nov. 18, 2021.
Co-pending U.S. Appl. No. 17/565,864, inventors Taylorroscoe; W. et al., filed Dec. 30, 2021.
Co-pending U.S. Application No. 202117498693, inventors Johnsonpeter; L. et al., filed on Oct. 11, 2021.
Database WPI, Week 200323, 2017 Clarivate Analytics. Thomson Scientific, London, GB; Database accession No. 2003-239603, XP002781693.
EP18764428.1 Extended European Search Report dated Jan. 11, 2021.
EP18788086.9 Extended European Search Report dated Jan. 11, 2021.
EP18850029.2 Extended European Search Report dated Apr. 29, 2021.
EP18850502.8 Extended European Search Report dated Feb. 25, 2021.
EP18851605.8 Extended European Search Report dated Feb. 25, 2021.
EP18869902.9 Extended European Search Report dated Mar. 19, 2021.
EP19780959.3 Extended European Search Report dated Dec. 21, 2021.
Frenklach, et al., Silicon carbide and the origin of interstellar carbon grains. Nature, vol. 339; May 18, 1989: 196-198.
Gomez-Pozuelo, et al., Hydrogen production by catalytic methane decomposition over rice husk derived silica. Fuel, Dec. 15, 2021; 306: 121697.
Invitation to Pay Additional Fees in PCT/US2018/028619 dated Jun. 18, 2018.
Invitation to Pay Additional Fees in PCT/US2018/048378 dated Oct. 26, 2018.
Invitation to Pay Additional Fees in PCT/US2018/048381 dated Oct. 9, 2018.
Invitation to Pay Additional Fees in PCT/US2018/057401 dated Dec. 19, 2018.
Long C. M., et al., "Carbon black vs. black carbon and other airborne materials containing elemental carbon: Physical and chemical distinctions", Environmental Pollution, 2013, 181, pp. 271-286. https://doi.org/10.1016/j.envpol.2013.06.009.
PCT/US2021/053371 International Search Report and Written Opinion dated Feb. 17, 2022.
U.S. Appl. No. 14/591,528 Office Action dated Sep. 11, 2020.
U.S. Appl. No. 14/610,299 Notice of Allowance dated Dec. 13, 2021.
U.S. Appl. No. 14/610,299 Notice of Allowance dated Nov. 16, 2021.
U.S. Appl. No. 14/610,299 Office Action dated Feb. 17, 2021.
U.S. Appl. No. 15/229,608 Office Action dated Feb. 1, 2021.
U.S. Appl. No. 15/241,771 Office Action dated Dec. 30, 2021.
U.S. Appl. No. 15/259,884 Office Action dated Jun. 18, 2021.
U.S. Appl. No. 15/259,884 Office Action dated Mar. 4, 2022.
U.S. Appl. No. 15/262,539 Notice of Allowance dated Jul. 23, 2020.
U.S. Appl. No. 15/410,283 Office Action dated Jul. 31, 2020.
U.S. Appl. No. 15/548,346 Office Action dated Jul. 16, 2021.
U.S. Appl. No. 15/548,352 Office Action dated Aug. 11, 2020.
U.S. Appl. No. 15/548,352 Office Action dated Sep. 21, 2021.
U.S. Appl. No. 16/097,035 Office Action dated May 10, 2021.
U.S. Appl. No. 16/097,035 Office Action dated Oct. 30, 2020.
U.S. Appl. No. 16/097,039 Notice of Allowance dated Jun. 14, 2021.
U.S. Appl. No. 16/097,039 Office Action dated Nov. 18, 2020.
U.S. Appl. No. 16/180,635 Notice of Allowance dated Jul. 8, 2021.
U.S. Appl. No. 16/180,635 Notice of Allowance dated Jun. 29, 2021.
U.S. Appl. No. 16/180,635 Office Action dated Dec. 15, 2020.
U.S. Appl. No. 16/445,727 Office Action dated Aug. 17, 2021.
U.S. Appl. No. 16/802,174 Office Action dated Feb. 16, 2022.
U.S. Appl. No. 16/855,276 Office Action dated Apr. 5, 2021.
U.S. Appl. No. 16/855,276 Office Action dated Oct. 25, 2021.
U.S. Appl. No. 16/802,190 Office Action dated Jan. 31, 2022.
What is Carbon Black, Orion Engineered Carbons, (Year: 2015).
AP-42, Fifth Edition, vol. 1, Chapter 6: Organic Chemical Process Industry, Section 6.1: Carbon Black (1983): 1-10.
Ayala, et al., Carbon Black Elastomer Interaction. Rubber Chemistry and Technology (1991): 19-39.
Bakken, et al., Thermal plasma process development in Norway. Pure and Applied Chemistry 70.6 (1998): 1223-1228.
Biscoe, et al., An X-ray study of carbon black. Journal of Applied physics, 1942; 13: 364-371.
Boehm, Some Aspects of Surface Chemistry of Carbon Blacks and Other Carbons. Carbon. 32.5. (1994): 759-769.
Breeze, Raising steam plant efficiency-Pushing the steam cycle boundaries. PEI Magazine 20.4 (2012) 12 pages.
Cataldo, The impact of a fullerene-like concept in carbon black science. Carbon 40 (2002): 157-162.
Chiesa, et al., Using Hydrogen as Gas Turbine Fuel. ASME. J. Eng. Gas Turbines Power 127.1. (2005):73-80. doi:10.1115/1.1787513.
Cho, et al., Conversion of natural gas to hydrogen and carbon black by plasma and application of plasma black. Symposia-American Chemical Society, Div. Fuel Chem. 49.1. (2004): 181-183.
Co-pending U.S. Appl. No. 16/097,035, filed Oct. 26, 2018.
Co-pending U.S. Appl. No. 16/563,008, filed Sep. 6, 2019.
Co-pending U.S. Appl. No. 16/802,174, filed Feb. 26, 2020.
Co-pending U.S. Appl. No. 16/802,190, filed Feb. 26, 2020.
Co-pending U.S. Appl. No. 16/802,212, filed Feb. 26, 2020.
Co-pending U.S. Appl. No. 16/807,550, filed Mar. 3, 2020.
Co-pending U.S. Appl. No. 16/855,276, filed Apr. 22, 2020.
Donnet, et al., Carbon Black. New York: Marcel Dekker, (1993): 46, 47 and 54.
Donnet, et al., Observation of Plasma-Treated Carbon Black Surfaces by Scanning Tunneling Microscopy. Carbon (1994) 32(2): 199-206.
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Nov. 8, 2019.
Extended European Search Report for EP Application No. 15742910.1 dated Jul. 18, 2017.

(56) References Cited

OTHER PUBLICATIONS

Extended European Search Report for EP Application No. 15743214.7 dated Jan. 16, 2018.
Extended European Search Report for EP Application No. 16747055.8, dated Jun. 27, 2018.
Extended European Search Report for EP Application No. 16747056.6 dated Jun. 27, 2018.
Extended European Search Report for EP Application No. 16747057.4 dated Oct. 9, 2018.
Extended European Search Report for EP Application No. 16835697.0 dated Nov. 28, 2018.
Fabry, et al., Carbon black processing by thermal plasma. Analysis of the particle formation mechanism. Chemical Engineering Science 56.6 (2001): 2123-2132.
Fulcheri, et al., From methane to hydrogen, carbon black and water. International journal of hydrogen energy 20.3 (1995): 197-202.
Fulcheri, et al., Plasma processing: a step towards the production of new grades of carbon black. Carbon 40.2 (2002): 169-176.
Gago, et al., Growth mechanisms and structure of fullerene-like carbon-based thin films: superelastic materials for tribological applications. Trends in Fullerene Research, Published by Nova Science Publishers, Inc. (2007): 1-46.
Garberg, et al., A transmission electron microscope and electron diffraction study of carbon nanodisks. Carbon 46.12 (2008): 1535-1543.
Grivei, et al., A clean process for carbon nanoparticles and hydrogen production from plasma hydrocarbon cracking. Publishable Report, European Commission Joule III Programme, Project No. JOE3-CT97-0057,circa (2000): 1-25.
Hernandez, et al. Comparison of carbon nanotubes and nanodisks as percolative fillers in electrically conductive composites. Scripta Materialia 58 (2008) 69-72.
Hoyer, et al., Microelectromechanical strain and pressure sensors based on electric field aligned carbon cone and carbon black particles in a silicone elastomer matrix. Journal of Applied Physics 112.9 (2012): 094324.
International Preliminary Report on Patentability for Application No. PCT/US2015/013482 dated Aug. 2, 2016.
International Preliminary Report on Patentability for Application No. PCT/US2015/013484 dated Aug. 2, 2016.
International Preliminary Report on Patentability for Application No. PCT/US2015/013487 dated Aug. 2, 2016.
International Preliminary Report on Patentability for Application No. PCT/US2015/013505 dated Aug. 2, 2016.
International Preliminary Report on Patentability for Application No. PCT/US2015/013510 dated Aug. 2, 2016.
International Preliminary Report on Patentability for Application No. PCT/US2017/030139 dated Oct. 30, 2018.
International Preliminary Report on Patentability for Application No. PCT/US2017/030179 dated Oct. 30, 2018.
International Search Report and Written Opinion for Application No. PCT/US2015/013482 dated Jun. 17, 2015.
International Search Report and Written Opinion for Application No. PCT/US2015/013484 dated Apr. 22, 2015.
International Search Report and Written Opinion for Application No. PCT/US2015/013487 dated Jun. 16, 2015.
International Search Report and Written Opinion for Application No. PCT/US2015/013505 dated May 11, 2015.
International Search Report and Written Opinion for Application No. PCT/US2015/013510 dated Apr. 22, 2015.
International Search Report and Written Opinion for Application No. PCT/US2015/013794 dated Jun. 19, 2015.
International Search Report and Written Opinion for Application No. PCT/US2016/015939 dated Jun. 3, 2016.
International Search Report and Written Opinion for Application No. PCT/US2016/015941 dated Apr. 21, 2016.
International Search Report and Written Opinion for Application No. PCT/US2016/015942 dated Apr. 11, 2016.
International search Report and Written Opinion for Application No. PCT/US2016/044039 dated Oct. 6, 2016.
International Search Report and Written Opinion for Application No. PCT/US2016/045793 dated Oct. 18, 2016.
International Search Report and Written Opinion for Application No. PCT/US2016/047769 dated Dec. 30, 2016.
International Search Report and Written Opinion for Application No. PCT/US2016/050728 dated Nov. 18, 2016.
International search Report and Written Opinion for Application No. PCT/US2016/051261 dated Nov. 18, 2016.
International Search Report and Written Opinion for Application No. PCT/US2017/030139 dated Jul. 19, 2017.
International Search Report and Written Opinion for Application No. PCT/US2017/030179 dated Jul. 27, 2017.
International Search Report and Written Opinion for Application No. PCT/US2018/021627 dated May 31, 2018.
International Search Report and Written Opinion for Application No. PCT/US2018/028619 dated Aug. 9, 2018.
International Search Report and Written Opinion for Application No. PCT/US2018/048374 dated Nov. 21, 2018.
International Search Report and Written Opinion for Application No. PCT/US2018/048378 dated Dec. 20, 2018.
International Search Report and Written Opinion for Application No. PCT/US2018/048381 dated Dec. 14, 2018.
International Search Report for Application No. PCT/US2015/13482 dated Jun. 17, 2015.
International Search Report for Application No. PCT/US2015/13487 dated Jun. 16, 2015.
Knaapila, et al., Directed assembly of carbon nanocones into wires with an epoxy coating in thin films by a combination of electric field alignment and subsequent pyrolysis. Carbon 49.10 (2011): 3171-3178.
Krishnan, et al., Graphitic cones and the nucleation of curved carbon surfaces. Nature 388.6641 (1997): 451-454.
Larouche, et al.,Nitrogen Functionalization of Carbon Black in a Thermo-Convective Plasma Reactor. Plasma Chem Plasma Process (2011) 31: 635-647.
Medalia, et al., Tinting Strength of Carbon Black. Journal of Colloid and Interface Science 40.2. (1972).
Naess, et al., Carbon nanocones: wall structure and morphology. Science and Technology of advanced materials (2009): 7 pages.
PCT/US2018/021627 International Search Report and Written Opinion dated May 31, 2018.
PCT/US2018/028619 International Search Report and Written Opinion dated Aug. 9, 2018.
PCT/US2018/048374 International Search Report and Written Opinion dated Nov. 21, 2018.
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
Polman, et al., Reduction of CO2 emissions by adding hydrogen to natural gas. IEA Green House Gas R&D programme (2003): 1-98.
Pristavita, et al. Carbon blacks produced by thermal plasma: the influence of the reactor geometry on the product morphology. Plasma Chemistry and Plasma Processing 30.2 (2010): 267-279.
Pristavita, et al., Carbon nanoparticle production by inductively coupled thermal plasmas: controlling the thermal history of particle nucleation. Plasma Chemistry and Plasma Processing 31.6 (2011): 851-866.
Pristavita, et al., Volatile Compounds Present in Carbon Blacks Produced by Thermal Plasmas. Plasma Chemistry and Plasma Processing 31.6 (2011): 839-850.
Reese, Resurgence in American manufacturing will be led by the rubber and tire industry. Rubber World. 255. (2017): 18-21 and 23.
Reynolds, Electrode Resistance: How Important is Surface Area. Oct. 10, 2016. p. 3 para[0001]; Figure 3; Retrieved from http://electrotishing.net/2016/10/10/electrode-resistance-how-important-is-surface-area/ on May 8, 2018.
Search Report for Application No. RU2016135213 dated Feb. 12, 2018.

(56) References Cited

OTHER PUBLICATIONS

Sun, et al., Preparation of carbon black via arc discharge plasma enhanced by thermal pyrolysis. Diamond & Related Materials (2015), doi: 10.1016/j.diamond.2015.11.004, 47 pages.
Supplementary Partial European Search Report for EP Application No. 15743214.7 dated Sep. 12, 2017.
Translation of Official Notification of RU Application No. 2016135213 dated Feb. 12, 2018.
Tsujikawa, et al., Analysis of a gas turbine and steam turbine combined cycle with liquefied hydrogen as fuel. International Journal of Hydrogen Energy 7.6 (1982): 499-505.
U.S. Appl. No. 14/591,541 Notice of Allowance dated Sep. 17, 2018.
U.S. Environmental Protection Agency, Guide to Industrial Assessments for Pollution Prevention and Energy Efficiency. EPA 625/R-99/003 (1999): 474 pages.
U.S. Appl. No. 14/591,528 Office Action dated Jan. 17, 2019.
U.S. Appl. No. 15/548,346 Office Action dated Oct. 22, 2019.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,476 Office Action dated Feb. 27, 2017.
U.S. Appl. No. 14/591,476 Office Action dated Jul. 11, 2016.
U.S. Appl. No. 14/591,476 Office Action dated Jun. 7, 2018.
U.S. Appl. No. 14/591,476 Office Action dated Mar. 16, 2016.
U.S. Appl. No. 14/591,476 Office Action dated Oct. 13, 2017.
U.S. Appl. No. 14/591,528 Office Action dated Jan. 16, 2018.
U.S. Appl. No. 14/591,528 Office Action dated Oct. 28, 2019.
U.S. Appl. No. 14/591,541 Notice of Allowance dated Jun. 7, 2018.
U.S. Appl. No. 14/591,541 Office Action dated Feb. 22, 2017.
U.S. Appl. No. 14/591,541 Office Action dated Jul. 14, 2016.
U.S. Appl. No. 14/591,541 Office Action dated Mar. 16, 2016.
U.S. Appl. No. 14/591,541 Office Action dated Oct. 13, 2017.
U.S. Appl. No. 14/601,761 Corrected Notice of Allowance dated Feb. 9, 2018.
U.S. Appl. No. 14/601,761 Ex Parte Quayle Actionn dated May 19, 2017.
U.S. Appl. No. 14/601,761 Notice of Allowance dated Feb. 9, 2018.
U.S. Appl. No. 14/601,761 Notice of Allowance dated Jan. 18, 2018.
U.S. Appl. No. 14/601,761 Notice of Allowance dated Jun. 19, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/601,761 Office Action dated Apr. 14, 2016.
U.S. Appl. No. 14/601,761 Office Action dated Oct. 19, 2016.
U.S. Appl. No. 14/601,793 Notice of Allowance dated Oct. 7, 2016.
U.S. Appl. No. 14/601,793 Office Action dated Apr. 13, 2016.
U.S. Appl. No. 14/601,793 Office Action dated Aug. 3, 2016.
U.S. Appl. No. 14/610,299 Notice of Allowance dated Feb. 20, 2020.
U.S. Appl. No. 14/610,299 Office Action dated May 2, 2017.
U.S. Appl. No. 14/610,299 Office Action dated Sep. 25, 2018.
U.S. Appl. No. 15/221,088 Office Action dated Apr. 20, 2018.
U.S. Appl. No. 15/221,088 Office Action dated Dec. 23, 2016.
U.S. Appl. No. 15/221,088 Office Action dated Dec. 4, 2019.
U.S. Appl. No. 15/221,088 Office Action dated Mar. 7, 2019.
U.S. Appl. No. 15/221,088 Office Action dated Sep. 19, 2017.
U.S. Appl. No. 15/229,608 Office Action dated Apr. 8, 2019.
U.S. Appl. No. 15/229,608 Office Action dated May 15, 2020.
U.S. Appl. No. 15/229,608 Office Action dated Oct. 25, 2019.
U.S. Appl. No. 15/241,771 Office Action dated Jul. 6, 2018.
U.S. Appl. No. 15/241,771 Office Action dated Mar. 13, 2019.
U.S. Appl. No. 15/241,771 Office Action dated May 1, 2020.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jan. 9, 2018.
U.S. Appl. No. 15/259,884 Office Action dated May 31, 2019.
U.S. Appl. No. 15/259,884 Office Action dated Oct. 11, 2018.
U.S. Appl. No. 15/262,539 Notice of Allowance dated Jun. 18, 2020.
U.S. Appl. No. 15/262,539 Office Action dated Jun. 1, 2018.
U.S. Appl. No. 15/262,539 Office Action dated Jan. 4, 2019.
U.S. Appl. No. 15/262,539 Office Action dated Sep. 19, 2019.
U.S. Appl. No. 15/410,283 Office Action dated Jan. 16, 2020.
U.S. Appl. No. 15/410,283 Office Action dated Jun. 7, 2018.
U.S. Appl. No. 15/410,283 Office Action dated Mar. 12, 2019.
U.S. Appl. No. 15/548,346 Office Action dated May 4, 2020.
U.S. Appl. No. 15/548,348 Notice of Allowance dated Dec. 12, 2019.
U.S. Appl. No. 15/548,352 Office Action dated Jan. 31, 2020.
U.S. Appl. No. 15/548,352 Office Action dated May 9, 2019.
U.S. Appl. No. 15/548,352 Office Action dated Oct. 10, 2018.
U.S. Appl. No. 16/159,144 Office Action dated Mar. 26, 2020.
Verfondern, Nuclear Energy for Hydrogen Production. Schriften des Forschungzentrum Julich 58 (2007): 4 pages.
Wikipedia, Heating Element. Oct. 14, 2016. p. 1 para[0001]. Retrieved from https://en.wikipedia.org/w/index.php?title=Heating_element &oldid=744277540 on May 9, 2018.
Wikipedia, Joule Heating. Jan. 15, 2017. p. 1 para[0002]. Retrieved from https://en.wikipedia.org/w/index . Dhp?title=Joule_heating &oldid=760136650 on May 9, 2018.
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
ASTM International: Standard Test Method for Carbon Black—Morphological Characterization of Carbon Black Using Electron Microscopy, D3849-07 (2011); 7 Pages.
Co-pending U.S. Appl. No. 17/741,161, inventors Hoermann; Alexander F. et al., filed May 10, 2022.
Co-pending U.S. Appl. No. 17/817,482, inventor Hardmanned; J., filed Aug. 4, 2022.
Co-pending U.S. Appl. No. 17/819,075, inventor Ned; J. Hardman, filed Aug. 11, 2022.
Co-pending U.S. Appl. No. 17/862,242, inventors Hardman; Ned J. et al., filed Jul. 11, 2022.
Lee, et al., Application of Thermal Plasma for Production of Hydrogen and Carbon Black from Direct Decomposition of Hydrocarbon, Appl. Chem. Eng., vol. 18, No. 1, Feb. 2007, pp. 84-89.
U.S. Appl. No. 15/229,608 Office Action dated Apr. 4, 2022.
U.S. Appl. No. 15/241,771 Office Action dated Jul. 18, 2022.
U.S. Appl. No. 15/548,346 Office Action dated Mar. 18, 2022.
U.S. Appl. No. 15/548,352 Office Action dated Apr. 7, 2022.
U.S. Appl. No. 16/097,035 Notice of Allowance dated Jul. 7, 2022.
U.S. Appl. No. 16/097,035 Notice of Allowance dated Mar. 24, 2022.
U.S. Appl. No. 16/445,727 Office Action dated Apr. 15, 2022.
U.S. Appl. No. 16/563,008 Office Action dated Jul. 25, 2022.
U.S. Appl. No. 16/855,276 Notice of Allowance dated May 11, 2022.
U.S. Appl. No. 16/892,199 Office Action dated Jun. 27, 2022.
Co-pending U.S. Appl. No. 17/938,304, inventors Roscoe; W. Taylor et al., filed Oct. 5, 2022.
Co-pending U.S. Appl. No. 18/046,723, inventors Peter; L. Johnson et al., filed Oct. 14, 2022.
Co-pending U.S. Appl. No. 18/066,929, inventor Alexander; F. Hoermann, filed Dec. 15, 2022.
U.S. Appl. No. 15/229,608 Office Action dated Nov. 28, 2022.
U.S. Appl. No. 15/241,771 Office Action dated Dec. 16, 2022.
U.S. Appl. No. 15/548,346 Office Action dated Oct. 3, 2022.
U.S. Appl. No. 16/445,727 Notice of Allowance dated Oct. 26, 2022.
U.S. Appl. No. 16/802,174 Office Action dated Aug. 31, 2022.
U.S. Appl. No. 16/802,190 Office Action dated Oct. 5, 2022.
U.S. Appl. No. 16/802,212 Office Action dated Sep. 16, 2022.
U.S. Appl. No. 16/563,008 Office Action dated Mar. 16, 2023.
U.S. Appl. No. 16/802,190 Office Action dated Apr. 19, 2023.
U.S. Appl. No. 17/498,693 Office Action dated Apr. 3, 2023.
U.S. Appl. No. 17/817,482 Office Action dated Mar. 29, 2023.
U.S. Appl. No. 18/046,723 Notice of Allowance dated Apr. 12, 2023.

* cited by examiner

//CARBON PARTICLES HAVING HIGH PURITIES AND METHODS FOR MAKING SAME

CROSS-REFERENCE

This application is a continuation of International Application No. PCT/US2018/028619, filed Apr. 20, 2018, which claims the benefit of U.S. Provisional Application No. 62/487,795, filed Apr. 20, 2017, U.S. Provisional Application No. 62/551,059, filed Aug. 28, 2017, and U.S. Provisional Application No. 62/551,072, filed Aug. 28, 2017, each of which are entirely incorporated herein by reference.

BACKGROUND

Particles are used in many household and industrial applications. The particles may be produced by various chemical processes. Performance and energy supply associated with such chemical processes has evolved over time.

SUMMARY

The present disclosure recognizes a need for more efficient and effective processes to produce particles, such as, for example, carbon particles. Also recognized herein is a need to increase speed of production, increase yields, reduce manufacturing equipment wear characteristics, etc. The present disclosure may provide, for example, improved processes for converting hydrocarbon-containing materials into carbon particles.

The present disclosure provides, for example, a system for generating carbon particles, comprising: a thermal generator that heats at least one material stream among one or more material streams; and a reactor that generates the carbon particles from the one or more material streams, wherein the carbon particles have (i) a purity of less than about 0.05% ash, less than about 5 ppm 325 mesh grit, or a combination thereof, (ii) a lattice constant ($L_c$) greater than about 3.0 nanometers (nm), and (iii) a lattice spacing of the 002 peak of graphite (d002) less than about 0.35 nm. The carbon particles may comprise less than about 0.3% sulfur. The carbon particles may comprise less than or equal to about 50 ppm sulfur. The carbon particles may comprise less than or equal to about 10 ppm sulfur. The carbon particles may comprise less than or equal to about 0.03% ash. The carbon particles may comprise less than or equal to about 0.01% ash. The carbon reactor may comprise the thermal generator. The thermal generator may heat the at least one material stream with electrical energy. The carbon particles may have a surface area from about 15 m$^2$/g (square meters per gram) to about 300 m$^2$/g. The carbon particles may include carbon black. The carbon particles may comprise less than or equal to about 1 ppm 325 mesh grit.

The present disclosure also provides, for example, a method for making carbon particles, comprising: heating a thermal transfer gas; and mixing the thermal transfer gas with a hydrocarbon feedstock to generate the carbon particles, wherein the carbon particles have (a) a dibutyl phthalate (DBP) absorption that is less than or equal to about 1.3 times greater than a compressed dibutyl phthalate (CDBP) absorption of the carbon particle, or (b) a surface area from about 15 m$^2$/g (square meters per gram) to about 300 m$^2$/g, and a purity of less than about 0.05% ash and/or less than about 5 ppm 325 mesh grit. The method may further comprise mixing the thermal transfer gas with the hydrocarbon feedstock to generate the carbon particles and hydrogen gas. The method may further comprise mixing the thermal transfer gas with the hydrocarbon feedstock downstream of the heating. The thermal transfer gas may comprise greater than about 60% hydrogen. The thermal transfer gas may be hydrogen. The hydrocarbon feedstock may comprise at least about 70% by weight methane, ethane, propane or mixtures thereof. The carbon particles may include carbon black. The heating may comprise heating with electrical energy. The heating may comprise heating by an electric arc. The carbon particles may comprise less than or equal to about 0.03% ash. The carbon particles may comprise less than or equal to about 0.01% ash. The carbon particles may comprise less than or equal to about 1 ppm 325 mesh grit. The method may further comprise pelletizing the carbon particles using (i) oil pelletization, or (ii) pelletization with distilled water and an ash free binder. The ash free binder may be sugar. The carbon particles may comprise less than or equal to about 0.4% oxygen. The carbon particles may comprise greater than or equal to about 99% carbon. The carbon particles may comprise less than about 0.4% hydrogen. The carbon particles may have an affinity to adsorb water from an 80% relative humidity atmosphere of less than about 0.5 ml (milliliter) of water per square meter of surface area of the carbon particles. The affinity to adsorb water from an 80% relative humidity atmosphere may be less than about 0.05 ml of water per square meter of surface area of the carbon particles. The carbon particles may have a water spreading pressure (WSP) between about 0 and about 8 mJ/m$^2$. The WSP may be less than about 5 mJ/m$^2$. The carbon particles may have a total surface acid group content of less than or equal to about 0.5 µmol/m$^2$.

The present disclosure also provides, for example, a carbon particle, having a dibutyl phthalate (DBP) absorption that is less than or equal to about 1.3 times greater than a compressed dibutyl phthalate (CDBP) absorption of the carbon particle. The particle may be carbon black. A ratio of the DBP to CDBP may be less than or equal to about 95% of a DBP to CDBP ratio of a reference carbon black. The particle may have a surface area from about 15 m$^2$/g (square meters per gram) to about 300 m$^2$/g. The carbon particle may have $L_c$ greater than about 1 nm. The carbon particle may have $L_c$ greater than or equal to about 3 nm. The carbon particle may have $L_c$ greater than about 4 nm. The carbon particle may have $L_c$ greater than about 3.0 nm, d002 less than about 0.35 nm, or a combination thereof. The carbon particle may have a crystallinity from about 3 nm to about 20 nm in terms of $L_a$ or $L_c$. The DBP may be less than or equal to about 1.1 times greater than the CDBP. The carbon particle may comprise less than about 0.3% sulfur by weight. The carbon particle may comprise less than or equal to about 0.4% oxygen by weight. The carbon particle may comprise greater than or equal to about 99% carbon by weight. The carbon particle may comprise less than about 0.4% hydrogen by weight. The carbon particle may have a lower hydrogen content than a reference carbon black. The carbon particle may have an affinity to adsorb water from an 80% relative humidity atmosphere of less than about 0.5 ml (milliliter) of water per square meter of surface area of the carbon particle. The affinity to adsorb water from an 80% relative humidity atmosphere may be less than about 0.05 ml of water per square meter of surface area of the carbon particle. The carbon particle may have a water spreading pressure (WSP) between about 0 and about 8 mJ/m$^2$. The WSP may be less than about 5 mJ/m$^2$. The carbon particle may have a total surface acid group content of less than or equal to about 0.5 µmol/m$^2$.

The present disclosure also provides, for example, carbon particles, having (i) a surface area from about 15 m$^2$/g (square meters per gram) to about 300 m$^2$/g, and (ii) a purity of less than about 0.05% ash, less than about 5 ppm 325 mesh grit, or a combination thereof. The carbon particles may comprise carbon black particles. The carbon particles may have L$_c$ greater than about 3.0 nm, d002 less than about 0.35 nm, less than about 0.3% sulfur, or any combination thereof. The carbon particles may have L$_c$ greater than about 3.0 nm, d002 less than about 0.35 nm, less than about 10 ppm sulfur, or any combination thereof. Tote of the carbon particles may be greater than or equal to about 99%. The carbon particles may have (i) nitrogen surface area (N2SA) from about 19 m$^2$/g to about 50 m$^2$/g and dibutyl phthalate (DBP) absorption from about 55 ml/100 g to about 131 ml/100 g. The carbon particles may have (i) nitrogen surface area (N2SA) from about 23 m$^2$/g to about 35 m$^2$/g and dibutyl phthalate (DBP) absorption from about 59 ml/100 g to about 71 ml/100 g, or (ii) N2SA from about 19 m$^2$/g to about 39 m$^2$/g and DBP from about 55 ml/100 g to about 75 ml/100 g. The carbon particles may have (i) nitrogen surface area (N2SA) from about 29 m$^2$/g to about 41 m$^2$/g and dibutyl phthalate (DBP) absorption from about 84 ml/100 g to about 96 ml/100 g, or (ii) N2SA from about 25 m$^2$/g to about 45 m$^2$/g and DBP from about 80 ml/100 g to about 100 ml/100 g. The carbon particles may have (i) nitrogen surface area (N2SA) from about 34 m$^2$/g to about 46 m$^2$/g and dibutyl phthalate (DBP) absorption from about 115 ml/100 g to about 127 ml/100 g, or (ii) N2SA from about 30 m$^2$/g to about 50 m$^2$/g and DBP from about 111 ml/100 g to about 131 ml/100 g. The carbon particles may comprise less than or equal to about 0.03% ash. The carbon particles may comprise less than or equal to about 0.01% ash. The carbon particles may comprise less than or equal to about 1 ppm 325 mesh grit. The carbon particles may comprise less than or equal to about 0.4% oxygen. The carbon particles may comprise greater than or equal to about 99% carbon. The carbon particles may comprise less than about 0.4% hydrogen. The carbon particles may have a lower hydrogen content than a reference carbon black. The carbon particles may have an affinity to adsorb water from an 80% relative humidity atmosphere of less than about 0.5 ml (milliliter) of water per square meter of surface area of the carbon particles. The affinity to adsorb water from an 80% relative humidity atmosphere may be less than about 0.05 ml of water per square meter of surface area of the carbon particles. The carbon particles may have a water spreading pressure (WSP) between about 0 and about 8 mJ/m$^2$. The WSP may be less than about 5 mJ/m$^2$. The carbon particles may have a total surface acid group content of less than or equal to about 0.5 µmol/m$^2$.

The present disclosure also provides, for example, a carbon particle, having (i) a nitrogen surface area (N2SA) greater than or equal to about 15 square meters per gram (m$^2$/g) and (ii) less than about 5 ppm sulfur. The N2SA may be from about 23 m$^2$/g to about 35 m$^2$/g and dibutyl phthalate (DBP) absorption may be from about 59 ml/100 g to about 71 ml/100 g. The carbon particle may comprise less than about 1 ppm sulfur by weight. The N2SA may be less than or equal to about 300 m$^2$/g. The carbon particle may comprise less than or equal to about 0.4% oxygen. The carbon particle may comprise greater than or equal to about 99% carbon. The carbon particle may comprise less than about 0.4% hydrogen. The carbon particle may have a lower hydrogen content than a reference carbon black. The carbon particle may have an affinity to adsorb water from an 80% relative humidity atmosphere of less than about 0.5 ml (milliliter) of water per square meter of surface area of the carbon particle. The affinity to adsorb water from an 80% relative humidity atmosphere may be less than about 0.05 ml of water per square meter of surface area of the carbon particle. The carbon particle may have a water spreading pressure (WSP) between about 0 and about 8 mJ/m$^2$. The WSP may be less than about 5 mJ/m$^2$. The carbon particle may have a total surface acid group content of less than or equal to about 0.5 µmol/m$^2$. A rubber may comprise the carbon particle. A tire may comprise the rubber. A paint may comprise the carbon particle. A coating may comprise the carbon particle. An elastomer composite may comprise the carbon particle. A polymer may comprise the carbon particle. An ink may comprise the carbon particle.

The present disclosure also provides, for example, a system for generating particles, comprising: a thermal generator that electrically heats at least one material stream among one or more material streams; a filter that removes sulfur impurities from at least one of the one or more material streams; and a reactor that generates the particles from the one or more material streams. The particles may comprise carbon particles. The carbon particles may include carbon black. The particles may comprise less than about 0.3% sulfur. The particles may comprise less than about 50 parts per million (ppm) sulfur. The particles may comprise less than about 10 ppm sulfur. The particles may comprise less than about 5 ppm sulfur. The particles may comprise less than about 1 ppm sulfur. The one or more material streams may include a feedstock stream and the filter may remove sulfur impurities from the feedstock stream. The filter may be coupled to a feedstock injector. The filter may be coupled to an inlet of the feedstock injector. The particles may have a nitrogen surface area (N2SA) greater than or equal to about 15 square meters per gram (m$^2$/g) and may comprise less than about 5 ppm sulfur by weight. The thermal generator may be a plasma generator.

The present disclosure also provides, for example, a polymer product, wherein the polymer product is a radiator hose, an automotive extrusion, cable flooding/insulation for medium voltage power cables, or a seal, and wherein the polymer product comprises carbon particles that have: (a) a purity of less than about 0.05% ash, less than about 5 ppm 325 mesh grit, or a combination thereof; a lattice constant (L$_c$) greater than about 3.0 nanometers (nm); and a lattice spacing of the 002 peak of graphite (d002) less than about 0.35 nm; (b) a dibutyl phthalate (DBP) absorption that is less than or equal to about 1.3 times greater than a compressed dibutyl phthalate (CDBP) absorption of the carbon particles; (c) a surface area from about 15 m$^2$/g (square meters per gram) to about 300 m$^2$/g; and a purity of less than about 0.05% ash, less than about 5 ppm 325 mesh grit, or a combination thereof; or (d) a nitrogen surface area (N2SA) greater than or equal to about 15 square meters per gram (m$^2$/g) and less than about 5 ppm sulfur. The DBP may be less than or equal to about 1.1 times greater than the CDBP. The carbon particles may comprise less than or equal to about 1 ppm by weight 325 mesh grit. The carbon particles may have a nitrogen surface area (N2SA) from about 10 m$^2$/g to about 30 m$^2$/g and a structure from about 70 ml/100 g to about 120 ml/100 g, and the polymer product may have (i) enhanced or improved processability, (ii) enhanced or improved formability, (iii) increased electrical resistivity, (iv) enhanced or improved dispersion, (v) enhanced or improved extrusion, and/or (vi) increased green strength compared with a polymer product comprising a reference carbon black. The N2SA may be from about 15 m$^2$/g to about 20 m$^2$/g and the structure may be from about 80 ml/100 g to about 100 ml/100 g. The polymer product may be the radiator hose. The carbon particles may have a nitrogen surface area (N2SA) from about 17 $m^2/g$ to about 51 $m^2/g$ and structure from about 108 ml/100 g to about 133 ml/100 g, and the polymer product may have (i) reduced surface imperfections/defects, (ii) reduced iridescence, (iii) enhanced or improved dimensional stability, (iv) enhanced or improved dispersion, (v) enhanced or improved extrusion properties, (v) enhanced or improved extrusion smoothness and/or (vi) increased green strength compared with a polymer product comprising a reference carbon black. The N2SA may be from about 20 $m^2/g$ to about 50 $m^2/g$ and the structure may be from about 110 ml/100 g to about 130 ml/100 g. The polymer product may be the automotive extrusion. The carbon particles may have a nitrogen surface area (N2SA) from about 30 $m^2/g$ to about 50 $m^2/g$ and structure greater than or equal to about 111 ml/100 g, and the polymer product may have (i) enhanced or improved processability, (ii) enhanced or improved ease of stripping, (iii) increased cleanliness, (iv) increased conductivity, (v) enhanced or improved dispersion, and/or (vi) enhanced or improved cable life compared with a polymer product comprising a reference carbon black. The N2SA may be from about 30 $m^2/g$ to about 50 $m^2/g$ and the structure may be greater than or equal to about 150 ml/100 g. The polymer product may be the cable flooding/insulation for medium voltage power cables. The carbon particles may have a nitrogen surface area (N2SA) from about 2 $m^2/g$ to about 50 $m^2/g$ and structure from about 33 ml/100 g to about 131 ml/100 g, and the polymer product may have (i) enhanced or improved heat aged physical properties, and/or (ii) enhanced or improved dynamic performance as measured by flex cycles and resistance to crack initiation compared with a polymer product comprising a reference carbon black. The N2SA may be from about 20 $m^2/g$ to about 40 $m^2/g$ and structure may be from about 45 ml/100 g to about 95 ml/100 g. The polymer product may be the seal. The polymer product may comprise EPDM rubber. The carbon particles may comprise less than or equal to about 0.4% oxygen. The carbon particles may comprise greater than or equal to about 99% carbon. The carbon particles may comprise less than about 0.4% hydrogen. The carbon particles may have an affinity to adsorb water from an 80% relative humidity atmosphere of less than about 0.5 ml (milliliter) of water per square meter of surface area of the carbon particles. The affinity to adsorb water from an 80% relative humidity atmosphere may be less than about 0.05 ml of water per square meter of surface area of the carbon particles. The carbon particles may have a water spreading pressure (WSP) between about 0 and about 8 $mJ/m^2$. The WSP may be less than about 5 $mJ/m^2$. The carbon particles may have a total surface acid group content of less than or equal to about 0.5 $\mu mol/m^2$.

The present disclosure also provides, for example, a polymer product, wherein the polymer product is molded, and wherein the polymer product comprises carbon particles that have: (a) a purity of less than about 0.05% ash, less than about 5 ppm 325 mesh grit, or a combination thereof; a lattice constant ($L_c$) greater than about 3.0 nanometers (nm); and a lattice spacing of the 002 peak of graphite (d002) less than about 0.35 nm; (b) a dibutyl phthalate (DBP) absorption that is less than or equal to about 1.3 times greater than a compressed dibutyl phthalate (CDBP) absorption of the carbon particles; (c) a surface area from about 15 $m^2/g$ (square meters per gram) to about 300 $m^2/g$; and a purity of less than about 0.05% ash, less than about 5 ppm 325 mesh grit, or a combination thereof; or (d) a nitrogen surface area (N2SA) greater than or equal to about 15 square meters per gram ($m^2/g$) and less than about 5 ppm sulfur. The carbon particles may have a nitrogen surface area (N2SA) from about 2 $m^2/g$ to about 50 $m^2/g$ and structure from about 33 ml/100 g to about 131 ml/100 g, and the polymer product may have (i) enhanced or improved mold flow, (ii) increased mold life, (iii) less abrasive compounds, (iv) longer life in dynamic environments, (v) lower crack initiation, and/or (vi) lower failure compared with a polymer product comprising a reference carbon black. The N2SA may be from about 22 $m^2/g$ to about 45 $m^2/g$ and the structure may be from about 42 ml/100 g to about 100 ml/100 g. The carbon particles may comprise less than or equal to about 0.4% oxygen. The carbon particles may comprise greater than or equal to about 99% carbon. The carbon particles may comprise less than about 0.4% hydrogen. The carbon particles may have an affinity to adsorb water from an 80% relative humidity atmosphere of less than about 0.5 ml (milliliter) of water per square meter of surface area of the carbon particles. The affinity to adsorb water from an 80% relative humidity atmosphere may be less than about 0.05 ml of water per square meter of surface area of the carbon particles. The carbon particles may have a water spreading pressure (WSP) between about 0 and about 8 $mJ/m^2$. The WSP may be less than about 5 $mJ/m^2$. The carbon particles may have a total surface acid group content of less than or equal to about 0.5 $\mu mol/m^2$.

The present disclosure also provides, for example, a polymer product, wherein the polymer product is a radiator hose, an automotive extrusion, cable flooding/insulation for medium voltage power cables, or a seal, and wherein the polymer product comprises a carbon particle with an $L_c$ greater than 3.0 nm. The carbon particle may comprise less than about 0.3% sulfur by weight. The carbon particle may comprise less than about 0.1% sulfur by weight. The carbon particle may comprise less than about 50 parts per million (ppm) sulfur by weight. The carbon particle may comprise less than or equal to about 10 ppm sulfur by weight. The carbon particle may comprise less than about 1 ppm sulfur by weight. The carbon particle may comprise less than or equal to about 0.03% ash by weight. The carbon particle may comprise less than or equal to about 0.01% ash by weight. The carbon particle may comprise less than or equal to about 5 ppm 325 mesh grit by weight. A ratio of the DBP to CDBP may be less than or equal to about 95% of a DBP to CDBP ratio of a reference carbon black. The $L_c$ may be greater than about 4 nm. The carbon particle may be a carbon black particle. The carbon particle may have d002 less than about 0.35 nm. The carbon particle may comprise less than or equal to about 0.4% oxygen by weight. The carbon particle may comprise less than about 0.4% hydrogen by weight. The carbon particle may have an affinity to adsorb water from an 80% relative humidity atmosphere of less than about 0.5 ml (milliliter) of water per square meter of surface area of the carbon particle. The affinity to adsorb water from an 80% relative humidity atmosphere may be less than about 0.05 ml of water per square meter of surface area of the carbon particle. The carbon particle may have a water spreading pressure (WSP) between about 0 and about 8 $mJ/m^2$. The WSP may be less than about 5 $mJ/m^2$. The carbon particle may have a total surface acid group content of less than or equal to about 0.5 $\mu mol/m^2$. The polymer product may comprise EPDM rubber.

These and additional embodiments are further described below.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

DETAILED DESCRIPTION

Figure 1:
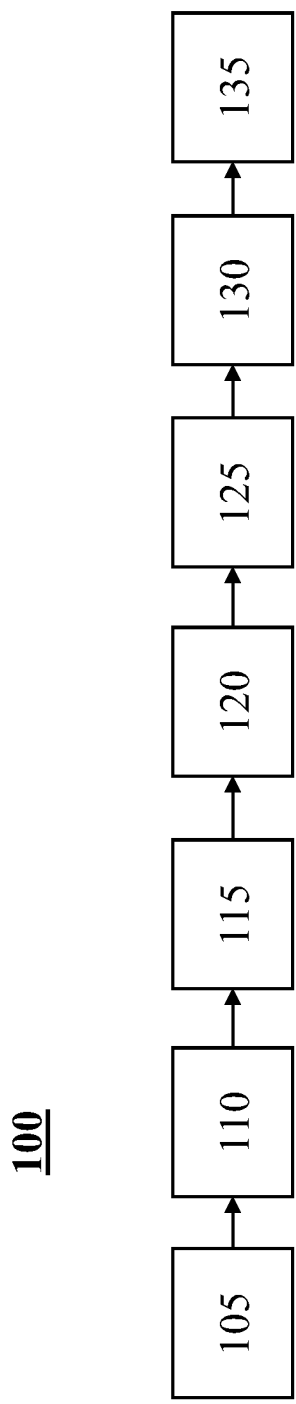
FIG. 1 shows a schematic representation of an example of a system.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed. It shall be understood that different aspects of the invention can be appreciated individually, collectively, or in combination with each other.

The present disclosure provides systems and methods for affecting chemical changes. The systems and methods described herein may use electrical energy to affect chemical changes. Affecting such chemical changes may include making particles (e.g., carbon particles, such as, for example, carbon black) using the systems and methods of the present disclosure. The chemical changes described herein may be (e.g., primarily, substantially, entirely or at least in part) affected using energy not associated or closely connected with raw materials used to convert hydrocarbon-containing materials into carbon particles (e.g., carbon black). Processes implemented with the aid of the systems and methods herein may be very promising from an ecological and efficiency perspective. For example, in the case of carbon black, the processes described herein may emit from about 5 to about 10 times less $CO_2$ than the incumbent furnace process. The processes described herein may be clean, emitting near zero local $CO_2$ and zero $SO_x$, compared to multiple tons of $CO_2$ for the furnace process with tens of kilograms of $NO_x$ and $SO_x$ for every ton of carbon black produced. The systems and methods herein may provide a more efficient, cost-reducing and/or less polluting process to replace the incumbent furnace process, converting gaseous or liquid fuels to solid carbon (e.g., solid carbon and hydrogen).

A carbon particle of the present disclosure may be a primary particle (also "carbon primary particle" herein). A carbon particle of the present disclosure may be an aggregate (also "carbon particle aggregate" and "particle aggregate" herein). The aggregate may comprise two or more (e.g., a plurality of) primary particles. The term carbon particle may refer to a primary particle, an aggregate, or both (e.g., the primary particle and the aggregate are both particles). The term particle, as used herein, may refer to a carbon particle, unless used in the context of large particle contamination. One or more aggregates may form an agglomerate (also "carbon particle agglomerate" and "particle agglomerate" herein). The agglomerate may comprise aggregates held/kept together by van der Waals forces. The term carbon particle may be used interchangeably with the term agglomerate, or may be used to refer to an agglomerate, in some contexts. Any description of carbon particles herein may equally apply to carbon particle aggregates at least in some configurations, and vice versa (e.g., in relation to degassing).

Carbon particles of the present disclosure may comprise fine particles. A fine particle may be a particle that has at least one dimension that is less than 100 nanometers (nm). A fine particle may be a particle (e.g., an aggregate) that is smaller than about 5 micrometers (microns) average size when measured in the largest dimension via scanning or transmission electron microscopy. A fine particle may be a particle for which the volume equivalent sphere possesses a diameter (also "equivalent sphere diameter" and "volume equivalent sphere diameter" herein) from (e.g., about) 1 micron to (e.g., about) 5 microns (e.g., displacement of liquid is equivalent to a 1 micron to 5 micron sphere per particle). A fine particle may be a particle for which the size as determined by DLS (e.g., hydrodynamic diameter) may be from (e.g., about) 2 micron to (e.g., about) 10 microns. The carbon particles may comprise spherical and/or ellipsoidal fine carbon particles. Spherical or ellipsoidal particles may mean singular particles and may also mean a plurality of particles that are stuck together in a fashion analogous to that of a bunch of grapes or aciniform. Carbon black may be an example of this type of fine carbon particle. The carbon particles may comprise few layer graphenes (FLG), which may comprise particles that possess two or more layers of graphene and have a shape that is best described as flat or substantially flat. The carbon particles may be substantially in disk form. A carbon particle may include a carbon nanoparticle. A carbon nanoparticle may include, for example, any particle which is 90% or greater carbon, has a surface area greater than (e.g., about) 5 square meters per gram ($m^2/g$), 10 $m^2/g$ or 15 $m^2/g$, and for which the volume equivalent sphere possesses a diameter of less than (e.g., about) 1 micron (e.g., displacement of liquid is equivalent to a 1 micron sphere or less per particle). A carbon nanoparticle may include, for example, any particle which is 90% or greater carbon, has a surface area greater than (e.g., about) 5 square meters per gram ($m^2/g$), 10 $m^2/g$ or 15 $m^2/g$, and for which the size as determined by DLS (e.g., hydrodynamic diameter) may be less than (e.g., about) 2 micron. This may comprise many different shapes including needles, tubes, plates, disks, bowls, cones, aggregated disks, few layer graphene (FLG), ellipsoidal, aggregated ellipsoidal, spheres, and aggregated spheres (e.g., carbon black), as non-limiting examples. The carbon nanoparticles may also comprise a plurality of these particle shapes. The carbon nanoparticles may comprise one or more of these particle shapes separately (e.g., a first discrete primary particle may have a first (primary) particle shape while a second discrete primary particle may have a second (primary) particle shape that is different from the first (primary) particle shape) and/or within one discrete primary particle or aggregate (e.g., for example, a given discrete primary particle may have a combination of such particle shapes). For example, the carbon nanoparticles may comprise a plurality of these particle shapes separately as well as within one discrete particle (e.g., primary particle or aggregate). At least 90% of the particles in any given sample of carbon nanoparticles on a number basis may fall within the confines of this definition of carbon nanoparticles.

The systems and methods herein may be used to produce improved particles (e.g., improved carbon particles, such as, for example, improved carbon black particles). While such particles may be described herein primarily in terms of or in the context of carbon particles, the particles of the present disclosure may include other types of particles. The carbon particles described herein may be advantageously used, for example, in paints, in coatings, in inks, and/or in elastomer composites for tires (e.g., as a filler in polymers). The carbon particles described herein may be advantageously used, for example, in industrial rubber and/or plastics applications, as described in greater detail elsewhere herein. For example, the carbon particles described herein may be advantageously used as a filler in rubber and/or plastic products. The carbon particles may include, for example, carbon black particles. The carbon particles may comprise carbonaceous pigment/colorant.

Carbon particle(s) (e.g., improved carbon particle(s), such as, for example, improved carbon black particle(s)) of the present disclosure may have a set of properties. The carbon particle(s) of the present disclosure may have a combination of properties described herein. In some examples, the particles (e.g., carbon black) may have one or more (e.g., all) of the properties described herein as made (e.g., in a one-step process).

A carbon particle (e.g. carbon black particle) may have a given shape. The particle may have a given ellipsoid factor (also "ellipsoidal factor" herein). The ellipsoidal factor may be the length of the longest dimension of the ellipse divided by the width of the ellipse as defined by a line drawn at a 90 degree angle to the length. The ellipsoid factor for furnace black primary particles is typically between 1.0 and 1.3. In some examples, the particles described herein may have a more ellipsoidal shape, such that the ellipsoid factor is greater than 1.3. The ellipsoid factor may be, for example, greater than or equal to about 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2, 2.1, 2.2, 2.3, 2.4, 2.5, 2.6, 2.7, 2.8, 2.9 or 3. Alternatively, or in addition, the ellipsoid factor may be, for example, less than or equal to about 3, 2.9, 2.8, 2.7, 2.6, 2.5, 2.4, 2.3, 2.2, 2.1, 2, 1.95, 1.9, 1.85, 1.8, 1.75, 1.7, 1.65, 1.6, 1.55, 1.5, 1.45, 1.4, 1.35, 1.3, 1.25, 1.2, 1.15, 1.1, 1.05 or 1. The carbon particle may have such shapes in combination with one or more other properties described herein.

The carbon particle(s) (e.g. carbon black particle(s)) may have given size(s) or a given size distribution. The carbon particle may be, for example, less than about 1 micron or 700 nm volume equivalent sphere diameter. The volume equivalent sphere diameter (e.g., obtained by determining volume of particle(s)/aggregate from TEM histograms) may be, for example, less than or equal to about 5 microns (μm), 4.5 μm, 4 μm, 3.5 μm, 3 μm, 2.5 μm, 2.4 μm, 2.3 μm, 2.2 μm, 2.1 μm, 2 μm, 1.9 μm, 1.8 μm, 1.7 μm, 1.6 μm, 1.5 μm, 1.4 μm, 1.3 μm, 1.2 μm, 1.1 μm, 1 μm, 0.95 μm, 0.9 μm, 0.85 μm, 0.8 μm, 0.75 μm, 0.7 μm, 0.65 μm, 0.6 μm, 0.55 μm, 0.5 μm, 0.45 μm, 0.4 μm, 0.35 μm, 0.3 μm, 0.25 μm, 0.2 μm, 0.15 μm, 0.1 μm, 90 nanometers (nm), 80 nm, 70 nm, 60 nm, 50 nm, 40 nm, 30 nm, 20 nm, 10 nm or 5 nm. Alternatively, or in addition, the volume equivalent sphere diameter (e.g., obtained by determining volume of particle(s)/aggregate from TEM histograms) may be, for example, greater than or equal to about 5 nm, 10 nm, 20 nm, 30 nm, 40 nm, 50 nm, 60 nm, 70 nm, 80 nm, 90 nm, 0.1 μm, 0.15 μm, 0.2 μm, 0.25 μm, 0.3 μm, 0.35 μm, 0.4 μm, 0.45 μm, 0.5 μm, 0.55 μm, 0.6 μm, 0.65 μm, 0.7 μm, 0.75 μm, 0.8 μm, 0.85 μm, 0.9 μm, 1 μm, 1.2 μm, 1.3 μm, 1.4 μm, 1.5 μm, 1.6 μm, 1.7 μm, 1.8 μm, 1.9 μm, 2 μm, 2.1 μm, 2.2 μm, 2.3 μm, 2.4 μm, 2.5 μm, 3 μm, 3.5 μm, 4 μm, 4.5 μm or 5 μm. Particle size may be analyzed, for example, via dynamic light scattering (DLS). The size measure provided by DLS may be different than the size measure provided by TEM. The size measure by TEM may be the volume equivalent sphere diameter. The size measure by DLS may be a hydrodynamic diameter. DLS may be used to measure particle size based upon hydrodynamic radius, which may correspond to the radius carved out if the particle were rotating infinitely fast. Z average particle size may be the hydrodynamic diameter of the particle. The Z average particle size may be the maximum diameter of the aggregate (e.g., the particle aggregate) in three dimensions (the hydrodynamic diameter). DLS analysis may provide particle size distribution by intensity and/or by volume. For example, DLS may be used to provide a size by intensity measurement. The size by intensity may in some cases be lower than the size by volume. The size by volume may in some cases be based on a measurement of the size by intensity. The size (e.g., by intensity and/or by volume) may be, for example, greater than or equal to about 5 nm, 10 nm, 15 nm, 20 nm, 25 nm, 30 nm, 35 nm, 40 nm, 45 nm, 50 nm, 75 nm, 100 nm, 105 nm, 110 nm, 113 nm, 115 nm, 120 nm, 125 nm, 150 nm, 175 nm, 200 nm, 205 nm, 210 nm, 213 nm, 216 nm, 220 nm, 225 nm, 230 nm, 235 nm, 240 nm, 245 nm, 247 nm, 250 nm, 255 nm, 260 nm, 265 nm, 270 nm, 275 nm, 280 nm, 281 nm, 285 nm, 290 nm, 295 nm, 300 nm, 303 nm, 305 nm, 310 nm, 312 nm, 315 nm, 320 nm, 323 nm, 325 nm, 328 nm, 330 nm, 332 nm, 333 nm, 335 nm, 340 nm, 345 nm, 350 nm, 355 nm, 360 nm, 370 nm, 380 nm, 390 nm, 403 nm, 410 nm, 420 nm, 430 nm, 440 nm, 450 nm, 460 nm, 470 nm, 480 nm, 490 nm, 500 nm, 550 nm, 600 nm, 650 nm, 700 nm, 750 nm, 800 nm, 850 nm, 900 nm, 950 nm, 1000 nm, 1500 nm, 2000 nm, 2500 nm, 3000 nm, 3500 nm, 4000 nm, 4500 nm, 5000 nm, 5500 nm, 6000 nm, 6500 nm, 7000 nm, 7500 nm, 8000 nm, 8500 nm, 9000 nm, 9500 nm or 10 μm. Alternatively, or in addition, the size (e.g., by intensity and/or by volume) may be, for example, less than or equal to about 10 μm, 9500 nm, 9000 nm, 8500 nm, 8000 nm, 7500 nm, 7000 nm, 6500 nm, 6000 nm, 5500 nm, 5000 nm, 4500 nm, 4000 nm, 3500 nm, 3000 nm, 2500 nm, 2000 nm, 1500 nm, 1000 nm, 950 nm, 900 nm, 850 nm, 800 nm, 750 nm, 700 nm, 650 nm, 550 nm, 500 nm, 490 nm, 480 nm, 470 nm, 460 nm, 450 nm, 440 nm, 430 nm, 420 nm, 410 nm, 403 nm, 390 nm, 380 nm, 370 nm, 360 nm, 355 nm, 350 nm, 345 nm, 340 nm, 335 nm, 333 nm, 332 nm, 330 nm, 328 nm, 325 nm, 323 nm, 320 nm, 315 nm, 312 nm, 310 nm, 305 nm, 303 nm, 300 nm, 295 nm, 290 nm, 285 nm, 281 nm, 280 nm, 275 nm, 270 nm, 265 nm, 260 nm, 255 nm, 250 nm, 247 nm, 245 nm, 240 nm, 235 nm, 230 nm, 225 nm, 220 nm, 216 nm, 213 nm, 210 nm, 205 nm, 200 nm, 175 nm, 150 nm, 125 nm, 120 nm, 115 nm, 113 nm, 110 nm, 105 nm, 100 nm, 75 nm, 50 nm, 45 nm, 40 nm, 35 nm, 30 nm, 25 nm, 20 nm, 15 nm, 10 nm or 5 nm. The particles may have such sizes in combination with one or more poly dispersion indexes provided by the DLS analysis. The poly dispersion index may be, for example, greater than or equal to about 0, 0.005, 0.010, 0.025, 0.050, 0.075, 0.100, 0.120, 0.140, 0.160, 0.180, 0.200, 0.205, 0.211, 0.215, 0.221, 0.225, 0.230, 0.234, 0.240, 0.245, 0.250, 0.275, 0.3, 0.35, 0.4, 0.45 or 0.5. Alternatively, or in addition, the poly dispersion index may be, for example, less than or equal to about 0.5, 0.45, 0.4, 0.35, 0.3, 0.275, 0.250, 0.245, 0.240, 0.234, 0.230, 0.225, 0.221, 0.215, 0.211, 0.205, 0.200, 0.180, 0.160, 0.140, 0.120, 0.100, 0.075, 0.050, 0.025, 0.010 or 0.005. In some examples, the carbon particles (e.g., carbon black) described herein may have substantially the same particle size distribution as reference carbon particles (e.g., reference carbon black). In some examples, the carbon particles (e.g., carbon black) described herein may have a lower (e.g., at least about 1%, 2%, 5%, 10%, 15%, 20%, 25%, 30%, 40%, 50%, 60%, 70%, 80%, 90%, 95% or 99% lower) poly dispersion index than that of reference carbon particles (e.g., reference carbon black), corresponding to a tighter aggregate size distribution than the reference carbon particles. In some examples, the carbon particles (e.g., carbon black) described herein may have a higher (e.g., at least about 1%, 2%, 5%, 10%, 15%, 20%, 25%, 30%, 40%, 50%, 60%, 70%, 80%, 90%, 95% or 99% higher) poly dispersion index than that of reference carbon particles (e.g., reference carbon black), corresponding to a broader aggregate size distribution than the reference carbon particles. In an example, carbon particles (e.g., carbon black) in accordance with the present disclosure with N2SA from about 23 $m^2/g$ to about 35 $m^2/g$ and DBP from about 59 ml/100 g to about 71 ml/100 g, or N2SA from about 19 $m^2/g$ to about 39 $m^2/g$ and DBP from about 55 ml/100 g to about 75 ml/100 g (e.g., N2SA of about 31 $m^2/g$ and DBP of about 65 ml/100 g) may have a size by intensity of about 216 nm, a size by volume of about 328 nm and a polydispersion index of about 0.211. In another example, carbon particles (e.g., carbon black) in accordance with the present disclosure with N2SA from about 29 $m^2/g$ to about 41 $m^2/g$ and DBP from about 84 ml/100 g to about 96 ml/100 g, or N2SA from about 25 $m^2/g$ to about 45 $m^2/g$ and DBP from about 80 ml/100 g to about 100 ml/100 g (e.g., N2SA of about 33 $m^2/g$ and DBP of about 85 ml/100 g) may have a size by intensity of about 265 nm, a size by volume of about 403 nm and a polydispersion index of about 0.221. The carbon particle may have such sizes in combination with one or more other properties described herein.

The carbon particle(s) (e.g. carbon black particle(s)) may have a given density. The density may be a true density. The true density may be determined, for example, by helium (He) pycnometry. The true density may be measured, for example in accordance with ASTM D7854 (e.g., ASTM D7854-16). In some examples, the carbon particle(s) (e.g. carbon black particle(s)) described herein may have a true density of greater than or equal to (e.g., about) 2.1 $g/cm^3$. The true density for furnace black is typically 1.8-1.9 $g/cm^3$. The true density of the carbon particle(s) (e.g., carbon black particle(s)) described herein may be, for example, greater than or equal to about 1.5 $g/cm^3$, 1.6 $g/cm^3$, 1.7 $g/cm^3$, 1.75 $g/cm^3$, 1.8 $g/cm^3$, 1.85 $g/cm^3$, 1.9 $g/cm^3$, 1.95 $g/cm^3$, 2 $g/cm^3$, 2.05 $g/cm^3$, 2.1 $g/cm^3$, 2.15 $g/cm^3$, 2.2 $g/cm^3$, 2.25 $g/cm^3$, 2.3 $g/cm^3$, 2.35 $g/cm^3$, 2.4 $g/cm^3$, 2.45 $g/cm^3$, 2.5 $g/cm^3$, 2.6 $g/cm^3$, 2.7 $g/cm^3$, 2.8 $g/cm^3$, 2.9 $g/cm^3$ or 3 $g/cm^3$. Alternatively, or in addition, the true density of the carbon particle(s) (e.g., carbon black particle(s)) described herein may be, for example, less than or equal to about 3 $g/cm^3$, 2.9 $g/cm^3$, 2.8 $g/cm^3$, 2.7 $g/cm^3$, 2.6 $g/cm^3$, 2.5 $g/cm^3$, 2.45 $g/cm^3$, 2.4 $g/cm^3$, 2.35 $g/cm^3$, 2.3 $g/cm^3$, 2.25 $g/cm^3$, 2.2 $g/cm^3$, 2.15 $g/cm^3$, 2.1 $g/cm^3$, 2.05 $g/cm^3$, 2 $g/cm^3$, 1.95 $g/cm^3$, 1.9 $g/cm^3$, 1.85 $g/cm^3$, 1.8 $g/cm^3$, 1.75 $g/cm^3$, 1.7 $g/cm^3$, 1.6 $g/cm^3$ or 1.5 $g/cm^3$. The true density of the carbon particle(s) (e.g., carbon black particle(s)) described herein may be, for example, greater than or equal to about 0%, 1%, 5%, 10%, 15%, 20%, 25%, 30%, 35%, 40%, 45%, 50%, 55%, 60%, 65%, 70%, 75%, 80%, 85%, 90%, 95% or 100% larger than the true density of a reference carbon particle (e.g., a reference carbon black). Alternatively, or in addition, the true density of the carbon particle(s) (e.g., carbon black particle(s)) described herein may be, for example, less than or equal to about 100%, 95%, 90%, 85%, 80%, 75%, 70%, 65%, 60%, 55%, 50%, 45%, 40%, 35%, 30%, 25%, 20%, 15%, 10%, 5% or 1% larger than the true density of a reference carbon particle (e.g., a reference carbon black). In some examples, the carbon particle(s) (e.g., carbon black particle(s)) may have such larger true densities when compared to furnace black (e.g., a furnace black counterpart). The carbon particle may have such true densities in combination with one or more other properties described herein.

The carbon particle(s) (e.g., carbon black particle(s)) may have a given crystallinity. The crystallinity may be expressed in terms of $L_a$ and/or $L_c$, where $L_a$ is the size of the crystalline domain in the ab plane of the graphite crystal as measured by powder diffraction X-ray crystallography, and $L_c$ is the thickness of graphene sheets or the length of the c axis of the graphite domains within the carbon primary particle (e.g., within the carbon black primary particle). Crystallinity of the carbon particle (e.g., carbon nanoparticle) may be measured, for example, via X-ray crystal diffractometry (XRD). The XRD may be, for example, powder XRD analysis (e.g., of carbon blacks). For example, Cu K alpha radiation may be used at a voltage of 40 kV (kilovolts) and a current of 44 mA (milliamps). The scan rate may be 1.3 degrees/minute from 2 theta equal 12 to 90 degrees. The 002 peak of graphite may be analyzed using the Scherrer equation to obtain $L_c$ (lattice constant (also "crystallinity" herein)) and d002 (the lattice spacing of the 002 peak of graphite) values. Larger $L_c$ values may correspond to greater degree of crystallinity. Smaller lattice spacing (d002) values may correspond to higher crystallinity or a more graphite-like lattice structure. Larger lattice spacing (d002) of, for example, 0.36 nm or larger may be indicative of turbostratic carbon (e.g., which is common for carbon black samples produced via the furnace process). In some examples, the crystallinity may be greater than about 1 nm, greater than about 4 nm, or from about 3 nm to about 20 nm in terms of $L_a$ or $L_c$. The $L_a$ and/or $L_c$ may be, for example, greater than or equal to about 0.1 nm, 0.5 nm, 1 nm, 1.1 nm, 1.2 nm, 1.3 nm, 1.4 nm, 1.5 nm, 1.6 nm, 1.7 nm, 1.8 nm, 1.9 nm, 2 nm, 2.1 nm, 2.2 nm, 2.3 nm, 2.4 nm, 2.5 nm, 2.6 nm, 2.7 nm, 2.8 nm, 2.9 nm, 3 nm, 3.1 nm, 3.2 nm, 3.3 nm, 3.4 nm, 3.5 nm, 4 nm, 4.5 nm, 5 nm, 5.5 nm, 6 nm, 6.1 nm, 6.2 nm, 6.3 nm, 6.4 nm, 6.5 nm, 6.6 nm, 6.7 nm, 6.8 nm, 6.9 nm, 7 nm, 7.1 nm, 7.2 nm, 7.3 nm, 7.4 nm, 7.5 nm, 7.6 nm, 7.7 nm, 7.8 nm, 7.9 nm, 8 nm, 8.1 nm, 8.2 nm, 8.3 nm, 8.4 nm, 8.5 nm, 8.6 nm, 8.7 nm, 8.8 nm, 8.9 nm, 9 nm, 9.1 nm, 9.2 nm, 9.3 nm, 9.4 nm, 9.5 nm, 9.6 nm, 9.7 nm, 9.8 nm, 9.9 nm, 10 nm, 10.1 nm, 10.2 nm, 10.3 nm, 10.4 nm, 10.5 nm, 10.6 nm, 10.7 nm, 10.8 nm, 10.9 nm, 11 nm, 11.1 nm, 11.2 nm, 11.3 nm, 11.4 nm, 11.5 nm, 11.6 nm, 11.7 nm, 11.8 nm, 11.9 nm, 12 nm, 12.1 nm, 12.2 nm, 12.3 nm, 12.4 nm, 12.5 nm, 12.6 nm, 12.7 nm, 12.8 nm, 12.9 nm, 13 nm, 13.1 nm, 13.2 nm, 13.3 nm, 13.4 nm, 13.5 nm, 13.6 nm, 13.7 nm, 13.8 nm, 13.9 nm, 14 nm, 14.5 nm, 15 nm, 15.5 nm, 16 nm, 16.5 nm, 17 nm, 17.5 nm, 18 nm, 18.5 nm, 19 nm, 19.5 nm or 20 nm. Alternatively, or in addition, the $L_a$ and/or $L_c$ may be, for example, less than or equal to about 20 nm, 19.5 nm, 19 nm, 18.5 nm, 18 nm, 17.5 nm, 17 nm, 16.5 nm, 16 nm, 15.5 nm, 15 nm, 14.5 nm, 14 nm, 13.9 nm, 13.8 nm, 13.7 nm, 13.6 nm, 13.5 nm, 13.4 nm, 13.3 nm, 13.2 nm, 13.1 nm, 13 nm, 12.9 nm, 12.8 nm, 12.7 nm, 12.6 nm, 12.5 nm, 12.4 nm, 12.3 nm, 12.2 nm, 12.1 nm, 12 nm, 11.9 nm, 11.8 nm, 11.7 nm, 11.6 nm, 11.5 nm, 11.4 nm, 11.3 nm, 11.2 nm, 11.1 nm, 11 nm, 10.9 nm, 10.8 nm, 10.7 nm, 10.6 nm, 10.5 nm, 10.4 nm, 10.3 nm, 10.2 nm, 10.1 nm, 10 nm, 9.9 nm, 9.8 nm, 9.7 nm, 9.6 nm, 9.5 nm, 9.4 nm, 9.3 nm, 9.2 nm, 9.1 nm, 9 nm, 8.9 nm, 8.8 nm, 8.7 nm, 8.6 nm, 8.5 nm, 8.4 nm, 8.3 nm, 8.2 nm, 8.1 nm, 8 nm, 7.9 nm, 7.8 nm, 7.7 nm, 7.6 nm, 7.5 nm, 7.4 nm, 7.3 nm, 7.2 nm, 7.1 nm, 7 nm, 6.9 nm, 6.8 nm, 6.7 nm, 6.6 nm, 6.5 nm, 6.4 nm, 6.3 nm, 6.2 nm, 6.1 nm, 6 nm, 5.5 nm, 5 nm, 4.5 nm, 4 nm, 3.5 nm, 3.4 nm, 2.7 nm, m, 3.3 nm, 3.2 nm, 3.1 nm, 3 nm, 2.9 nm, 2.8 nm, 2.6 nm, 2.5 nm, 2.4 nm, 2.3 nm, 2.2 nm, 2.1 nm, 2 nm, 1.9 nm, 1.8 nm, 1.7 nm, 1.6 nm or 1.5 nm. The d002 may be, for example, less than or equal to about 0.5 nm, 0.49 nm, 0.48 nm, 0.47 nm, 0.46 nm, 0.45 nm, 0.44 nm, 0.43 nm, 0.42 nm, 0.41 nm, 0.4 nm, 0.395 nm, 0.39 nm, 0.385 nm, 0.38 nm, 0.375 nm, 0.37 nm, 0.369 nm, 0.368 nm, 0.367 nm, 0.366 nm, 0.365 nm, 0.364 nm, 0.363 nm, 0.362 nm, 0.361 nm, 0.360 nm, 0.359 nm, 0.358 nm, 0.357 nm, 0.356 nm, 0.355 nm, 0.354 nm, 0.353 nm, 0.352 nm, 0.351 nm, 0.350 nm, 0.349 nm, 0.348 nm, 0.347 nm, 0.346 nm, 0.345 nm, 0.344 nm, 0.343 nm, 0.342 nm, 0.341 nm, 0.340 nm, 0.339 nm, 0.338 nm, 0.337 nm, 0.336 nm, 0.335 nm, 0.334 nm, 0.333 nm or 0.332 nm. Alternatively, or in addition, the d002 may be, for example, greater than or equal to about 0.332 nm, 0.333 nm, 0.334 nm, 0.335 nm, 0.336 nm, 0.337 nm, 0.338 nm, 0.339 nm, 0.340 nm, 0.341 nm, 0.342 nm, 0.343 nm, 0.344 nm, 0.345 nm, 0.346 nm, 0.347 nm, 0.348 nm, 0.349 nm, 0.350 nm, 0.351 nm, 0.352 nm, 0.353 nm, 0.354 nm, 0.355 nm, 0.356 nm, 0.357 nm, 0.358 nm, 0.359 nm, 0.360 nm, 0.361 nm, 0.362 nm, 0.363 nm, 0.364 nm, 0.365 nm, 0.366 nm, 0.367 nm, 0.368 nm, 0.369 nm, 0.37 nm, 0.375 nm, 0.38 nm, 0.385 nm, 0.39 nm, 0.395 nm, 0.4 nm, 0.41 nm, 0.42 nm, 0.43 nm, 0.44 nm, 0.45 nm, 0.46 nm, 0.47 nm, 0.48 nm or 0.49 nm. In some examples, the carbon particle(s) may have an $L_c$ greater than about 3.0 nanometers (nm) and/or a d002 of less than about 0.35 nm. In some examples, as produced particles may have an $L_c$ of greater than 3.5 nm and a d002 of less than about 0.36 nm. In some examples, the carbon particle(s) may have an $L_c$ greater than about 4.0 nm and/or a d002 of less than about 0.35 nm or 36 nm. The carbon particle(s) may have such crystallinities in combination with one or more other properties described herein.

The carbon particle(s) (e.g., carbon black) may have given surface functionality. For example, the carbon particle(s) may have a given (surface) hydrophilic content, a given hydrogen content, and/or other surface characteristics.

The carbon particle(s) (e.g., carbon black particle(s)) may have a given (surface) hydrophilic content. Hydrophilic character may be derived, for example, from gas adsorption analysis (e.g., gas adsorption followed by data integration to determine water spreading pressure). The surface (e.g., hydrophilic) content may be expressed, for example, in terms of affinity to adsorb water, in terms of water spreading pressure (WSP) and/or through other metrics (e.g., Boehm titration). WSP may be determined by measuring the mass increase in a controlled atmosphere where the relative humidity (RH) is increased slowly over time from 0 to 80% relative humidity and WSP ($\pi^e$) is determined in accordance with the equation $\pi^e = RT/A \int_0^{P_0} H_2O(moles/g)\, d \ln P$, where R is the gas constant, T is the temperature, A is the $N_2$ surface area (SA) (ASTM D6556) of the sample, $H_2O$ is the amount of water adsorbed to the carbon surface at the various RHs, P is the partial pressure of water in the atmosphere and $P_0$ is the saturation pressure. The equilibrium adsorption may be measured at various discrete RHs and then the area under the curve may be measured to yield the WSP value. Samples may be measured at 25° C. using a 3Flex system from Micromeritics. The region being integrated may be from 0 to saturation pressure. The d may have its normal indication of integrating at whatever incremental unit is after the d, i.e., integrating at changing natural log of pressure. See, for example, U.S. Pat. No. 8,501,148 ("COATING COMPOSITION INCORPORATING A LOW STRUCTURE CARBON BLACK AND DEVICES FORMED THEREWITH"), which is entirely incorporated herein by reference. In some examples, the hydrophilic content of the surface of the carbon particle (e.g., of the improved carbon black), for example, as described by affinity to adsorb water from an 80% relative humidity atmosphere, may be less than 0.05 to 0.5 ml (milliliter) of water for every $m^2$ (square meter) of (e.g., carbon black) surface area. In some examples, the WSP of the carbon particles (e.g., improved carbon black) made in the processes described herein may be between about 0 and about 8 $mJ/m^2$. This is lower than the typical range of furnace made carbon black of about 5 to about 20 $mJ/m^2$. In some examples, the WSP of the carbon particles made in the processes described herein may be less than about 5 mJ/m$^2$. The affinity to adsorb water from an 80% relative humidity atmosphere may be, for example, less than or equal to about 1 ml/m$^2$, 0.9 ml/m$^2$, 0.8 ml/m$^2$, 0.7 ml/m$^2$, 0.6 ml/m$^2$, 0.5 ml/m$^2$, 0.45 ml/m$^2$, 0.4 ml/m$^2$, 0.35 ml/m$^2$, 0.3 ml/m$^2$, 0.25 ml/m$^2$, 0.2 ml/m$^2$, 0.15 ml/m$^2$, 0.1 ml/m$^2$, 0.05 ml/m$^2$, 0.01 ml/m$^2$ or 0.005 ml/m$^2$. Alternatively, or in addition, the affinity to adsorb water from an 80% relative humidity atmosphere may be, for example, greater than or equal to about 0.005 ml/m$^2$, 0.01 ml/m$^2$, 0.05 ml/m$^2$, 0.1 ml/m$^2$, 0.15 ml/m$^2$, 0.2 ml/m$^2$, 0.25 ml/m$^2$, 0.3 ml/m$^2$, 0.35 ml/m$^2$, 0.4 ml/m$^2$, 0.45 ml/m$^2$, 0.5 ml/m$^2$, 0.6 ml/m$^2$, 0.7 ml/m$^2$, 0.8 ml/m$^2$, 0.9 ml/m$^2$ or 1 ml/m$^2$. The WSP may be, for example, less than or equal to about 40 mJ/m$^2$, 35 mJ/m$^2$, 30 mJ/m$^2$, 29 mJ/m$^2$, 28 mJ/m$^2$, 27 mJ/m$^2$, 26 mJ/m$^2$, 25 mJ/m$^2$, 24 mJ/m$^2$, 23 mJ/m$^2$, 22 mJ/m$^2$, 21 mJ/m$^2$, 20 mJ/m$^2$, 19 mJ/m$^2$, 18 mJ/m$^2$, 17 mJ/m$^2$, 16 mJ/m$^2$, 15 mJ/m$^2$, 14 mJ/m$^2$, 13 mJ/m$^2$, 12 mJ/m$^2$, 11 mJ/m$^2$, 10 mJ/m$^2$, 9 mJ/m$^2$, 8 mJ/m$^2$, 7 mJ/m$^2$, 6 mJ/m$^2$, 5 mJ/m$^2$, 4.5 mJ/m$^2$, 4 mJ/m$^2$, 3.5 mJ/m$^2$, 3 mJ/m$^2$, 2.5 mJ/m$^2$, 2 mJ/m$^2$, 1.5 mJ/m$^2$, 1 mJ/m$^2$, 0.5 mJ/m$^2$ or 0.25 mJ/m$^2$. Alternatively, or in addition, the WSP may be, for example, greater than or equal to about 0 mJ/m$^2$, 0.25 mJ/m$^2$, 0.5 mJ/m$^2$, 1 mJ/m$^2$, 1.5 mJ/m$^2$, 2 mJ/m$^2$, 2.5 mJ/m$^2$, 3 mJ/m$^2$, 3.5 mJ/m$^2$, 4 mJ/m$^2$, 4.5 mJ/m$^2$, 5 mJ/m$^2$, 6 mJ/m$^2$, 7 mJ/m$^2$, 8 mJ/m$^2$, 9 mJ/m$^2$, 10 mJ/m$^2$, 11 mJ/m$^2$, 12 mJ/m$^2$, 13 mJ/m$^2$, 14 mJ/m$^2$, 15 mJ/m$^2$, 16 mJ/m$^2$, 17 mJ/m$^2$, 18 mJ/m$^2$, 19 mJ/m$^2$, 20 mJ/m$^2$, 21 mJ/m$^2$, 22 mJ/m$^2$, 23 mJ/m$^2$, 24 mJ/m$^2$, 25 mJ/m$^2$, 26 mJ/m$^2$, 27 mJ/m$^2$, 28 mJ/m$^2$, 29 mJ/m$^2$, 30 mJ/m$^2$, 35 mJ/m$^2$ or 40 mJ/m$^2$. The carbon particle(s) may have such hydrophilic contents in combination with one or more other properties described herein.

Another method to obtain information as to the functionality at the surface may be to perform titrations as documented by Boehm. See, for example, Boehm, HP "Some Aspects of Surface Chemistry of Carbon Blacks and Other Carbons," Carbon, 1994, page 759, which is entirely incorporated herein by reference. WSP may be a good parameter to measure general hydrophilicity of carbon particles (e.g., carbon black); however WSP may not provide the ratio of functional groups at the surface as can in some cases be measured through thermal phase desorption (TPD), through X-ray photoelectron spectroscopy (XPS), or via titration methods (e.g., Boehm titration).

The carbon particle(s) (e.g., carbon black particle(s)) may have a given surface acid group content. The content of acidic groups may be determined using, for example, Boehm titration for functional groups. The Boehm titration may be accomplished through exposure of the surface of the carbon particles (e.g., carbon black surface) to basic solution. The basic solution may then be acidified and back titrated with strongly basic solution. In some examples, total surface acid group content may be less than or equal to about 0.5 μmol/m$^2$. Surface acid group content (e.g., total, strong acid and/or weak acid content) may be, for example, less than or equal to about 5 μmol/m$^2$, 4 μmol/m$^2$, 3 μmol/m$^2$, 2 μmol/m$^2$, 1.5 μmol/m$^2$, 1.4 μmol/m$^2$, 1.3 μmol/m$^2$, 1.2 μmol/m$^2$, 1.189 μmol/m$^2$, 1.1 μmol/m$^2$, 1 μmol/m$^2$, 0.095 μmol/m$^2$, 0.9 μmol/m$^2$, 0.863 μmol/m$^2$, 0.8 μmol/m$^2$, 0.767 μmol/m$^2$, 0.7 μmol/m$^2$, 0.6 μmol/m$^2$, 0.5 μmol/m$^2$, 0.424 μmol/m$^2$, 0.4 μmol/m$^2$, 0.375 μmol/m$^2$, 0.3 μmol/m$^2$, 0.2 μmol/m$^2$, 0.1 μmol/m$^2$, 0.05 μmol/m$^2$ or 0.01 μmol/m$^2$. Alternatively, or in addition, the surface acid group content (e.g., total, strong acid and/or weak acid content) may be, for example, greater than or equal to about 0 μmol/m$^2$, 0.01 μmol/m$^2$, 0.05 μmol/m$^2$, 0.1 μmol/m$^2$, 0.2 μmol/m$^2$, 0.3 μmol/m$^2$, 0.375 μmol/m$^2$, 0.4 μmol/m$^2$, 0.424 μmol/m$^2$, 0.5 μmol/m$^2$, 0.6 μmol/m$^2$, 0.7 μmol/m$^2$, 0.767 μmol/m$^2$, 0.8 μmol/m$^2$, 0.863 μmol/m$^2$, 0.9 μmol/m$^2$, 0.095 μmol/m$^2$, 1 μmol/m$^2$, 1.1 μmol/m$^2$, 1.189 μmol/m$^2$, 1.2 μmol/m$^2$, 1.3 μmol/m$^2$, 1.4 μmol/m$^2$, 1.5 μmol/m$^2$, 2 μmol/m$^2$, 3 μmol/m$^2$ or 4 μmol/m$^2$. The acidic groups may be weak acidic groups (e.g., phenol, quinone, etc.). Strong acidic groups may or may not be present (e.g., substantially no strong acidic groups may be present).

The carbon particle(s) (e.g., carbon black particle(s)) may have a given moisture content. The moisture content may be measured, for example, in accordance with ASTM D1509. The moisture content may be, for example, less than about 0.5%. The moisture content (e.g., by weight) may be, for example, less than or equal to about 5%, 4.5%, 4%, 3.5%, 3%, 2.8%, 2.6%, 2.4%, 2.2%, 2%, 1.95%, 1.9%, 1.85%, 1.8%, 1.75%, 1.7%, 1.65%, 1.6%, 1.55%, 1.5%, 1.45%, 1.4%, 1.35%, 1.3%, 1.25%, 1.2%, 1.15%, 1.1%, 1%, 0.95%, 0.9%, 0.87%, 0.85%, 0.8%, 0.75%, 0.7%, 0.68%, 0.65%, 0.6%, 0.58%, 0.56%, 0.54%, 0.52%, 0.5%, 0.48%, 0.46%, 0.44%, 0.42%, 0.4%, 0.38%, 0.36%, 0.34%, 0.32%, 0.3%, 0.29%, 0.28%, 0.26%, 0.24%, 0.23%, 0.22%, 0.21%, 0.2%, 0.19%, 0.18%, 0.17%, 0.16%, 0.15%, 0.14%, 0.13%, 0.12%, 0.11%, 0.1%, 0.05%, 0.01% or 0.005%. Alternatively, or in addition, the moisture content (e.g., by weight) may be, for example, greater than or equal to about 0%, 0.005%, 0.01%, 0.05%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.26%, 0.28%, 0.29%, 0.3%, 0.32%, 0.34%, 0.36%, 0.38%, 0.4%, 0.42%, 0.44%, 0.46%, 0.48%, 0.5%, 0.52%, 0.54%, 0.56%, 0.58%, 0.6%, 0.65%, 0.68%, 0.7%, 0.75%, 0.8%, 0.85%, 0.87%, 0.9%, 0.95%, 1%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.2%, 2.4%, 2.6%, 2.8%, 3%, 3.5%, 4% or 4.5%. The carbon particle(s) may have such moisture contents in combination with one or more other properties described herein.

The carbon particle(s) (e.g., carbon black particle(s)) may have a given oxygen content. In some examples, the oxygen content may be less than about 0.2% by weight oxygen, or about 0.4% oxygen or less by weight as produced. The oxygen content (e.g., as percent of total sample and/or by weight oxygen) may be, for example, less than or equal to about 25%, 20%, 15%, 10%, 8%, 6%, 5%, 4.5%, 4%, 3.5%, 3%, 2.8%, 2.6%, 2.4%, 2.2%, 2%, 1.95%, 1.9%, 1.85%, 1.8%, 1.75%, 1.7%, 1.65%, 1.6%, 1.55%, 1.5%, 1.45%, 1.4%, 1.35%, 1.3%, 1.25%, 1.2%, 1.15%, 1.1%, 1%, 0.95%, 0.9%, 0.87%, 0.85%, 0.8%, 0.75%, 0.7%, 0.68%, 0.65%, 0.6%, 0.58%, 0.56%, 0.54%, 0.52%, 0.5%, 0.48%, 0.46%, 0.44%, 0.42%, 0.4%, 0.38%, 0.36%, 0.34%, 0.32%, 0.3%, 0.29%, 0.28%, 0.26%, 0.24%, 0.23%, 0.22%, 0.21%, 0.2%, 0.19%, 0.18%, 0.17%, 0.16%, 0.15%, 0.14%, 0.13%, 0.12%, 0.11%, 0.1%, 0.05%, 0.01% or 0.005%. Alternatively, or in addition, the oxygen content (e.g., as percent of total sample and/or by weight oxygen) may be, for example, greater than or equal to about 0%, 0.005%, 0.01%, 0.05%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.26%, 0.28%, 0.29%, 0.3%, 0.32%, 0.34%, 0.36%, 0.38%, 0.4%, 0.42%, 0.44%, 0.46%, 0.48%, 0.5%, 0.52%, 0.54%, 0.56%, 0.58%, 0.6%, 0.65%, 0.68%, 0.7%, 0.75%, 0.8%, 0.85%, 0.87%, 0.9%, 0.95%, 1%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.2%, 2.4%, 2.6%, 2.8%, 3%, 3.5%, 4%, 4.5%, 5%, 6%, 8%, 10%, 15% or 20%.

The carbon particle(s) may have such oxygen contents in combination with one or more other properties described herein.

The carbon particle(s) (e.g., carbon black particle(s)) may have a given hydrogen content. The hydrogen content may be, for example, less than about 0.4%, or about 0.2% hydrogen or less by weight as produced. The hydrogen content (e.g., as percent of total sample and/or by weight as produced) may be, for example, less than or equal to about 5%, 4%, 3%, 2%, 1%, 0.95%, 0.9%, 0.85%, 0.8%, 0.75%, 0.7%, 0.65%, 0.6%, 0.55%, 0.5%, 0.45%, 0.4%, 0.39%, 0.38%, 0.37%, 0.36%, 0.35%, 0.34%, 0.33%, 0.32%, 0.31%, 0.3%, 0.29%, 0.28%, 0.27%, 0.26%, 0.25%, 0.24%, 0.23%, 0.22%, 0.21%, 0.2%, 0.19%, 0.18%, 0.17%, 0.16%, 0.15%, 0.14%, 0.13%, 0.12%, 0.11%, 0.1%, 0.09%, 0.08%, 0.07%, 0.06%, 0.05%, 0.04%, 0.03%, 0.02%, 0.01%, 0.005% or 0.001%. Alternatively, or in addition, the hydrogen content (e.g., as percent of total sample and/or by weight as produced) may be, for example, greater than or equal to about 0%, 0.001%, 0.005%, 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.31%, 0.32%, 0.33%, 0.34%, 0.35%, 0.36%, 0.37%, 0.38%, 0.39%, 0.4%, 0.45%, 0.5%, 0.55%, 0.6%, 0.65%, 0.7%, 0.75%, 0.8%, 0.85%, 0.9%, 0.95%, 1%, 2%, 3%, 4% or 5%. The carbon particle(s) may have such hydrogen contents in combination with one or more other properties described herein.

In some examples, the carbon particle(s)s (e.g., carbon black particle(s)s) of the present disclosure may have a WSP between about 0 and about 5 mJ/m$^2$, and contain less than about 0.4% by weight hydrogen and less than about 0.5% by weight oxygen.

The carbon particle(s) (e.g., carbon black particle(s)) may have a given sulfur content. The sulfur content may be, for example, about 0.3%, 50 ppm, 10 ppm, 5 ppm or 1 ppm sulfur or less by weight as produced. The sulfur content (e.g., as percent of total sample and/or by weight as produced) may be, for example, less than or equal to about 5%, 4%, 3.5%, 3%, 2.9%, 2.8%, 2.7%, 2.6%, 2.5%, 2.4%, 2.3%, 2.2%, 2.1%, 2%, 1.95%, 1.9%, 1.85%, 1.8%, 1.75%, 1.7%, 1.65%, 1.6%, 1.57%, 1.55%, 1.5%, 1.45%, 1.4%, 1.35%, 1.3%, 1.25%, 1.2%, 1.15%, 1.1%, 1.05%, 1%, 0.95%, 0.9%, 0.85%, 0.8%, 0.75%, 0.7%, 0.65%, 0.6%, 0.55%, 0.5%, 0.45%, 0.4%, 0.39%, 0.38%, 0.37%, 0.36%, 0.35%, 0.34%, 0.33%, 0.32%, 0.31%, 0.3%, 0.29%, 0.28%, 0.27%, 0.26%, 0.25%, 0.24%, 0.23%, 0.22%, 0.21%, 0.2%, 0.19%, 0.18%, 0.17%, 0.16%, 0.15%, 0.14%, 0.13%, 0.12%, 0.11%, 0.1%, 0.09%, 0.08%, 0.07%, 0.06%, 0.05%, 0.04%, 0.03%, 0.02%, 0.01%, 50 ppm, 45 ppm, 40 ppm, 35 ppm, 30 ppm, 25 ppm, 20 ppm, 15 ppm, 10 ppm, 5 ppm, 1 ppm, 0.5 ppm or 0.1 ppm. Alternatively, or in addition, the sulfur content (e.g., as percent of total sample and/or by weight as produced) may be, for example, greater than or equal to about 0 ppm, 0.1 ppm, 0.5 ppm, 1 ppm, 5 ppm, 10 ppm, 15 ppm, 20 ppm, 25 ppm, 30 ppm, 35 ppm, 40 ppm, 45 ppm, 50 ppm, 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.31%, 0.32%, 0.33%, 0.34%, 0.35%, 0.36%, 0.37%, 0.38%, 0.39%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.57%, 1.6%, 1.65%, 1.7%, 1.75%, 1.8%, 1.85%, 1.9%, 1.95%, 2%, 2.1%, 2.2%, 2.3%, 2.4%, 2.5%, 2.6%, 2.7%, 2.8%, 2.9%, 3%, 3.5% or 4%. The carbon particle(s) may have such sulfur contents in combination with one or more other properties described herein.

The carbon particle(s) (e.g., carbon black particle(s)) may have a given nitrogen content. The nitrogen content (e.g., as percent of total sample and/or by weight as produced) may be, for example, less than or equal to about 5%, 4%, 3.5%, 3%, 2.9%, 2.8%, 2.7%, 2.6%, 2.5%, 2.4%, 2.3%, 2.2%, 2.1%, 2%, 1.95%, 1.9%, 1.85%, 1.8%, 1.75%, 1.7%, 1.65%, 1.6%, 1.57%, 1.55%, 1.5%, 1.45%, 1.4%, 1.35%, 1.3%, 1.25%, 1.2%, 1.15%, 1.1%, 1.05%, 1%, 0.95%, 0.9%, 0.85%, 0.8%, 0.75%, 0.7%, 0.65%, 0.6%, 0.55%, 0.5%, 0.45%, 0.4%, 0.39%, 0.38%, 0.37%, 0.36%, 0.35%, 0.34%, 0.33%, 0.32%, 0.31%, 0.3%, 0.29%, 0.28%, 0.27%, 0.26%, 0.25%, 0.24%, 0.23%, 0.22%, 0.21%, 0.2%, 0.19%, 0.18%, 0.17%, 0.16%, 0.15%, 0.14%, 0.13%, 0.12%, 0.11%, 0.1%, 0.09%, 0.08%, 0.07%, 0.06%, 0.05%, 0.04%, 0.03%, 0.02%, 0.01%, 0.005% or 0.001%. Alternatively, or in addition, the nitrogen content (e.g., as percent of total sample and/or by weight as produced) may be, for example, greater than or equal to about 0%, 0.001%, 0.005%, 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.31%, 0.32%, 0.33%, 0.34%, 0.35%, 0.36%, 0.37%, 0.38%, 0.39%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.57%, 1.6%, 1.65%, 1.7%, 1.75%, 1.8%, 1.85%, 1.9%, 1.95%, 2%, 2.1%, 2.2%, 2.3%, 2.4%, 2.5%, 2.6%, 2.7%, 2.8%, 2.9%, 3%, 3.5%, 4% or 5%. The carbon particle(s) may have such nitrogen contents in combination with one or more other properties described herein.

The carbon particle(s) (e.g., carbon black particle(s)) may have a given carbon content. In some examples, the carbon content may be greater than or equal to about 99% carbon by weight as produced. The carbon content (e.g., as percent of total sample and/or by weight as produced) may be, for example, greater than or equal to about 50%, 75%, 90%, 91%, 92%, 93%, 94%, 95%, 95.1%, 95.2%, 95.3%, 95.4%, 95.5%, 95.6%, 95.7%, 95.8%, 95.9%, 96%, 96.1%, 96.2%, 96.3%, 96.4%, 96.5%, 96.6%, 96.7%, 96.8%, 96.9%, 97%, 97.1%, 97.2%, 97.3%, 97.4%, 97.5%, 97.6%, 97.7%, 97.8%, 97.9%, 98%, 98.1%, 98.2%, 98.3%, 98.4%, 98.5%, 98.6%, 98.7%, 98.9%, 99%, 99.1%, 99.2%, 99.3%, 99.4%, 99.5%, 99.6%, 99.7%, 99.8%, 99.9%, 99.99% or 99.999%. Alternatively, or in addition, the carbon content (e.g., as percent of total sample and/or by weight as produced) may be, for example, less than or equal to about 100%, 99.999%, 99.99%, 99.9%, 99.8%, 99.7%, 99.6%, 99.5%, 99.4%, 99.3%, 99.2%, 99.1%, 99%, 98.9%, 98.8%, 98.7%, 98.6%, 98.5%, 98.4%, 98.3%, 98.2%, 98.1%, 98%, 97.9%, 97.8%, 97.7%, 97.6%, 97.5%, 97.4%, 97.3%, 97.2%, 97.1%, 97%, 96.9%, 96.8%, 96.7%, 96.6%, 96.5%, 96.4%, 96.3%, 96.2%, 96.1%, 96%, 95.9%, 95.8%, 95.7%, 95.6%, 95.5%, 95.4%, 95.3%, 95.2%, 95.1%, 95%, 94%, 93%, 92%, 91% or 90%. The carbon particle(s) may have such carbon contents in combination with one or more other properties described herein.

Elemental analysis may be measured, for example, via devices manufactured by Leco (e.g., the 744 and 844 series products), and results may be given as percentage of the total sample (e.g., mass percent).

The carbon particle(s) (e.g., carbon black particle(s)) may have a given surface area. Surface area may refer to, for example, nitrogen surface area (N2SA) (e.g., nitrogen-based Brunauer-Emmett-Teller (BET) surface area) and/or statistical thickness surface area (STSA). The N2SA (also "NSA" herein) and STSA may be measured via ASTM D6556 (e.g., ASTM D6556-10). In some examples, the surface area, excluding pores that are internal to the primary particles, may be from about 10 m$^2$/g (square meters per gram) up to about 300 m$^2$/g. In some examples, the surface area, excluding pores that are internal to the primary particles, may be from about 15 m$^2$/g up to about 300 m$^2$/g. In some examples, the nitrogen surface area and/or the STSA of the resultant carbon particles (e.g., carbon black) may be between 15 and 150 m$^2$/g. The surface areas described herein may refer to surface area excluding (internal) porosity (e.g., excluding pores that are internal to the primary particles, excluding porous surface area due to any internal pores). The surface area for thermal black primary particles is typically less than 13 m$^2$/g. The surface area (e.g., N2SA and/or STSA) may be, for example, greater than or equal to about 5 m$^2$/g, 10 m$^2$/g, 11 m$^2$/g, 12 m$^2$/g, 13 m$^2$/g, 14 m$^2$/g, 15 m$^2$/g, 16 m$^2$/g, 17 m$^2$/g, 18 m$^2$/g, 19 m$^2$/g, 20 m$^2$/g, 21 m$^2$/g, 22 m$^2$/g, 23 m$^2$/g, 24 m$^2$/g, 25 m$^2$/g, 26 m$^2$/g, 27 m$^2$/g, 28 m$^2$/g, 29 m$^2$/g, 30 m$^2$/g, 31 m$^2$/g, 32 m$^2$/g, 33 m$^2$/g, 34 m$^2$/g, 35 m$^2$/g, 36 m$^2$/g, 37 m$^2$/g, 38 m$^2$/g, 39 m$^2$/g, 40 m$^2$/g, 41 m$^2$/g, 42 m$^2$/g, 43 m$^2$/g, 44 m$^2$/g, 45 m$^2$/g, 46 m$^2$/g, 47 m$^2$/g, 48 m$^2$/g, 49 m$^2$/g, 50 m$^2$/g, 51 m$^2$/g, 52 m$^2$/g, 54 m$^2$/g, 55 m$^2$/g, 56 m$^2$/g, 60 m$^2$/g, 61 m$^2$/g, 63 m$^2$/g, 65 m$^2$/g, 70 m$^2$/g, 72 m$^2$/g, 75 m$^2$/g, 79 m$^2$/g, 80 m$^2$/g, 81 m$^2$/g, 85 m$^2$/g, 90 m$^2$/g, 95 m$^2$/g, 100 m$^2$/g, 105 m$^2$/g, 110 m$^2$/g, 111 m$^2$/g, 112 m$^2$/g, 113 m$^2$/g, 114 m$^2$/g, 115 m$^2$/g, 116 m$^2$/g, 117 m$^2$/g, 118 m$^2$/g, 119 m$^2$/g, 120 m$^2$/g, 121 m$^2$/g, 123 m$^2$/g, 125 m$^2$/g, 130 m$^2$/g, 135 m$^2$/g, 138 m$^2$/g, 140 m$^2$/g, 145 m$^2$/g, 150 m$^2$/g, 160 m$^2$/g, 170 m$^2$/g, 180 m$^2$/g, 190 m$^2$/g, 200 m$^2$/g, 210 m$^2$/g, 220 m$^2$/g, 230 m$^2$/g, 240 m$^2$/g, 250 m$^2$/g, 260 m$^2$/g, 270 m$^2$/g, 280 m$^2$/g, 290 m$^2$/g, 300 m$^2$/g, 310 m$^2$/g, 320 m$^2$/g, 330 m$^2$/g, 340 m$^2$/g, 350 m$^2$/g, 360 m$^2$/g, 370 m$^2$/g, 380 m$^2$/g, 390 m$^2$/g or 400 m$^2$/g. Alternatively, or in addition, the surface area (e.g., N2SA and/or STSA) may be, for example, less than or equal to about 400 m$^2$/g, 390 m$^2$/g, 380 m$^2$/g, 370 m$^2$/g, 360 m$^2$/g, 350 m$^2$/g, 340 m$^2$/g, 330 m$^2$/g, 320 m$^2$/g, 310 m$^2$/g, 300 m$^2$/g, 290 m$^2$/g, 280 m$^2$/g, 270 m$^2$/g, 260 m$^2$/g, 250 m$^2$/g, 240 m$^2$/g, 230 m$^2$/g, 220 m$^2$/g, 210 m$^2$/g, 200 m$^2$/g, 190 m$^2$/g, 180 m$^2$/g, 170 m$^2$/g, 160 m$^2$/g, 150 m$^2$/g, 145 m$^2$/g, 140 m$^2$/g, 138 m$^2$/g, 135 m$^2$/g, 130 m$^2$/g, 125 m$^2$/g, 123 m$^2$/g, 121 m$^2$/g, 120 m$^2$/g, 119 m$^2$/g, 118 m$^2$/g, 117 m$^2$/g, 116 m$^2$/g, 115 m$^2$/g, 114 m$^2$/g, 113 m$^2$/g, 112 m$^2$/g, 111 m$^2$/g, 110 m$^2$/g, 105 m$^2$/g, 100 m$^2$/g, 95 m$^2$/g, 90 m$^2$/g, 85 m$^2$/g, 81 m$^2$/g, 80 m$^2$/g, 79 m$^2$/g, 75 m$^2$/g, 72 m$^2$/g, 70 m$^2$/g, 65 m$^2$/g, 63 m$^2$/g, 61 m$^2$/g, 60 m$^2$/g, 56 m$^2$/g, 55 m$^2$/g, 54 m$^2$/g, 52 m$^2$/g, 51 m$^2$/g, 50 m$^2$/g, 49 m$^2$/g, 48 m$^2$/g, 47 m$^2$/g, 46 m$^2$/g, 45 m$^2$/g, 44 m$^2$/g, 43 m$^2$/g, 42 m$^2$/g, 41 m$^2$/g, 40 m$^2$/g, 39 m$^2$/g, 38 m$^2$/g, 37 m$^2$/g, 36 m$^2$/g, 35 m$^2$/g, 34 m$^2$/g, 33 m$^2$/g, 32 m$^2$/g, 31 m$^2$/g, 30 m$^2$/g, 29 m$^2$/g, 28 m$^2$/g, 27 m$^2$/g, 26 m$^2$/g, 25 m$^2$/g, 24 m$^2$/g, 23 m$^2$/g, 22 m$^2$/g, 21 m$^2$/g, 20 m$^2$/g, 19 m$^2$/g, 18 m$^2$/g, 17 m$^2$/g, 16 m$^2$/g, 15 m$^2$/g, 14 m$^2$/g, 13 m$^2$/g, 12 m$^2$/g, 11 m$^2$/g, 10 m$^2$/g or 5 m$^2$/g. The STSA and N2SA may differ. The difference may be expressed in terms of an STSA/N2SA ratio. The STSA/N2SA ratio may be, for example, greater than or equal to about 0.4, 0.5, 0.6, 0.7, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.03, 1.05, 1.06, 1.07, 1.08, 1.09, 1.1, 1.11, 1.12, 1.13, 1.14, 1.15, 1.16, 1.17, 1.19, 1.20, 1.21, 1.22, 1.23, 1.24, 1.25, 1.26, 1.27, 1.28, 1.29, 1.3, 1.31, 1.32, 1.33, 1.34, 1.35, 1.37, 1.38, 1.39, 1.4, 1.45, 1.5, 1.6, 1.7, 1.8, 1.9 or 2. Alternatively, or in addition, the STSA/N2SA ratio may be, for example, less than or equal to about 2, 1.9, 1.8, 1.7, 1.6, 1.5, 1.45, 1.4, 1.39, 1.38, 1.37, 1.36, 1.35, 1.34, 1.33, 1.32, 1.31, 1.3, 1.29, 1.28, 1.27, 1.26, 1.25, 1.24, 1.23, 1.22, 1.21, 1.2, 1.19, 1.18, 1.17, 1.16, 1.15, 1.14, 1.13, 1.12, 1.11, 1.1, 1.09, 1.08, 1.07, 1.06, 1.05, 1.04, 1.03, 1.02, 1.01, 1, 0.99, 0.98, 0.97, 0.96, 0.95, 0.94, 0.93, 0.92, 0.91, 0.9, 0.89, 0.88, 0.87, 0.86, 0.85, 0.84, 0.83, 0.82, 0.81, 0.8, 0.79, 0.78, 0.77, 0.76, 0.75, 0.7, 0.6 or 0.5. In some examples, the surface area (e.g., N2SA) may be from about 23 m$^2$/g to about 35 m$^2$/g, from about 24 m$^2$/g to about 32 m$^2$/g, from about 29 m$^2$/g to about 41 m$^2$/g, from about 25 m$^2$/g to about 45 m$^2$/g, from about 34 m$^2$/g to about 46 m$^2$/g, from about 30 m$^2$/g to about 50 m$^2$/g, from about 15 m$^2$/g to about 25 m$^2$/g, or from about 10 m$^2$/g to about 30 m$^2$/g. The carbon particle(s) may have such surface areas in combination with one or more other properties described herein.

The carbon particles (e.g., carbon black particles) may have a given structure. The structure may be expressed in terms of dibutyl phthalate (DBP) absorption, which measures the relative structure of carbon particles (e.g., carbon black) by determining the amount of DBP a given mass of carbon particles (e.g., carbon black) can absorb before reaching a specified visco-rheologic target torque. In the case of carbon black, thermal blacks have the lowest DBP numbers (32-47 ml/100 g) of any carbon black, indicating very little particle aggregation or structure. The structure may be expressed in terms of compressed dibutyl phthalate (CDBP) absorption, which measures the relative structure of carbon particles (e.g., carbon black) by determining the amount of DBP a given mass of crushed carbon particles (e.g., carbon black) can absorb before reaching a specified visco-rheologic target torque. The term structure may be used interchangeably with the term DBP and/or CDBP (e.g., a high structure material possesses a high DBP value). The structures described herein may refer to structure after pelletization (e.g., post-pelletized DBP and/or CDBP). DBP absorption (also "DBP" herein) may be measured in accordance with ASTM D2414 (e.g., ASTM D2414-12). CDBP absorption (also "CDBP" herein) may be measured in accordance with ASTM D3493. In some examples, the DBP may be from about 32 ml/100 g to about 300 ml/100 g. In some examples, the DBP may be from about 59 ml/100 g to about 71 ml/100 g, from about 55 ml/100 g to about 75 ml/100 g, from about 84 ml/100 g to about 96 ml/100 g, from about 80 ml/100 g to about 100 ml/100 g, from about 115 ml/100 g to about 127 ml/100 g, from about 111 ml/100 g to about 131 ml/100 g, or from about 110 ml/100 g to about 130 ml/100 g. The DBP and/or CDBP may be, for example, greater than or equal to about 1 milliliter per 100 grams (ml/100 g), 5 ml/100 g, 10 ml/100 g, 15 ml/100 g, 20 ml/100 g, 25 ml/100 g, 32 ml/100 g, 40 ml/100 g, 45 ml/100 g, 47 ml/100 g, 50 ml/100 g, 55 ml/100 g, 56 ml/100 g, 57 ml/100 g, 58 ml/100 g, 59 ml/100 g, 60 ml/100 g, 61 ml/100 g, 62 ml/100 g, 63 ml/100 g, 64 ml/100 g, 65 ml/100 g, 66 ml/100 g, 67 ml/100 g, 68 ml/100 g, 69 ml/100 g, 70 ml/100 g, 71 ml/100 g, 72 ml/100 g, 73 ml/100 g, 74 ml/100 g, 75 ml/100 g, 76 ml/100 g, 78 ml/100 g, 79 ml/100 g, 80 ml/100 g, 81 ml/100 g, 82 ml/100 g, 83 ml/100 g, 84 ml/100 g, 85 ml/100 g, 86 ml/100 g, 87 ml/100 g, 88 ml/100 g, 89 ml/100 g, 90 ml/100 g, 91 ml/100 g, 92 ml/100 g, 93 ml/100 g, 94 ml/100 g, 95 ml/100 g, 96 ml/100 g, 97 ml/100 g, 98 ml/100 g, 99 ml/100 g, 100 ml/100 g, 101 ml/100 g, 104 ml/100 g, 105 ml/100 g, 109 ml/100 g, 110 ml/100 g, 111 ml/100 g, 112 ml/100 g, 113 ml/100 g, 114 ml/100 g, 115 ml/100 g, 116 ml/100 g, 117 ml/100 g, 118 ml/100 g, 119 ml/100 g, 120 ml/100 g, 121 ml/100 g, 122 ml/100 g, 123 ml/100 g, 124 ml/100 g, 125 ml/100 g, 126 ml/100 g, 127 ml/100 g, 128 ml/100 g, 129 ml/100 g, 130 ml/100 g, 131 ml/100 g, 132 ml/100 g, 134 ml/100 g, 135 ml/100 g, 136 ml/100 g, 137 ml/100 g, 138 ml/100 g, 140 ml/100 g, 142 ml/100 g, 145 ml/100 g, 150 ml/100 g, 152 ml/100 g, 155 ml/100 g, 160 ml/100 g, 165 ml/100 g, 170 ml/100 g, 174 ml/100 g, 175 ml/100 g, 180 ml/100 g, 183 ml/100 g, 185 ml/100 g, 190 ml/100 g, 195 ml/100 g, 200 ml/100 g, 205 ml/100 g, 210 ml/100 g, 215 ml/100 g, 220 ml/100 g, 225 ml/100 g, 230 ml/100 g, 235 ml/100 g, 240 ml/100 g, 245 ml/100 g, 250 ml/100 g, 255 ml/100 g, 260 ml/100 g, 265 ml/100 g, 270 ml/100 g, 275 ml/100 g, 280 ml/100 g, 285 ml/100 g, 290 ml/100 g, 295 ml/100 g or 300 ml/100 g. Alternatively, or in addition, the DBP and/or CDBP may be, for example, less than or equal to about 300 ml/100 g, 295 ml/100 g, 290 ml/100 g, 285 ml/100 g, 280 ml/100 g, 275 ml/100 g, 270 ml/100 g, 265 ml/100 g, 260 ml/100 g, 255 ml/100 g, 245 ml/100 g, 240 ml/100 g, 235 ml/100 g, 230 ml/100 g, 225 ml/100 g, 220 ml/100 g, 215 ml/100 g, 210 ml/100 g, 205 ml/100 g, 200 ml/100 g, 195 ml/100 g, 190 ml/100 g, 185 ml/100 g, 183 ml/100 g, 180 ml/100 g, 175 ml/100 g, 174 ml/100 g, 170 ml/100 g, 165 ml/100 g, 160 ml/100 g, 155 ml/100 g, 152 ml/100 g, 150 ml/100 g, 145 ml/100 g, 142 ml/100 g, 140 ml/100 g, 138 ml/100 g, 137 ml/100 g, 136 ml/100 g, 135 ml/100 g, 134 ml/100 g, 132 ml/100 g, 131 ml/100 g, 130 ml/100 g, 129 ml/100 g, 128 ml/100 g, 127 ml/100 g, 126 ml/100 g, 125 ml/100 g, 124 ml/100 g, 123 ml/100 g, 122 ml/100 g, 121 ml/100 g, 120 ml/100 g, 119 ml/100 g, 118 ml/100 g, 117 ml/100 g, 116 ml/100 g, 115 ml/100 g, 114 ml/100 g, 113 ml/100 g, 112 ml/100 g, 111 ml/100 g, 110 ml/100 g, 109 ml/100 g, 105 ml/100 g, 104 ml/100 g, 101 ml/100 g, 100 ml/100 g, 99 ml/100 g, 98 ml/100 g, 97 ml/100 g, 96 ml/100 g, 95 ml/100 g, 94 ml/100 g, 93 ml/100 g, 92 ml/100 g, 91 ml/100 g, 90 ml/100 g, 89 ml/100 g, 88 ml/100 g, 87 ml/100 g, 86 ml/100 g, 85 ml/100 g, 84 ml/100 g, 83 ml/100 g, 82 ml/100 g, 81 ml/100 g, 80 ml/100 g, 79 ml/100 g, 78 ml/100 g, 76 ml/100 g, 75 ml/100 g, 74 ml/100 g, 73 ml/100 g, 72 ml/100 g, 71 ml/100 g, 70 ml/100 g, 69 ml/100 g, 68 ml/100 g, 67 ml/100 g, 66 ml/100 g, 65 ml/100 g, 64 ml/100 g, 63 ml/100 g, 62 ml/100 g, 61 ml/100 g, 60 ml/100 g, 59 ml/100 g, 58 ml/100 g, 57 ml/100 g, 56 ml/100 g, 55 ml/100 g, 50 ml/100 g, 47 ml/100 g, 45 ml/100 g, 40 ml/100 g or 32 ml/100 g. DBP and CDBP may differ (e.g., DBP may be greater than CDBP). The difference between DBP and CDBP for the carbon particle(s) (e.g., carbon black particle(s)) described herein may be less than for a reference carbon particle (e.g., a reference carbon black as described elsewhere herein). The DBP is typically greater than 1.3 times the CDBP (i.e., more than 1.3 times greater than the CDBP) for the reference carbon particles (e.g., reference carbon black). In some instances, the difference between DBP and CDBP may be less for the carbon particle(s) (e.g., carbon black particle(s)) of the present disclosure due to, for example, higher crystallinity as described in greater detail elsewhere herein (e.g., higher crystallinity may enable stronger carbon particle(s) that are more difficult to crush) and/or due to other factors. In some examples, the DBP may be between about 1% and 10%, 1% and 15%, 5% and 19%, 1% and 20%, 5%, and 30%, or 5% and 35% greater than the CDBP. The DBP value may be, for example, less than or equal to about 2, 1.9, 1.85, 1.8, 1.75, 1.7, 1.65, 1.6, 1.55, 1.5, 1.45, 1.4, 1.35, 1.3, 1.28, 1.26, 1.24, 1.22, 1.2, 1.19, 1.18, 1.16, 1.15, 1.14, 1.13, 1.12, 1.11, 1.1, 1.09, 1.08, 1.07, 1.06, 1.05, 1.04, 1.03, 1.02 or 1.01 times the CDBP value. Alternatively, or in addition, the DBP value may be, for example, greater than or equal to about 1, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.22, 1.24, 1.26, 1.28, 1.3, 1.35, 1.40, 1.45, 1.5, 1.55, 1.6, 1.65, 1.7, 1.75, 1.8, 1.85, 1.9 or 2 times the CDBP value. The DBP to CDBP ratio of the carbon particle(s) (e.g., carbon black particle(s)) described herein may be, for example, less than or equal to about 100%, 99.9%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 65%, 60%, 55%, 50%, 45%, 40%, 35%, 30%, 25%, 20%, 15%, 10%, 5% or 1% of the DBP to CDBP ratio of a reference carbon particle (e.g., a reference carbon black). Alternatively, or in addition, the DBP to CDBP ratio of the carbon particle(s) (e.g., carbon black particle(s)) described herein may be, for example, greater than or equal to about 0%, 1%, 5%, 10%, 15%, 20%, 25%, 30%, 35%, 40%, 45%, 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, 99% or 99.9% of the DBP to CDBP ratio of a reference carbon particle (e.g., a reference carbon black). As described in greater detail elsewhere herein, the carbon particle(s) (e.g., carbon black) may have such differences while having other characteristics (e.g., surface area, DBP, particle size by DLS, $L_c$, etc.) that are indicative of a reference carbon particle (e.g., a reference carbon black). The carbon particle(s) may have such structures in combination with one or more other properties described herein.

Surface area (e.g., N2SA) and structure (e.g., DBP) values may be used to determine a given grade of the carbon particles (e.g., carbon black). The carbon particles (e.g., carbon black particles) may have, for example, N2SA of about 29±6 $m^2/g$ or about 29±10 $m^2/g$, and DBP of about 65±6 ml/100 g or about 65±10 ml/100 g. The carbon particles (e.g., carbon black particles) may have, for example, N2SA from about 23 $m^2/g$ to about 35 $m^2/g$ and DBP from about 59 ml/100 g to about 71 ml/100 g, or N2SA from about 19 $m^2/g$ to about 39 $m^2/g$ and DBP from about 55 ml/100 g to about 75 ml/100 g. The carbon particles (e.g., carbon black particles) may have, for example, N2SA of about 35±6 $m^2/g$ or about 35±10 $m^2/g$, and DBP of about 90±6 ml/100 g or about 90±10 ml/100 g. The carbon particles (e.g., carbon black particles) may have, for example, N2SA from about 29 $m^2/g$ to about 41 $m^2/g$ and DBP from about 84 ml/100 g to about 96 ml/100 g, or N2SA from about 25 $m^2/g$ to about 45 $m^2/g$ and DBP from about 80 ml/100 g to about 100 ml/100 g. The carbon particles (e.g., carbon black particles) may have, for example, N2SA of about 40±6 $m^2/g$ or about 40±10 $m^2/g$, and DBP of about 121±6 ml/100 g or about 121±10 ml/100 g. The carbon particles (e.g., carbon black particles) may have, for example, N2SA from about 34 $m^2/g$ to about 46 $m^2/g$ and DBP from about 115 ml/100 g to about 127 ml/100 g, or N2SA from about 30 $m^2/g$ to about 50 $m^2/g$ and DBP from about 111 ml/100 g to about 131 ml/100 g. The carbon particles (e.g., carbon black particles) may have, for example, N2SA of about 20±5 $m^2/g$ or about 20±10 $m^2/g$, and DBP of about 120±10 ml/100 g. The carbon particles (e.g., carbon black particles) may have, for example, N2SA from about 15 $m^2/g$ to about 25 $m^2/g$ and DBP from about 110 ml/100 g to about 130 ml/100 g, or N2SA from about 10 $m^2/g$ to about 30 $m^2/g$ and DBP from about 110 ml/100 g to about 130 ml/100 g. The carbon particles (e.g., carbon black particles) may have, for example, N2SA of about 36±6 $m^2/g$ or about 36±10 $m^2/g$, and DBP of about 122±6 ml/100 g or about 122±10 ml/100 g. The carbon particles (e.g., carbon black particles) may have, for example, N2SA from about 30 $m^2/g$ to about 42 $m^2/g$ and DBP from about 116 ml/100 g to about 128 ml/100 g, or N2SA from about 26 $m^2/g$ to about 46 $m^2/g$ and DBP from about 112 ml/100 g to about 132 ml/100 g. The carbon particles (e.g., carbon black particles) may have, for example, N2SA of about 32±6 m$^2$/g or about 32±10 m$^2$/g, and DBP of about 65±6 ml/100 g or about 65±10 ml/100 g. The carbon particles (e.g., carbon black particles) may have, for example, N2SA from about 26 m$^2$/g to about 38 m$^2$/g and DBP from about 59 ml/100 g to about 71 ml/100 g, or N2SA from about 22 m$^2$/g to about 42 m$^2$/g and DBP from about 55 ml/100 g to about 75 ml/100 g. The carbon particles (e.g., carbon black particles) may have, for example, N2SA of about 30±6 m$^2$/g or about 30±10 m$^2$/g, and DBP of about 72±6 ml/100 g or about 72±10 ml/100 g. The carbon particles (e.g., carbon black particles) may have, for example, N2SA from about 24 m$^2$/g to about 36 m$^2$/g and DBP from about 66 ml/100 g to about 78 ml/100 g, or N2SA from about 20 m$^2$/g to about 40 m$^2$/g and DBP from about 62 ml/100 g to about 82 ml/100 g. The carbon particles (e.g., carbon black particles) may have, for example, N2SA of about 8±6 m$^2$/g, and DBP of about 43±6 ml/100 g or about 43±10 ml/100 g. The carbon particles (e.g., carbon black particles) may have, for example, N2SA from about 2 m$^2$/g to about 14 m$^2$/g, and DBP from about 37 ml/100 g to about 49 ml/100 g or from about 33 ml/100 g to about 53 ml/100 g. The carbon particles (e.g., carbon black particles) may have, for example, N2SA of about 36±6 m$^2$/g or about 36±10 m$^2$/g, and DBP of about 122±6 ml/100 g or about 122±10 ml/100 g. The carbon particles (e.g., carbon black particles) may have, for example, N2SA from about 30 m$^2$/g to about 42 m$^2$/g and DBP from about 116 ml/100 g to about 128 ml/100 g, or N2SA from about 26 m$^2$/g to about 46 m$^2$/g and DBP from about 112 ml/100 g to about 132 ml/100 g. The carbon particles (e.g., carbon black particles) may have, for example, N2SA of about 32±6 m$^2$/g or about 32±10 m$^2$/g, and DBP of about 65±6 ml/100 g or about 65±10 ml/100 g. The carbon particles (e.g., carbon black particles) may have, for example, N2SA from about 26 m$^2$/g to about 38 m$^2$/g and DBP from about 59 ml/100 g to about 71 ml/100 g, or N2SA from about 22 m$^2$/g to about 42 m$^2$/g and DBP from about 55 ml/100 g to about 75 ml/100 g. The carbon particles (e.g., carbon black particles) may have, for example, N2SA of about 30±6 m$^2$/g or about 30±10 m$^2$/g, and DBP of about 72±6 ml/100 g or about 72±10 ml/100 g. The carbon particles (e.g., carbon black particles) may have, for example, N2SA from about 24 m$^2$/g to about 36 m$^2$/g and DBP from about 66 ml/100 g to about 78 ml/100 g, or N2SA from about 20 m$^2$/g to about 40 m$^2$/g and DBP from about 62 ml/100 g to about 82 ml/100 g. The carbon particles (e.g., carbon black particles) may have, for example, N2SA of about 8±6 m$^2$/g, and DBP of about 43±6 ml/100 g or about 43±10 ml/100 g. The carbon particles (e.g., carbon black particles) may have, for example, N2SA from about 2 m$^2$/g to about 14 m$^2$/g, and DBP from about 37 ml/100 g to about 49 ml/100 g or from about 33 ml/100 g to about 53 ml/100 g.

In some examples, improved carbon particles (e.g., improved carbon black particles) of the present disclosure may have a given combination of at least a subset of the properties described herein. For example, the particle may have an ellipsoid factor greater than 1.3, a crystallinity greater than 1 nm, greater than 4 nm, or from 3 nm to 20 nm in terms of $L_a$ or $L_c$, a hydrophilic content of the surface (e.g., as described by affinity to adsorb water from an 80% relative humidity atmosphere) of less than 0.05 to 0.5 ml (milliliter) of water for every m$^2$ (square meter) of (e.g., carbon black) surface area, a hydrogen content of less than about 0.4%, a surface area (e.g., excluding pores that are internal to the primary particles) from about 10 m$^2$/g or 15 m$^2$/g up to about 300 m$^2$/g, a DBP from about 32 ml/100 g to about 300 ml/100 g, or any combination thereof. These combinations of properties may yield a unique material (e.g., carbon black) that is different from the incumbent furnace carbon black where surface acid groups dominate, resulting in higher water affinity. In some examples of the processes described herein, the nature of the hydrogen environment of the process may lead to more hydrogen (e.g., higher hydrogen content) at the (particle) surface. Higher hydrogen content may be, for example, beneficial in tire tread abrasion resistance. The lack of surface oxygen groups may lead to a faster mix time and faster cure time in elastomer composites. At a lower oxygen level at the surface of carbon particle(s) (e.g., carbon black), the same amount of hydrogen may indicate greater surface activity for performance in tire tread and other elastomer filler applications.

The carbon particle(s) (e.g., carbon black particle(s)) may have a given content of unreacted polycyclic aromatic hydrocarbons (PAHs) (also "PAH content" herein). Such content may in some cases be expressed in terms of transmittance of toluene extract (TOTE). Extract may be quantified, for example, using ASTM D1618 (e.g., ASTM D1618-99). PAH content may in some cases be expressed in terms total extractable polycyclic aromatic hydrocarbons as measured by the "Determination of PAH Content of Carbon Black CFR 178.3297" procedure available from the Food and Drug Administration (FDA) (also known as the "22 PAH" procedure). In some examples, the amount of PAHs (e.g., as measured by the "Determination of PAH Content of Carbon Black CFR 178.3297" (22 PAH) procedure) may be less than about 1% (e.g., by mass). The amount of PAHs (e.g., as measured by the "Determination of PAH Content of Carbon Black CFR 178.3297" (22 PAH) procedure) may be, for example, less than or equal to about 5%, 4%, 3%, 2%, 1%, 0.9%, 0.8%, 0.7%, 0.6%, 0.5%, 0.4%, 0.3%, 0.2%, 0.1%, 900 ppm, 800 ppm, 700 ppm, 600 ppm, 500 ppm, 400 ppm, 300 ppm, 200 ppm, 100 ppm, 75 ppm, 50 ppm, 25 ppm, 10 ppm, 5 ppm, 1 ppm, 0.5 ppm, 0.25 ppm, 0.1 ppm, 0.05 ppm, 0.01 ppm, 5 parts per billion (ppb) or 1 ppb (e.g., by mass). Alternatively, or in addition, the amount of PAHs (e.g., as measured by the "Determination of PAH Content of Carbon Black CFR 178.3297" (22 PAH) procedure) may be, for example, greater than or equal to about 0 ppm, 1 ppb, 5 ppb, 0.01 ppm, 0.05 ppm 0.1 ppm, 0.25 ppm, 0.5 ppm, 1 ppm, 5 ppm, 10 ppm, 25 ppm, 50 ppm, 75 ppm, 100 ppm, 200 ppm, 300 ppm, 400 ppm, 500 ppm, 600 ppm, 700 ppm, 800 ppm, 900 ppm, 0.1%, 0.2%, 0.3%, 0.4%, 0.5%, 0.6%, 0.7%, 0.8%, 0.9%, 1%, 2%, 3% or 4% (e.g., by mass). The tote (also "TOTE" herein) may be, for example, greater than or equal to about 50%, 75%, 80%, 85%, 86%, 87%, 88%, 89%, 90%, 91%, 91.5%, 92%, 92.5%, 93%, 93.5%, 94%, 94.5%, 95%, 95.5%, 96%, 96.5%, 97%, 97.5%, 98%, 98.5%, 99%, 99.1%, 99.2%, 99.3%, 99.4%, 99.5%, 99.5%, 99.7%, 99.8%, 99.9% or 100%. Alternatively, or in addition, the tote may be, for example, less than or equal to about 100%, 99.9%, 99.8%, 99.7%, 99.5%, 99.5%, 99.4%, 99.3%, 99.2%, 99.1%, 99%, 98.5%, 98%, 97.5%, 97%, 96.5%, 96%, 95.5%, 95%, 94.5%, 94%, 93.5%, 93%, 92.5%, 92%, 91.5%, 91%, 90%, 89%, 88%, 87%, 86%, 85%, 80% or 75%. The carbon particle(s) may have such PAH contents in combination with one or more other properties described herein.

The carbon particles (e.g., carbon black particles) may have a given purity. A high purity may correspond to low contamination (also "contamination level" herein). The contamination may include, for example, ash, grit (or any subset thereof), or any combination thereof. The contamination may include, for example, large particle contamination (e.g., grit). Grit may comprise or be particles with an equivalent sphere diameter larger than (e.g., about) 5 micron. Grit may comprise or be carbonaceous and/or non-carbonaceous particles with an equivalent sphere diameter larger than (e.g., about) 5 micron. Grit may comprise or include carbon material (coke), metal, metalloid and/or metal/metalloid compound material (e.g., metal/metalloid oxides, hydroxides, sulfides, selenides, etc. such as, for example, metal oxide remains), ionic material (e.g., salts of monoatomic ions, polyatomic ions, etc.), or any combination thereof. The coke (e.g., coke particles) may comprise primarily (e.g., substantially all) carbon. Upon/after heating, non-vaporized materials (e.g., metal oxide material) may remain and provide ash (e.g., measured by ASTM D1506, as described elsewhere herein). The ash may comprise materials that have not decomposed and/or vaporized upon/after heating in an oxygen environment at 550° C., as prescribed by ASTM D1506-99. The ash may comprise or include metal, metalloid and/or metal/metalloid compound material, and/or ionic material. The contamination (e.g., content of grit) may be quantified, for example, using the ASTM D1514 water wash grit test. In some examples, the amount of grit (or any subset thereof) (e.g., 325 mesh) may be less than about 500 ppm (parts per million). The contamination (e.g., content of ash) may be quantified, for example, using ASTM D1506 (e.g., ASTM D1506-99). Extremely low ash carbon particles (e.g., carbon blacks) that may be referred to as ultra-pure may possess, for example, less than 0.02% ash (e.g., total ash less than 0.02%). In some examples, the purity may be: less than about 0.05%, 0.03% or 0.01% (100 ppm) ash; less than about 5 ppm or 1 ppm, or zero, grit (e.g., 325 mesh); or a combination thereof. The amount of grit (or any subset thereof) (e.g., 500 mesh, 400 mesh, 325 mesh and/or 120 mesh) may be, for example, less than or equal to about 5%, 2%, 1%, 0.5%, 0.2%, 0.1%, 900 parts per million (ppm), 800 ppm, 700 ppm, 600 ppm, 500 ppm, 450 ppm, 400 ppm, 350 ppm, 300 ppm, 250 ppm, 200 ppm, 150 ppm, 100 ppm, 75 ppm, 50 ppm, 25 ppm, 10 ppm, 5 ppm or 1 ppm (e.g., by weight). Alternatively, or in addition, the amount of grit (or any subset thereof) (e.g., 500 mesh, 400 mesh, 325 mesh and/or 120 mesh) may be, for example, greater than or equal to about 0 ppm, 1 ppm, 5 ppm, 10 ppm, 25 ppm, 50 ppm, 75 ppm, 100 ppm, 150 ppm, 200 ppm, 250 ppm, 300 ppm, 350 ppm, 400 ppm, 450 ppm, 500 ppm, 600 ppm, 700 ppm, 800 ppm, 900 ppm, 0.1%, 0.2%, 0.5% or 1% (e.g., by weight). Any description of the amount or level of grit (or any subset thereof) herein expressed in terms of mesh sizes (e.g., 325 mesh and/or 120 mesh) may equally apply to other mesh sizes (e.g., corresponding to smaller particle size, such as, for example, 400 and/or 500 mesh) and/or to nominal particle sizes (e.g., less than or equal to about 125 microns, 105 microns, 90 microns, 75 microns, 63 microns, 53 microns, 50 microns, 45 microns, 44 microns, 40 microns, 37 microns, 35 microns, 30 microns, 25 microns, 20 microns, 15 microns or 10 microns) at least in some configurations. The grit (or any subset thereof) may comprise substantially no (e.g., no) or minimal amount(s) of particles above (larger than) a given size or within a given size range (e.g., which may be as described elsewhere herein). The amount of grit (or any subset thereof) particles greater (larger) than or equal to about 10 microns, 15 microns, 20 microns, 25 microns, 30 microns, 35 microns, 37 microns, 40 microns, 44 microns, 45 microns, 50 microns, 53 microns, 63 microns, 75 microns, 90 microns, 105 microns or 125 microns (e.g., larger (greater) than about 20-40 microns) may be, for example, less than or equal to about 5%, 2%, 1%, 0.5%, 0.2%, 0.1%, 900 ppm, 800 ppm, 700 ppm, 600 ppm, 500 ppm, 450 ppm, 400 ppm, 350 ppm, 300 ppm, 250 ppm, 200 ppm, 150 ppm, 100 ppm, 75 ppm, 50 ppm, 25 ppm, 10 ppm, 5 ppm or 1 ppm (e.g., by weight). Alternatively, or in addition, the amount of grit (or any subset thereof) particles greater (larger) than or equal to about 10 microns, 15 microns, 20 microns, 25 microns, 30 microns, 35 microns, 37 microns, 40 microns, 44 microns, 45 microns, 50 microns, 53 microns, 63 microns, 75 microns, 90 microns, 105 microns or 125 microns (e.g., larger (greater) than about 20-40 microns) may be, for example, greater than or equal to about 0 ppm, 1 ppm, 5 ppm, 10 ppm, 25 ppm, 50 ppm, 75 ppm, 100 ppm, 150 ppm, 200 ppm, 250 ppm, 300 ppm, 350 ppm, 400 ppm, 450 ppm, 500 ppm, 600 ppm, 700 ppm, 800 ppm, 900 ppm, 0.1%, 0.2%, 0.5% or 1% (e.g., by weight). The grit (or any subset thereof) may comprise, for example, only particles less (smaller) than or equal to about 125 μm, 105 μm, 90 μm, 75 μm, 63 μm, 53 μm, 50 μm, 45 μm, 44 μm, 40 μm, 37 μm, 35 μm, 30 μm, 25 μm, 20 μm, 15 μm or 10 μm. The amount of ash may be, for example, less than or equal to about 5%, 2%, 1.5%, 1%, 0.5%, 0.2%, 0.1%, 900 ppm, 800 ppm, 700 ppm, 600 ppm, 500 ppm, 450 ppm, 400 ppm, 350 ppm, 300 ppm, 250 ppm, 200 ppm, 175 ppm, 150 ppm, 140 ppm, 130 ppm, 120 ppm, 110 ppm, 100 ppm, 90 ppm, 80 ppm, 70 ppm, 60 ppm, 50 ppm, 40 ppm, 30 ppm, 20 ppm, 10 ppm, 5 ppm or 1 ppm (e.g., by weight). Alternatively, or in addition, the amount of ash may be, for example, greater than or equal to about 0 ppm, 1 ppm, 5 ppm, 10 ppm, 20 ppm, 30 ppm, 40 ppm, 50 ppm, 60 ppm, 70 ppm, 80 ppm, 90 ppm, 100 ppm, 110 ppm, 120 ppm, 130 ppm, 140 ppm, 150 ppm, 175 ppm, 200 ppm, 250 ppm, 300 ppm, 350 ppm, 400 ppm, 450 ppm, 500 ppm, 600 ppm, 700 ppm, 800 ppm, 900 ppm, 0.1%, 0.2%, 0.5% or 1% (e.g., by weight). The ash may include metal and/or metalloid elements. In some examples, the carbon particles may have such ash contents (e.g., total ash contents) in combination with one or more levels of transition metal(s) (e.g., Fe, Cu, Zn, Cr, Ni, Co, Mo, Nb and/or V), Sn and/or other metals and/or metalloids described herein. In some examples, the carbon particles may have such ash contents and the ash may comprise a given overall level of metal and/or metalloid elements. For example, less than or equal to a given percentage of the ash (e.g., by weight) may comprise or be impurities of one or more (e.g., a subset or all) of the metals and/or metalloids described herein. The ash may comprise or be, for example, less than or equal to about 100%, 99%, 95%, 90%, 85%, 80%, 75%, 70%, 65%, 60%, 55%, 50%, 45%, 40%, 35%, 30%, 25%, 20%, 15%, 10%, 5%, 1%, 0.5%, 0.1%, 0.05%, 0.01% or 0.005% impurities (e.g., by weight) of one or more (e.g., a subset or all) of the metals and/or metalloids described herein. The carbon particles may have a given level or limit of metal and/or metalloid contamination. In some examples, the carbon particles of the present disclosure may have substantially no (e.g., no) metal and/or metalloid contamination. The amount of transition metal(s) (e.g., Fe, Cu, Zn, Cr, Ni, Co, Mo, Nb and/or V), Sn and/or other metals and/or metalloids, alone or in combination, may be, for example, less than or equal to about 100 ppm, 90 ppm, 80 ppm, 70 ppm, 60 ppm, 50 ppm, 40 ppm, 30 ppm, 20 ppm, 10 ppm, 9 ppm, 8 ppm, 7 ppm, 6 ppm, 5 ppm, 4.5 ppm, 4 ppm, 3.5 ppm, 3 ppm, 2.5 ppm, 2 ppm, 1.5 ppm, 1 ppm, 900 ppb, 800 ppb, 700 ppb, 600 ppb, 500 ppb, 450 ppb, 400 ppb, 350 ppb, 300 ppb, 290 ppb, 280 ppb, 270 ppb, 260 ppb, 250 ppb, 240 ppb, 230 ppb, 220 ppb, 210 ppb, 200 ppb, 190 ppb, 180 ppb, 170 ppb, 160 ppb, 150 ppb, 140 ppb, 130 ppb, 120 ppb, 110 ppb, 100 ppb, 90 ppb, 80 ppb, 70 ppb, 60 ppb, 50 ppb, 45 ppb, 40 ppb, 35 ppb, 30 ppb, 25 ppb, 20 ppb, 15 ppb, 10 ppb, 5 ppb, 1 ppb, 0.5 ppb or 0.1 ppb (e.g., by weight). Alternatively, or in addition, the amount of transition metal(s) (e.g., Fe, Cu, Zn, Cr, Ni, Co, Mo, Nb and/or V), Sn and/or other metals and/or metalloids, alone or in combination, may be, for example, greater than or equal to about 0 ppb, 0.1 ppb, 0.5 ppb, 1 ppb, 5 ppb, 10 ppb, 15 ppb, 20 ppb, 25 ppb, 30 ppb, 35 ppb, 40 ppb, 45 ppb, 50 ppb, 60 ppb, 70 ppb, 80 ppb, 90 ppb, 100 ppb, 110 ppb, 120 ppb, 130 ppb, 140 ppb, 150 ppb, 160 ppb, 170 ppb, 180 ppb, 190 ppb, 200 ppb, 210 ppb, 220 ppb, 230 ppb, 240 ppb, 250 ppb, 260 ppb, 270 ppb, 280 ppb, 290 ppb, 300 ppb, 350 ppb, 400 ppb, 450 ppb, 500 ppb, 600 ppb, 700 ppb, 800 ppb, 900 ppb, 1 ppm, 1.5 ppm, 2 ppm, 2.5 ppm, 3 ppm, 3.5 ppm, 4 ppm, 4.5 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm or 90 ppm. The aforementioned metal and/or metalloid elements may be present in the ash. Any description of metal impurities or levels herein may equally apply to metalloid impurities or levels at least in some configurations, and vice versa. The carbon particles may have such purities in combination with one or more other properties described herein.

In some examples, the carbon particles (e.g., carbon black particles) of the present disclosure may have a purity of: less than about 0.05%, 0.03% or 0.01% ash; less than about 5 ppm or 1 ppm, or zero, grit (e.g., 325 mesh); or a combination thereof. The carbon particles may have such purities in combination with, for example, $L_c$ greater than about 3.0 nm, d002 less than about 0.35 nm, less than about 0.3%, 50 ppm, 10 ppm, 5 ppm or 1 ppm sulfur (as percent of total sample and/or by weight as produced), or any combination thereof. In some examples, the carbon particles may comprise: less than about 0.05%, 0.03% or 0.01% ash; less than about 5 ppm or 1 ppm, or zero, grit (e.g., 325 mesh); $L_c$ greater than about 3.0 nm; d002 less than about 0.35 nm; less than about 0.3%, 50 ppm, 10 ppm, 5 ppm or 1 ppm sulfur (as percent of total sample and/or by weight as produced); or any combination thereof.

The carbon particle(s) (e.g., carbon black particle(s)) may have a given level of ionic impurities. The ionic impurities may be a component of the ash (e.g., as ionic material in the ash). Such ionic impurities may include salts that dissolve in water. Such salts may include, for example, metal and/or metalloid salts (e.g., comprising one or more of the metals and/or metalloids described herein) and/or non-metal salts (e.g., ammonium chloride). In some examples, ionic impurities may include one or more metal salts. A metal salt may be one type of metal impurity. Levels of metal impurities may be as described in greater detail elsewhere herein. The amount of ionic impurities (e.g., as measured by washing the carbon particle(s) (e.g., carbon black) with water and measuring electrical conductivity of the water) may be, for example, less than or equal to about 5%, 4%, 3%, 2%, 1%, 0.9%, 0.8%, 0.7%, 0.6%, 0.5%, 0.4%, 0.3%, 0.2%, 0.1%, 900 ppm, 800 ppm, 700 ppm, 600 ppm, 500 ppm, 400 ppm, 300 ppm, 200 ppm, 100 ppm, 75 ppm, 50 ppm, 25 ppm, 10 ppm, 5 ppm, 1 ppm, 0.5 ppm, 0.25 ppm, 0.1 ppm, 0.05 ppm, 0.01 ppm, 5 parts per billion (ppb) or 1 ppb (e.g., by mass). Alternatively, or in addition, amount of the amount of ionic impurities (e.g., as measured by washing the carbon particle(s) (e.g., carbon black) with water and measuring electrical conductivity of the water) may be, for example, greater than or equal to about 0 ppm, 1 ppb, 5 ppb, 0.01 ppm, 0.05 ppm 0.1 ppm, 0.25 ppm, 0.5 ppm, 1 ppm, 5 ppm, 10 ppm, 25 ppm, 50 ppm, 75 ppm, 100 ppm, 200 ppm, 300 ppm, 400 ppm, 500 ppm, 600 ppm, 700 ppm, 800 ppm, 900 ppm, 0.1%, 0.2%, 0.3%, 0.4%, 0.5%, 0.6%, 0.7%, 0.8%, 0.9%, 1%, 2%, 3% or 4% (e.g., by mass). The carbon particle(s) may have such ionic impurity levels in combination with one or more other properties described herein.

While purity may be described herein primarily in the context of contamination by ash, coke and/or grit, purity may in some cases be used to refer to and/or to also include other types of contamination or impurities. For example, high purity may in some contexts refer to or include low sulfur, low oxygen levels, low transition metals and/or low levels of other types of contamination or impurities. Carbon particles (e.g., a plurality of carbon particles, such as, for example, a plurality of carbon nanoparticles) may be used herein to refer to only the carbon particles, and/or to the carbon particles (e.g., carbon nanoparticles) along with any impurities (e.g., "carbon particles" may include any objects that are substantially non-carbon).

In some examples, the carbon particles may have N2SA from about 15 $m^2/g$ to about 25 $m^2/g$ and DBP from about 110 ml/100 g to about 130 ml/100 g, or N2SA from about 10 $m^2/g$ to about 30 $m^2/g$ and DBP from about 110 ml/100 g to about 130 ml/100 g. The carbon particles may have such surface areas and structures in combination with less than 5 ppm or 1 ppm of 325 mesh grit, and zero ppm of 120 mesh grit. In some examples, the carbon particles (e.g., carbon black particles) of the present disclosure may have N2SA from about 15 $m^2/g$ to about 25 $m^2/g$ and DBP from about 110 ml/100 g to about 130 ml/100 g, or N2SA from about 10 $m^2/g$ to about 30 $m^2/g$ and DBP from about 110 ml/100 g to about 130 ml/100 g; less than 5 ppm or 1 ppm of 325 mesh grit; less than 1 ppm, or zero ppm, of 120 mesh grit; or any combination thereof.

Pellets of the carbon particles (e.g., carbon black particles) described herein may have a given fines content. The fines (e.g., 5' and/or 20') may be measured, for example, in accordance with ASTM D1508. The fines (e.g., 5' and/or 20') content (e.g., by weight) may be, for example, less than or equal to about 15%, 10%, 5%, 4.5%, 4%, 3.5%, 3%, 2.8%, 2.6%, 2.4%, 2.2%, 2%, 1.9%, 1.8%, 1.7%, 1.6%, 1.5%, 1.4%, 1.3%, 1.2%, 1.1%, 1%, 0.9%, 0.8%, 0.7%, 0.6%, 0.5%, 0.4%, 0.3%, 0.2%, 0.1%, 0.05%, 0.01% or 0.005%. Alternatively, or in addition, the fines (e.g., 5' and/or 20') content (e.g., by weight) may be, for example, greater than or equal to about 0%, 0.005%, 0.01%, 0.05%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.2%, 2.4%, 2.6%, 2.8%, 3%, 3.5%, 4% or 5%. The carbon particles may have such fines contents in combination with one or more other properties described herein.

Pellets and/or fluffy of the carbon particles (e.g., carbon black particles) described herein may have a given fines sieve residue (e.g., 325 mesh and/or 35 mesh). 325 mesh and 35 mesh sieve residues may be measured, for example, in accordance with ASTM D1514. The amount of sieve (e.g., 325 mesh and/or 35 mesh) residue may be, for example, less than or equal to about 0.5%, 0.2%, 0.1%, 900 ppm, 800 ppm, 700 ppm, 600 ppm, 500 ppm, 400 ppm, 300 ppm, 250 ppm, 200 ppm, 175 ppm, 150 ppm, 125 ppm, 100 ppm, 80 ppm, 75 ppm, 50 ppm, 25 ppm, 10 ppm, 5 ppm or 1 ppm (e.g., by weight). Alternatively, or in addition, the amount of sieve (e.g., 325 mesh and/or 35 mesh) residue may be, for example, greater than or equal to about 0 ppm, 1 ppm, 5 ppm, 10 ppm, 25 ppm, 50 ppm, 75 ppm, 80 ppm, 100 ppm, 125 ppm, 150 ppm, 175 ppm, 200 ppm, 250 ppm, 300 ppm, 400 ppm, 500 ppm, 600 ppm, 700 ppm, 800 ppm, 900 ppm or 0.1% (e.g., by weight). The carbon particles may have such sieve residues in combination with one or more other properties described herein.

The carbon particles (e.g., carbon black particles) may have given pellet properties. Upon pelletization, the carbon particles may have a given pellet hardness (e.g., individual and/or average). Individual and average pellet hardness may be measured, for example, in accordance with ASTM D5230. In some examples, individual and/or average pellet hardness may be less than or equal to about 90 gram-force (gf) or 50 gf. The pellet hardness (e.g., individual and/or average) may be, for example, less than or equal to about 300 gf, 250 gf, 200 gf, 180 gf, 160 gf, 140 gf, 120 gf, 100 gf, 95 gf, 90 gf, 85 gf, 80 gf, 75 gf, 70 gf, 65 gf, 60 gf, 55 gf, 51 gf, 50 gf, 48 gf, 45 gf, 40 gf, 35 gf, 30 gf, 25 gf, 24 gf, 23 gf, 22 gf, 21 gf, 20 gf, 19 gf, 18 gf, 17 gf, 16 gf, 15 gf, 14 gf, 13 gf, 12 gf, 11 gf, 10 gf, 5 gf or 1 gf. Alternatively, or in addition, the pellet hardness (e.g., individual and/or average) may be, for example, greater than or equal to about 0.05 gf, 1 gf, 5 gf, 10 gf, 11 gf, 12 gf, 13 gf, 14 gf, 15 gf, 16 gf, 17 gf, 18 gf, 19 gf, 20 gf, 21 gf, 22 gf, 23 gf, 24 gf, 25 gf, 30 gf, 35 gf, 40 gf, 45 gf, 48 gf, 50 gf, 51 gf, 55 gf, 60 gf, 65 gf, 70 gf, 75 gf, 80 gf, 85 gf, 90 gf, 95 gf, 100 gf, 120 gf, 140 gf, 160 gf, 180 gf, 200 gf, 250 gf or 300 gf. The carbon particles may have such pellet properties in combination with one or more other properties described herein.

The carbon particle(s) (e.g., carbon black particle(s)) may have a given iodine number. The iodine number may be related to the surface area of the carbon particle(s) (e.g., carbon black). As described elsewhere herein, the surface area may refer to surface area excluding (internal) porosity. Iodine number may be measured, for example, in accordance with ASTM D1510. The iodine number may be, for example, greater than or equal to about 1 mg/g, 2 mg/g, 4 mg/g, 6 mg/g, 8 mg/g, 10 mg/g, 12 mg/g, 14 mg/g, 16 mg/g, 18 mg/g, 20 mg/g, 22 mg/g, 24 mg/g, 26 mg/g, 28 mg/g, 30 mg/g, 32 mg/g, 34 mg/g, 36 mg/g, 38 mg/g, 40 mg/g, 42 mg/g, 44 mg/g, 46 mg/g, 48 mg/g, 49 mg/g, 50 mg/g, 55 mg/g, 60 mg/g, 65 mg/g, 70 mg/g, 75 mg/g, 80 mg/g, 85 mg/g, 90 mg/g, 100 mg/g, 150 mg/g or 200 mg/g. Alternatively, or in addition, the iodine number may be, for example, less than or equal to about 200 mg/g, 150 mg/g, 100 mg/g, 90 mg/g, 85 mg/g, 80 mg/g, 75 mg/g, 70 mg/g, 65 mg/g, 60 mg/g, 55 mg/g, 50 mg/g, 49 mg/g, 48 mg/g, 46 mg/g, 44 mg/g, 42 mg/g, 40 mg/g, 38 mg/g, 36 mg/g, 34 mg/g, 32 mg/g, 30 mg/g, 28 mg/g, 26 mg/g, 24 mg/g, 22 mg/g, 20 mg/g, 18 mg/g, 16 mg/g, 14 mg/g, 12 mg/g, 10 mg/g, 8 mg/g, 6 mg/g, 4 mg/g, 2 mg/g or 1 mg/g. The carbon particles may have such iodine numbers in combination with one or more other properties described herein.

The carbon particle(s) (e.g., carbon black particle(s)) may comprise "fullerene-like" moieties (e.g., in the carbon black produced in the processes described herein). For more information about fullerene-like moieties, see, for example, "The Impact of a Fullerene-Like Concept in Carbon Black Science," Carbon, 2002, pages 157-162, which is entirely incorporated herein by reference. The systems and methods (and processes) described herein may allow fullerene-like moieties (also "surface active sites" herein) to be manufactured in one step from a hydrocarbon precursor (e.g., as compared to treating already manufactured carbon black). A one-step process may be as described herein (e.g., in relation to FIGS. 1 and 5). Examples of such fullerene-like moieties are provided, for example, in commonly assigned, co-pending Int. Pat. Pub. No. WO 2017/048621 ("CARBON BLACK FROM NATURAL GAS"), which is entirely incorporated herein by reference. The carbon particle(s) may have such fullerene-like moieties in combination with one or more other properties described herein.

The carbon particles (e.g., carbon black) may have such fullerene-like moieties, for example, in combination with increased crystallinity, decreased d002, decreased hydrogen content, decreased sulfur content and/or decreased oxygen content as compared to a reference carbon black (e.g., furnace black counterpart). The carbon particles (e.g., carbon black) may have such fullerene-like moieties, for example, in combination with a crystallinity that is more than double that of a reference carbon black (e.g., furnace black counterpart), a hydrogen content that is ⅓ that of the reference carbon black (e.g., furnace black counterpart) and more than 10 times less sulfur present than in the reference carbon black (e.g., furnace black counterpart). The carbon particles (e.g., carbon black) may have a different crystallinity and/or surface activity compared to a reference carbon black (e.g., furnace black counterpart). The carbon particles (e.g., carbon black) may have, for example, a different $L_c$ value, different d002 value, different hydrogen content, different sulfur content and/or different oxygen content as compared to a reference carbon black (e.g., furnace black counterpart). The carbon particles may have an $L_c$ that is, for example, at least about 1.01, 1.05, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 6, 7, 8, 9, 10, 11, 12, 13, 14, 15, 20, 25, 30, 35, 40, 45 or 50 times greater than that of a reference carbon black (e.g., furnace black counterpart). In addition, the $L_c$ of the carbon particles may in some cases be at most about 50, 45, 40, 35, 30, 25, 20, 15, 14, 13, 12, 11, 10, 5, 4.9, 4.8, 4.7, 4.6, 4.5, 4.4, 4.3, 4.2, 4.1, 4, 3.9, 3.8, 3.7, 3.6, 3.5, 3.4, 3.3, 3.2, 3.1, 3, 2.9, 2.8, 2.7, 2.6 or 2.5 times greater than that of the reference carbon black (e.g., furnace black counterpart). The carbon particles may have a d002 that is, for example, at least about 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 20%, 25% or 50% lower than that of a reference carbon black (e.g., furnace black counterpart). In addition, the d002 of the carbon particles may in some cases be at most about 50%, 25%, 20%, 15%, 14%, 13%, 12%, 11%, 10%, 9.5%, 9%, 8.5%, 8%, 7.5%, 7%, 6.5%, 6%, 5.5%, 5%, 4.5% or 4% lower than that of the reference carbon black (e.g., furnace black counterpart). The carbon particles may have a hydrogen content that is, for example, at least about 1%, 5%, 10%, 15%, 20%, 25%, 30%, 35%, 40%, 45%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 75%, 76%, 77%, 78%, 79%, 80%, 85%, 90%, 95%, 99% or 100% lower than that of a reference carbon black (e.g., furnace black counterpart). In addition, the hydrogen content may in some cases be at most about 100%, 99%, 95%, 90%, 85%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51% or 50% lower than that of a reference carbon black (e.g., furnace black counterpart). The carbon particles may have a sulfur content that is, for example, at least about 1%, 5%, 10%, 15%, 20%, 25%, 30%, 35%, 40%, 45%, 50%, 55%, 60%, 70%, 75%, 80%, 85%, 90%, 91%, 92%, 93%, 94%, 95%, 96%, 97%, 98%, 99%, 99.5%, 99.9% or 100% lower than that of a reference carbon black (e.g., furnace black counterpart). In addition, the sulfur content may in some cases be at most about 100%, 99.9%, 99.5%, 99%, 98%, 97%, 96%, 95%, 94%, 93%, 92%, 91% or 90% lower than that of a reference carbon black (e.g., furnace black counterpart). The carbon particles may have an oxygen content that is, for example, at least about 1%, 5%, 10%, 15%, 20%, 25%, 30%, 35%, 40%, 45%, 50%, 55%, 60%, 70%, 75%, 80%, 81%, 82%, 83%, 84%, 85%, 86%, 87%, 88%, 89%, 90%, 91%, 92%, 93%, 94%, 95%, 96%, 97%, 98%, 99%, 99.5%, 99.9% or 100% lower than that of a reference carbon black (e.g., furnace black counterpart). In addition, the oxygen content may in some cases be at most about 100%, 99.9%, 99.5%, 99%, 98%, 97%, 96%, 95%, 94%, 93%, 92%, 91%, 90%, 89%, 88%, 87%, 86%, 85%, 84%, 83%, 82%, 81%, 80%, 75%, 70%, 65% or 60% lower than that of a reference carbon black (e.g., furnace black counterpart). In some examples, the carbon particles may have a nitrogen content that is, for example, from about 10% lower to about 50% higher than that of the reference carbon black (e.g., furnace black counterpart). The carbon particles may have a nitrogen content that is, for example, at least about 1.01, 1.05, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 6, 7, 8, 9, 10, 11, 12, 13, 14, 15, 20, 25, 30, 35, 40, 45 or 50 times greater than that of a reference carbon black (e.g., furnace black counterpart). In addition, the nitrogen content of the carbon particles may in some cases be at most about 50, 45, 40, 35, 30, 25, 20, 15, 14, 13, 12, 11, 10, 5, 4.9, 4.8, 4.7, 4.6, 4.5, 4.4, 4.3, 4.2, 4.1, 4, 3.9, 3.8, 3.7, 3.6, 3.5, 3.4, 3.3, 3.2, 3.1, 3, 2.9, 2.8, 2.7, 2.6, 2.5, 2.4, 2.3, 2.2, 2.1, 2, 1.9, 1.8, 1.7, 1.6 or 1.5 times greater than that of the reference carbon black (e.g., furnace black counterpart). The carbon particles may have a nitrogen content that is, for example, at least about 0.1%, 0.5%, 1%, 2%, 3%, 4%, 5%, 6%, 7%, 8%, 9%, 10%, 12%, 14%, 16%, 18%, 20%, 25%, 30%, 35%, 40%, 45% or 50% lower than that of a reference carbon black (e.g., furnace black counterpart). In addition, the nitrogen content of the carbon particles may in some cases be at most about 100%, 99%, 90%, 75%, 50%, 45%, 40%, 35%, 30%, 25%, 20%, 18%, 16%, 14%, 12%, 10%, 9%, 8%, 7%, 6%, 5%, 4%, 3%, 2% or 1% lower than that of the reference carbon black (e.g., furnace black counterpart). The carbon particles may have such properties or characteristics even though the N2SA and DBP are almost unchanged. The aforementioned carbon particles (e.g., carbon nanoparticles) may be made, for example, in a one-step process as described in greater detail elsewhere herein.

Reference carbon particle(s) may include reference carbon black. A reference carbon black may be a carbon black material as made in the furnace black process (also "furnace process" herein), lampblack process, gas black process, channel black process, thermal black process, acetylene black process and/or historic gas furnace black process, and that has values of N2SA and DBP within 20% of the carbon particles (e.g., carbon nanoparticles) produced by the process(es) described herein. In some examples, the reference carbon black may only be provided by a subset (e.g., one) of these processes. In some examples, the reference carbon black may be a carbon black material as made in the furnace process (e.g., carbon black made via the furnace process with a heavy oil) that has values of N2SA and DBP within 20% of the carbon particles (e.g., carbon nanoparticles) produced by the process(es) described herein. The reference carbon black as made in the furnace process may in some instances be referred to herein as a "furnace black counterpart." The reference carbon black (e.g., furnace black counterpart) may refer to a given grade. Grades may be determined by the N2SA and by the DBP values (e.g., as described elsewhere herein). There may be very minimal variation in hydrogen content, oxygen content, sulfur content and crystallinity between reference carbon black made by different plants and different manufacturers (e.g., by different plants and different manufacturers using the furnace process). Only very minor differences may be determined due to differences in surface activity or crystallinity as all of the furnace blacks are very similar in these characteristics. In some examples, the reference carbon black may be a carbon black material as made in the thermal black process that has values of N2SA and DBP within 20% of the carbon particles (e.g., carbon nanoparticles) produced by the process(es) described herein.

In some examples, the carbon particles (e.g., carbon nanoparticles) may be less than about 1 micron or 700 nm volume equivalent sphere diameter and have an $L_c$ greater than about 3.0 nanometers (nm) or 4 nm. In addition, d002 of the carbon particle may be less than about 0.36 nm or 0.35 nm, include a fullerene-like surface structure, have 0.2% hydrogen or less by weight as produced, have 0.4% oxygen or less by weight as produced, have 0.3%, 50 ppm, 10 ppm, 5 ppm, 1 ppm or less sulfur by weight as produced, or any combination thereof.

The carbon particles (e.g., carbon black particles) described herein may have a higher tote than reference carbon particles (e.g., furnace black counterparts and/or other reference carbon black). The carbon particles (e.g., carbon black particles) described herein may have, for example, at least about 0%, 0.005%, 0.1%, 0.2%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 60%, 65%, 70%, 75%, 80%, 90%, 95% or 100% higher tote than that of reference carbon particles (e.g., reference carbon black). In addition, the tote may in some cases be at most about 100%, 95%, 90%, 85%, 80%, 75%, 70%, 65%, 60%, 55%, 50%, 45%, 40%, 35%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2% or 1% higher than that of reference carbon particles (e.g., reference carbon black).

The carbon particle(s) (e.g., carbon black particle(s)) described herein may have fewer acidic groups than reference carbon particles (e.g., reference carbon black). In addition, the acidic groups that are present may be weak acidic groups (e.g., phenol, quinone, etc.). The carbon particles (e.g., carbon black particles) described herein may have, for example, at least about 0%, 0.005%, 0.1%, 0.2%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 51%, 52%, 53%, 54%, 55%, 56%, 57%, 58%, 59%, 60%, 61%, 62%, 63%, 64%, 65%, 66%, 67%, 68%, 69%, 70%, 75%, 80%, 90%, 95% or 100% less (e.g., lower content of) surface acidic groups than reference carbon particles (e.g., reference carbon black). In addition, the content of surface acidic groups may in some cases be at most about 100%, 95%, 90%, 85%, 80%, 75%, 70%, 69%, 68%, 67%, 66%, 65%, 64%, 63%, 62%, 61%, 60%, 59%, 58%, 57%, 56%, 55%, 54%, 53%, 52%, 51%, 50%, 45%, 40%, 35%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2% or 1% lower than that of reference carbon particles (e.g., reference carbon black).

Carbon particles (e.g., carbon nanoparticles) produced in accordance with the present disclosure (e.g., in a plasma) may be compounded into rubber. The systems and methods (and processes) described herein may successfully generate quality carbon particles (e.g., carbon nanoparticles) that can reinforce elastomer compounds. Examples of properties and rubber performance results (e.g., when compared to furnace-based carbon black) are described, for example, in commonly assigned, co-pending Int. Pat. Pub. No. WO 2017/048621 ("CARBON BLACK FROM NATURAL GAS"), which is entirely incorporated herein by reference. In some examples, carbon black produced in accordance with the present disclosure may provide substantially similar or improved performance compared to reference carbon black. In some examples, using carbon black in accordance with the present disclosure may increase elastomer composite performance by greater than or equal to about 0%, 0.005%, 0.1%, 0.2%, 0.5%, 1%, 2%, 3%, 4%, 5%, 6%, 7%, 8%, 9%, 10%, 11%, 12%, 14%, 16%, 18%, 20%, 25%, 30%, 35%, 40%, 50%, 75% or 100% as compared to performance of an elastomer comprising a reference carbon black (also "reference carbon black elastomer composite" herein). Using an elastomer comprising carbon black produced in accordance with the present disclosure may provide such increases in performance at a given temperature (e.g., such (or corresponding) decreases in tan delta at 60° C.) while maintaining performance at another temperature (e.g., tan delta at 0° C.), thus providing such overall increases in performance over, for example, a given temperature range (e.g., increased "delta tan delta"). As described in greater detail elsewhere herein, the carbon particle(s) (e.g., carbon black) described herein may be more crystalline than reference carbon particle(s) (e.g., reference carbon black). In some examples, the carbon particle(s) (e.g., carbon black) may be more crystalline than reference carbon particle(s) (e.g., reference carbon black), yet performance in rubber may show that surface activity is present.

The carbon particles (e.g., carbon black particles) described herein may pelletize and/or disperse in polymer (e.g., rubber). In some examples, the carbon particles (e.g., carbon black particles) described herein may pelletize and/or disperse similar or substantially the same as reference carbon particles (e.g., reference carbon black).

The carbon particles (e.g., carbon black particles) described herein may charge and/or disperse with carbon surfactants in a similar fashion as reference carbon particles (e.g., reference carbon black). In some examples, the carbon particles (e.g., carbon black particles) described herein may have substantially the same particle charging in solution as reference carbon particles (e.g., reference carbon black). In some examples, the carbon particles (e.g., carbon black particles) may have potential to disperse faster than reference carbon particles (e.g., reference carbon black). Zeta potential analysis may be used to quantify the charging and/or dispersion. With aqueous solutions and a cationic short polymer chain ammonium based surfactant, the carbon particles (e.g., carbon black particles) described herein may charge to a Zeta potential of, for example, greater than or equal to about 5 millivolt (mV), 10 mV, 15 mV, 20 mV, 25 mV, 30 mV, 31 mV, 32 mV, 33 mV, 34 mV, 35 mV, 36 mV, 37 mV, 38 mV, 39 mV, 40 mV, 45 mV or 50 mV. Alternatively, or in addition, the carbon particles (e.g., carbon black particles) described herein may charge to a Zeta potential of, for example, less than or equal to about 50 mV, 45 mV, 40 mV, 39 mV, 38 mV, 37 mV, 36 mV, 35 mV, 34 mV, 33 mV, 32 mV, 31 mV, 30 mV, 25 mV, 20 mV, 15 mV or 10 mV (with aqueous solutions and a cationic short polymer chain ammonium based surfactant). With aqueous solutions and anionic methacrylate short chain polymer surfactant, the carbon particles (e.g., carbon black particles) described herein may charge to a Zeta potential of, for example, greater than or equal to about −80 mV, −75 mV, −70 mV, −65 mV, −60 mV, −59 mV, −58 mV, −57 mV, −56 mV, −55 mV, −50 mV, −49 mV, −48 mV, −47 mV, −46 mV, −45 mV, −44 mV, −43 mV, −42 mV, −41 mV, −40 mV, −39 mV, −38 mV, −37 mV, −36 mV, −35 mV, −30 mV, −25 mV, −20 mV or −15 mV. Alternatively, or in addition, the carbon particles (e.g., carbon black particles) described herein may charge to a Zeta potential of, for example, less than or equal to about −15 mV, −20 mV, −25 mV, −30 mV, −35 mV, −36 mV, −37 mV, −38 mV, −39 mV, −40 mV, −41 mV, −42 mV, −43 mV, −44 mV, −45 mV, −46 mV, −47 mV, −48 mV, −49 mV, −50 mV, −55 mV, −56 mV, −57 mV, −58 mV, −59 mV, −60 mV, −65 mV or −70 mV (with aqueous solutions and anionic methacrylate short chain polymer surfactant). The carbon particles may have such charging properties contents in combination with one or more other properties described herein.

In some examples, the carbon particles (e.g., carbon black particles) described herein may be less hydrophilic than reference carbon particles (e.g., furnace black counterparts and/or other reference carbon black). This may result in faster dispersion in polymer (e.g., elastomer) and/or less moisture in as produced carbon particle(s) (e.g., carbon black). The carbon particles (e.g., carbon black particles) described herein may have, for example, at least about 0%, 0.005%, 0.1%, 0.2%, 0.5%, 1%, 2%, 3%, 4%, 5%, 6%, 7%, 8%, 9%, 10%, 11%, 12%, 14%, 16%, 18%, 20%, 25%, 30%, 35%, 40%, 45%, 50%, 60%, 70%, 75%, 80%, 90%, 95% or 100% lower hydrophilicity (e.g., in terms of WSP) than reference carbon particles (e.g., a reference carbon black and/or a nitric acid treated reference carbon black).

The carbon particles (e.g., carbon black particles) described herein may have a lower moisture content (e.g., % as determined by elemental analysis) than reference carbon particles (e.g., reference carbon black). The carbon particles (e.g., carbon black particles) described herein may have, for example, at least about 0%, 0.005%, 0.1%, 0.2%, 0.5%, 1%, 2%, 3%, 4%, 5%, 6%, 7%, 8%, 9%, 10%, 11%, 12%, 14%, 16%, 18%, 20%, 25%, 30%, 35%, 40%, 45%, 50%, 60%, 65%, 70%, 75%, 80%, 90%, 95% or 100% lower moisture content than that of reference carbon particles (e.g., reference carbon black). In addition, the moisture content may in some cases be at most about 100%, 95%, 90%, 85%, 80%, 75%, 70%, 65%, 60%, 55%, 50%, 45%, 40%, 35%, 30%, 25%, 20%, 18%, 16%, 14%, 12%, 11%, 10%, 9%, 8%, 7%, 6%, 5%, 4%, 3%, 2% or 1% lower than that of reference carbon particles (e.g., reference carbon black).

The carbon particles (e.g., carbon black particles) described herein may disperse faster than reference carbon particles (e.g., furnace black counterparts and/or other reference carbon black). The carbon particles (e.g., carbon black particles) described herein may have, for example, at least about 0%, 0.005%, 0.1%, 0.2%, 0.5%, 1%, 2%, 3%, 4%, 5%, 6%, 7%, 8%, 9%, 10%, 11%, 12%, 14%, 16%, 18%, 20%, 25%, 30%, 35%, 40%, 45%, 50%, 60%, 65%, 70%, 75%, 80%, 90%, 95% or 100% faster dispersion than that of reference carbon particles (e.g., reference carbon black). In addition, the dispersion may in some cases be at most about 100%, 95%, 90%, 85%, 80%, 75%, 70%, 65%, 60%, 55%, 50%, 45%, 40%, 35%, 30%, 25%, 20%, 18%, 16%, 14%, 12%, 11%, 10%, 9%, 8%, 7%, 6%, 5%, 4%, 3%, 2% or 1% faster than that of reference carbon particles (e.g., reference carbon black).

Carbon particle(s) (e.g., carbon nanoparticle(s)) produced in accordance with the present disclosure may be analyzed using field emission scanning electron microscopy (FE-SEM) and/or transmission electron microscopy (TEM) analysis. Such analysis may be used, for example, to identify surface active sites. When analyzed using FESEM and/or TEM, the carbon particle(s) (e.g., carbon black) may look (e.g., visually appear) substantially the same as reference carbon particle(s) (e.g., reference carbon black) even though analytically the particle(s) may have substantial (e.g., strong) differences compared to the reference particle(s). Such differences may be as described elsewhere herein.

The carbon particle(s) (e.g., carbon black) described herein may have one or more properties that are substantially similar (e.g., the same) to reference carbon particles (e.g., reference carbon black), one or more properties that are substantially different from reference carbon particles (e.g., reference carbon black), or a combination thereof. For example, a carbon black described herein may have one or more substantially similar (e.g., the same) properties as a reference carbon black. In an example, a carbon black (e.g., with N2SA from about 23 $m^2/g$ to about 35 $m^2/g$ and DBP from about 59 ml/100 g to about 71 ml/100 g, or N2SA from about 19 $m^2/g$ to about 39 $m^2/g$ and DBP from about 55 ml/100 g to about 75 ml/100 g) in accordance with the present disclosure may have the following properties compared to a reference carbon black (e.g., furnace black counterpart): substantially the same (e.g., the same) surface area and structure (e.g., as described in greater detailed elsewhere herein in relation to surface area and structure of a reference carbon black/furnace black counterpart) as the reference carbon black (e.g., furnace black counterpart); substantially the same (e.g., the same) ability to reinforce elastomers; increased delta tan delta; more crystalline than furnace black; aggregated ellipsoidal particles; pelletizes and disperses in polymer (e.g., rubber) in substantially the same (e.g., the same) way as furnace black; potential to disperse faster; lower hydrogen and oxygen content when compared to furnace black; less hydrophilic than furnace black; less surface acid groups than furnace black; and substantially the same (e.g., the same) particle size distribution and particle charging in solution when compared to furnace black. In another example, a carbon black (e.g., with N2SA from about 29 $m^2/g$ to about 41 $m^2/g$ and DBP from about 84 ml/100 g to about 96 ml/100 g, or N2SA from about 25 $m^2/g$ to about 45 $m^2/g$ and DBP from about 80 ml/100 g to about 100 ml/100 g) in accordance with the present disclosure may have the following properties compared to a reference carbon black (e.g., furnace black counterpart): substantially the same (e.g., the same) surface area and structure (e.g., as described in greater detailed elsewhere herein in relation to surface area and structure of a reference carbon black/furnace black counterpart) as the reference carbon black (e.g., furnace black counterpart); slightly decreased or substantially the same ability to reinforce SBR in ASTM D3191 formulation; aggregated ellipsoidal particles; pelletizes and disperses in polymer (e.g., rubber) in substantially the same way (e.g., the same way) as furnace black; potential to disperse faster; more crystalline than furnace black; lower hydrogen and oxygen content when compared to furnace black; less hydrophilic than furnace black; less surface acid groups than furnace black; and substantially the same (e.g., the same) particle size distribution and particle charging in solution when compared to furnace black.

In an example, a carbon black in accordance with the present disclosure may have iodine number of about 40 mg/g, STSA of about 36 $m^2/g$, N2SA of about 31 $m^2/g$, DBP of about 65 ml/100 g; CDBP of about 65 ml/100 g, individual pellet hardness of about 18-90 gf, average pellet hardness of about 48 gf, sieve residue (325 mesh) of less than about 50 ppm, sieve residue (35 mesh) of about 0 ppm, maximum fines (5') of about 5%, maximum fines (20') of about 10%, tote of about 96%, and moisture of less than about 0.5%. In another example, a carbon black in accordance with the present disclosure may have iodine number of about 38 mg/g, STSA of about 37 $m^2/g$, N2SA of about 33 $m^2/g$, DBP of about 85 ml/100 g; CDBP of about 79 ml/100 g, individual pellet hardness of about 18-90 gf, average pellet hardness of about 50 gf, sieve residue (325 mesh) of about 125 ppm, sieve residue (35 mesh) of about 0 ppm, fines (5') of about 0.5%, fines (20') of about 1.2%, tote of about 93%, and moisture of less than about 0.5%. In another example, a carbon black in accordance with the present disclosure may have iodine number of about 49 mg/g, STSA of about 44 $m^2/g$, N2SA of about 39 $m^2/g$, DBP of about 104 ml/100 g; CDBP of about 94 ml/100 g, individual pellet hardness of about 18-90 gf, sieve residue (325 mesh) of about 80 ppm, sieve residue (35 mesh) of about 0 ppm, tote of about 98%, and moisture of less than about 0.5%. In yet another example, a carbon black in accordance with the present disclosure may have iodine number of about 30 mg/g, STSA of about 27 $m^2/g$, N2SA of about 24 $m^2/g$, DBP of about 72 ml/100 g; CDBP of about 69 ml/100 g, individual pellet hardness of about 18-90 gf, average pellet hardness of about 51 gf, sieve residue (325 mesh) of less than about 50 ppm, sieve residue (35 mesh) of about 0 ppm, maximum fines (5') of about 5%, maximum fines (20') of about 10%, tote of about 97%, and moisture of less than about 0.5%.

As previously described, the carbon particle(s) (e.g., carbon black particle(s)) described herein may have various combinations of the properties described herein (e.g., the particle(s) may have a given property in combination with one or more other properties described herein). For example, the carbon particle may have one or more (values) of a given property in combination with (other than itself) one or more shapes (e.g., ellipsoidal factors) described herein, one or more sizes/size distributions (e.g., volume equivalent sphere diameters and/or particle sizes/size distributions determined by DLS) described herein, one or more true densities described herein, one or more crystallinities (e.g., $L_a$, $L_c$ and/or d002 values) described herein, one or more hydrophilic contents (e.g., affinities to absorb water and/or WSP values) described herein, one or more surface acid group contents described herein, one or more oxygen contents described herein, one or more hydrogen contents described herein, one or more sulfur contents described herein, one or more nitrogen contents described herein, one or more carbon contents described herein, one or more surface areas (e.g., N2SA and/or STSA values) described herein, one or more structures (e.g., one or more DBP values) described herein, one or more PAH contents (e.g., amounts of PAHs and/or tote values) described herein, one or more purities (e.g., ash, metal/metalloid, ionic, coke and/or grit contamination levels) described herein, one or more fullerene-like moieties described herein, one or more reinforcing properties (e.g., tangent delta (also "tan delta" herein) and/or other relevant values) described herein, one or more iodine numbers described herein, one or more pellet properties (e.g., individual and/or average pellet hardness values) described herein, one or more sieve residues (e.g., 325 and/or 35 mesh) described herein, one or more fines contents (e.g., 5' and/or 20') described herein, one or more moisture contents described herein, one or more charging and/or dispersion (in solution) properties described herein, or any combination thereof.

In some examples, the carbon particles (e.g., carbon black) described herein may have N2SA that is greater than about 10 m²/g and less than about 100 m²/g. In some examples, the carbon particles (e.g., carbon black) described herein may have N2SA of less than about 100 m²/g, 50 m²/g, 46 m²/g, 45 m²/g, 41 m²/g, 40 m²/g, 39 m²/g, 35 m²/g, 34 m²/g, 30 m²/g, 29 m²/g, 23 m²/g or 19 m²/g, 15 m²/g or 13 m²/g. The carbon particles may have such surface areas, for example, in combination with DBP of less than about 140 ml/100 g, 135 ml/100 g or 130 ml/100 g. In some examples, the carbon particles (e.g., carbon black) described herein may have N2SA from about 2 m²/g to about 14 m²/g, and DBP from about 37 ml/100 g to about 49 ml/100 g or from about 33 ml/100 g to about 53 ml/100 g. In some examples, the carbon particles (e.g., carbon black) described herein may have N2SA from about 10 m²/g or 18 m²/g to about 29 m²/g or 37 m²/g, and DBP from about 82 ml/100 g or 83 ml/100 g to about 135 ml/100 g. In some examples, the carbon particles (e.g., carbon black) described herein may have N2SA from about 15 m²/g to about 28 m²/g or from about 10 m²/g to about 30 m²/g, and DBP from about 87 ml/100 g to about 102 ml/100 g or from about 82 ml/100 g to about 102 ml/100 g. In some examples, the carbon particles (e.g., carbon black) described herein may have N2SA from about 22 m²/g to about 34 m²/g or from about 17 m²/g to about 37 m²/g, and DBP from about 113 ml/100 g to about 128 ml/100 g or from about 110 ml/100 g to about 130 ml/100 g. In some examples, the carbon particles (e.g., carbon black) described herein may have N2SA from about 19 m²/g or 25 m²/g to about 38 m²/g or 42 m²/g, and DBP from about 39 ml/100 g to about 77 ml/100 g or 82 ml/100 g. In some examples, the carbon particles (e.g., carbon black) described herein may have N2SA from about 23 m²/g to about 35 m²/g and DBP from about 59 ml/100 g to about 71 ml/100 g, or N2SA from about 19 m²/g to about 39 m²/g and DBP from about 55 ml/100 g to about 75 ml/100 g. In some examples, the carbon particles (e.g., carbon black) described herein may have N2SA from about 24 m²/g to about 36 m²/g and DBP from about 66 ml/100 g to about 78 ml/100 g, or N2SA from about 20 m²/g to about 40 m²/g and DBP from about 62 ml/100 g to about 82 ml/100 g. In some examples, the carbon particles (e.g., carbon black) described herein may have N2SA from about 26 m²/g to about 38 m²/g and DBP from about 59 ml/100 g to about 71 ml/100 g, or N2SA from about 22 m²/g to about 42 m²/g and DBP from about 55 ml/100 g to about 75 ml/100 g. In some examples, the carbon particles (e.g., carbon black) described herein may have N2SA from about 24 m²/g to about 37 m²/g or from about 22 m²/g to about 42 m²/g, and DBP from about 42 ml/100 g to about 57 ml/100 g or from about 42 ml/100 g to about 62 ml/100 g. In some examples, the carbon particles (e.g., carbon black) described herein may have N2SA from about 17 m²/g or 24 m²/g to about 51 m²/g, and DBP from about 108 ml/100 g to about 133 ml/100 g. In some examples, the carbon particles (e.g., carbon black) described herein may have N2SA from about 29 m²/g to about 41 m²/g and DBP from about 84 ml/100 g to about 96 ml/100 g, or N2SA from about 25 m²/g to about 45 m²/g and DBP from about 80 ml/100 g to about 100 ml/100 g. In some examples, the carbon particles (e.g., carbon black) described herein may have N2SA from about 30 m²/g to about 42 m²/g and DBP from about 116 ml/100 g to about 128 ml/100 g, or N2SA from about 26 m²/g to about 46 m²/g and DBP from about 112 ml/100 g to about 132 ml/100 g. In some examples, the carbon particles (e.g., carbon black) described herein may have N2SA from about 34 m²/g to about 46 m²/g and DBP from about 115 ml/100 g to about 127 ml/100 g, or N2SA from about 30 m²/g to about 50 m²/g and DBP from about 111 ml/100 g to about 131 ml/100 g. In some examples, the carbon particles (e.g., carbon black) described herein may have N2SA of (e.g., about) 15-35 m²/g and DBP of (e.g., about) 115-127 ml/100 g with low 325 ppm grit and low sulfur (e.g., as described elsewhere herein). In some examples, the carbon particles (e.g., carbon black) described herein may have N2SA of (e.g., about) N2SA 15-35 m²/g and DBP of (e.g., about) DBP 80-100 ml/100 g with low 325 ppm grit and low sulfur (e.g., as described elsewhere herein). In some examples, the carbon particles (e.g., carbon black) described herein may have N2SA from about 29 m²/g, 23 m²/g or 19 m²/g to about 8 m²/g, 13 m²/g or 14 m²/g, and DBP from about 65 ml/100 g, 59 ml/100 g or 55 ml/100 g to about 43 ml/100 g, 47 ml/100 g, 49 ml/100 g or 53 ml/100 g. In some examples, the carbon particles (e.g., carbon black) described herein may have N2SA from about 10 m²/g to about 30 m²/g and DBP from about 70 ml/100 g to about 120 ml/100 g. In some examples, the carbon particles (e.g., carbon black) described herein may have N2SA from about 10 m²/g to about 30 m²/g and DBP from about 80 ml/100 g to about 115 ml/100 g. In some examples, the carbon particles (e.g., carbon black) described herein may have N2SA from about 15 m²/g to about 20 m²/g and DBP from about 80 ml/100 g to about 100 ml/100 g. In some examples, the carbon particles (e.g., carbon black) described herein may have N2SA from about 17 m²/g or 24 m²/g to about 51 m²/g, and DBP from about 108 ml/100 g to about 133 ml/100 g. In some examples, the carbon particles (e.g., carbon black) described herein may have N2SA from about 20 m²/g to about 50 m²/g, and DBP from about 110 ml/100 g to about 130 ml/100 g. In some examples, the carbon particles (e.g., carbon black) described herein may have N2SA from about 30 m²/g to about 50 m²/g, and DBP greater than or equal to about 111 ml/100, 120 ml/100 or 150 ml/100. In some examples, the carbon particles (e.g., carbon black) described herein may have N2SA from about 19 m²/g to about 50 m²/g, and DBP from about 42 ml/100 g to about 131 ml/100 g. In some examples, the carbon particles (e.g., carbon black) described herein may have N2SA from about 20 m²/g to about 40 m²/g and structure from about 45 ml/100 g to about 95 ml/100 g. In some examples, the carbon particles (e.g., carbon black) described herein may have N2SA from about 19 m²/g to about 50 m²/g, and DBP from about 42 ml/100 g to about 131 ml/100 g. In some examples, the carbon particles (e.g., carbon black) described herein may have N2SA from about 19 m²/g to about 45 m²/g, and DBP from about 42 ml/100 g to about 100 ml/100 g. In some examples, the carbon particles (e.g., carbon black) described herein may have N2SA from about 19 m²/g to about 45 m²/g, and DBP from about 55 ml/100 g to about 100 ml/100 g. In some examples, the carbon particles (e.g., carbon black) described herein may have N2SA from about 22 m²/g to about 45 m²/g, and DBP from about 42 ml/100 g to about 100 ml/100 g. The carbon particles may have the aforementioned surface areas and structures in combination with low grit levels and high purity (e.g., which may be as described elsewhere herein). The carbon particles may have the aforementioned surface areas and structures in combination with low grit, low ash and/or low sulfur levels (e.g., which may be as described elsewhere herein). For example, the carbon particles (e.g., carbon black) may have an ash content of less than (e.g., about) 2%, 1.5%, 0.05%, 0.03% or 0.01% (e.g., by weight), a sulfur content of less than about 1.5%, 1%, 0.3%, 0.1%, 0.03%, 50 ppm, 10 ppm, 5 ppm or 1 ppm (e.g., by weight), and/or less than about 5 ppm or 1 ppm of 325 mesh grit sieve residue. The carbon particles (e.g., carbon black) may have such properties, for example, in combination with a suitable hydrophilicity, a suitable PAH content, a suitable (e.g., improved) conductivity and/or other suitable properties/characteristics. At least a subset of such carbon particles may be used, for example, in industrial rubber and/or plastics applications, as described in greater detail elsewhere herein (e.g., in one or more of radiator hose/ECD automotive hose applications, weather stripping/extrusion applications, seals, gaskets and molded goods).

The carbon particles (e.g., carbon black) described herein may be advantageously used in polymer applications. The carbon particles (e.g., carbon black) described herein may be advantageously used in industrial rubber and/or plastics applications. Examples of such applications may include, but are not limited to, molded, sheeted, injection, extruded and/or compression parts, hoses, belts, profiles, o-rings, gaskets, seals, sponges and/or other parts/articles. For example, the carbon particles (e.g., carbon black) described herein may be advantageously used in industrial rubber and/or plastics applications, such as, for example, radiator hose applications, automotive extrusions, cable flooding/insulation for medium voltage power cables, seals/sealing and/or other such applications. The carbon particles (e.g., carbon black) may be used in molded and/or extruded polymers (e.g., molded and/or extruded elastomers). The carbon particles (e.g., carbon black) described herein may be advantageously compounded in polymer(s) (e.g., rubber(s)) and/or in plastic(s). For example, the carbon particles may be compounded in nitrile butadiene rubber (NBR), hydrogenated nitrile butadiene rubber (HNBR), ethylene propylene diene monomer (M-class) rubber (EPDM) (a type of synthetic rubber classified in accordance with ASTM D1418), fluorinated elastomers (e.g., fluoroelastomers (FKM by ASTM D1418 standard) and/or perfluoroelastomers (FFKM by ASTM D1418 standard)), etc. An elastomer may be synthetic or natural. The term elastomer may be used interchangeably with the term rubber. The carbon particles (e.g., carbon black particles) in accordance with the present disclosure may be advantageously used (e.g., compounded) in various polymers. Performance metric(s) of such carbon particles in such applications may be, for example, similar or substantially the same as a first reference carbon black (e.g., furnace black counterpart), increased or improved compared to a second reference carbon black (e.g., the same or a different reference carbon black), or any combination thereof (e.g., a given performance metric may be increased or improved while another performance metric may be substantially the same). The carbon particles (e.g., carbon black particles) may exhibit, for example, similar or substantially the same level of reinforcement compared to a reference carbon black (e.g., furnace black counterpart). The carbon particles may influence various performance metrics (e.g., properties and/or performance) of the resulting materials and/or products/applications. The products/applications may have given performance, physical properties, etc. For example, the products/applications may have given reinforcement, ultimate elongation, abrasion, tear, tear strength, tensile strength, modulus, die swell, loading capacity, resilience, cleanliness, conductivity, dispersion, dispersability, extrusion, extrudability, extrusion properties, extrusion smoothness, processing, processability, formability, flow, loadability, viscosity, surface defects/imperfections, iridescence, surface finish, aesthetics, electrochemical degradation (ECD), dimensional stability, mold cleanliness, corrosion resistance, hardness, green strength, electrical conductivity/resistivity, electrostatic cracking resistance, cure rate, heat age, number of physical properties impacted by heat testing, heat aged physical properties, dynamic performance (e.g., as measured by flex cycles and resistance to crack initiation), number of flex cycles, crack initiation/resistance to crack initiation, failure, ease of stripping, product life, cable life, mold flow, mold life, life in dynamic environments, etc. A performance metric of a material and/or product/application using the carbon particles (e.g., carbon black) of the present disclosure may be, for example, at least about 0.1%, 0.5%, 1%, 2%, 5%, 10%, 15%, 20%, 25%, 30%, 35%, 40%, 45%, 50%, 55%, 60%, 65%, 70%, 75%, 80%, 85%, 90%, 95%, 99% or 100% higher or lower (e.g., larger, smaller, enhanced or improved) compared to the same material and/or product/application using a reference carbon black (e.g., furnace black counterpart). In addition, the performance metric of a material and/or product/application using the carbon particles (e.g., carbon black) of the present disclosure may in some cases be at most about 100%, 99%, 95%, 90%, 85%, 80%, 75%, 70%, 65%, 60%, 55%, 50%, 45%, 40%, 35%, 30%, 25%, 20%, 15%, 10%, 5%, 2%, 1% or 0.5% higher or lower (e.g., larger, smaller, enhanced or improved) than that of the same material and/or product/application using the reference carbon black (e.g., furnace black counterpart).

The carbon particles (e.g., carbon black) described herein may be used, for example, in radiator hose applications. Radiator hoses for automotive applications may be made using, for example, EPDM rubber. Electrochemical degradation (ECD) may be caused by and/or related to, for example, the electrical conductivity of the rubber compound, the contact of the rubber hose with aluminum or magnesium, and/or the fluid flowing in the hose. ECD may manifest itself as longitudinal crack(s) on the interior of the inner layer of the hose that may propagate and lead to leaks and/or failure of the hose. Multiple competing needs/constraints may need to be balanced during compounding (e.g., hose compounding), such as, for example, processing the compound, forming the hose and/or conductivity. The carbon particles (e.g., carbon black) may impact such performance metric(s) (e.g., properties/characteristics). Processing of a hose product may be enhanced by a large particle, high structure carbon particle (e.g., carbon black) which may aid dispersion and good extrusion. The hose forming process may require high green (or uncured) strength to allow the hose to be formed and/or to be placed onto a mandrel for shaping to a specific dimension (e.g., to be formed and perhaps to be placed onto a mandrel for shaping to a specific dimension). The green strength may be promoted by high structure in the carbon particles (e.g., carbon black). The hose may need to have a suitable electrical resistivity (e.g., in this case, the opposite of conductivity, electrical resistivity, may be required). The electrical resistivity may be increased with larger particle size carbon particles (e.g., carbon blacks) with low structure. To balance these needs, carbon particles (e.g., carbon blacks) with extremely large particle size (e.g., 15-20 $m^2/g$ N2SA) and mid-range structure (e.g., DBP 90 ml/100 g) may provide sufficient structure for processing and hose formation, while having suitable (e.g., appropriate) resistivity due to the larger particle size. The carbon particles (e.g., carbon black) may have N2SA from about 10 $m^2/g$ to about 30 $m^2/g$, and DBP from about 70 ml/100 g to about 120 ml/100 g. The carbon particles (e.g., carbon black) may have N2SA from about 10 $m^2/g$ to about 30 $m^2/g$, and DBP from about 80 ml/100 g to about 115 ml/100 g. The carbon particles (e.g., carbon black) may have N2SA from about 15 $m^2/g$ to about 20 $m^2/g$, and DBP from about 80 ml/100 g to about 100 ml/100 g. The carbon particles (e.g., carbon black) may have N2SA from about 15 $m^2/g$ to about 28 $m^2/g$ or from about 10 $m^2/g$ to about 30 $m^2/g$, and DBP from about 87 ml/100 g to about 102 ml/100 g or from about 82 ml/100 g to about 102 ml/100 g. The properties/characteristics (e.g., lower levels of ash, sulfur, etc.) of the carbon particles described herein may advantageously improve/enhance the performance metrics (e.g., properties/characteristics) of the hose. Performance metric(s) of such carbon particles in radiator hose applications may be, for example, similar or substantially the same as a first reference carbon black, increased, decreased, enhanced or improved compared to a second reference carbon black (e.g., the same or different than the first reference carbon black), or any combination thereof (e.g., a given performance metric may be improved while another performance metric may be substantially the same). The performance metric(s) may include, for example, the aforementioned parameters. For example, a polymer product (e.g., a radiator hose) comprising carbon particles of the present disclosure with N2SA from about 10 $m^2/g$ to about 30 $m^2/g$ and structure from about 70 ml/100 g to about 120 ml/100 g, or with N2SA from about 15 $m^2/g$ to about 20 $m^2/g$ and structure from about 80 ml/100 g to about 100 ml/100 g, may have (i) enhanced or improved processability, (ii) enhanced or improved formability, (iii) increased electrical resistivity, (iv) enhanced or improved dispersion, (v) enhanced or improved extrusion, and/or (vi) increased green strength compared with a polymer product comprising a reference carbon black. The comparison of a given performance metric (e.g., processability, formability, electrical conductivity/resistivity, dispersion, extrusion, green strength, etc.) with t reference carbon black may be, for example, as described elsewhere herein (e.g., in %).

The carbon particles (e.g., carbon black) described herein may be used, for example, in automotive extrusions. Automotive extrusions may be highly loaded EPDM formulas. The extrusions may be dense or sponge. Examples of parts may include, for example, window weather stripping and trunk gaskets. As the appearance of the visible weather stripping can play a large part in marketability of a vehicle (e.g., in the dealership), aesthetics may be important (e.g., aesthetics may be a strong driving force in the automotive extrusion segment). Performance metrics may include, for example, extrusion smoothness, lack of (e.g., visible) surface defects or imperfections (e.g., surface imperfections/ visible defects such as, for example, small dots on the surface) and iridescence on the EPDM surface. The needs/ constraints may include, for example, dispersion and extrusion properties, grit levels and iridescence. The carbon particles (e.g., carbon black) may impact such performance metric(s) (e.g., properties/characteristics). The automotive extrusion may need to have suitable dispersion and/or good extrusion properties. Grit levels within the carbon particles (e.g., carbon black) may be of importance. Grit particles above a certain size may not (e.g., cannot) be dispersed and may manifest themselves as surface imperfections/defects. Iridescence may be caused by residual sulfur and oxygen groups (e.g., on furnace carbon blacks). The carbon particles (e.g., carbon black) may have a DBP, for example, in the 120 ml/100 g range. The carbon particles (e.g., carbon black) may have properties (e.g., DBP) that may provide suitable green strength and/or dimensional stability. The extrusions may be very complex in cross-section, and dimensional control may be critical. Given the high loadings of the carbon particles (e.g., black) in the formulation, larger particle sizes (e.g., 20-50 $m^2/g$ N2SA) may be preferred as these may lead to better dispersion and more efficient extrusion process. The carbon particles (e.g., carbon black) may have N2SA from about 17 $m^2/g$ or 24 $m^2/g$ to about 51 $m^2/g$, and DBP from about 108 ml/100 g to about 133 ml/100 g. The carbon particles (e.g., carbon black) may have N2SA from about 20 $m^2/g$ to about 50 $m^2/g$, and DBP from about 110 ml/100 g to about 130 ml/100 g. The carbon particles (e.g., carbon black) may have N2SA from about 22 $m^2/g$ to about 34 $m^2/g$ or from about 17 $m^2/g$ to about 37 $m^2/g$, and DBP from about 113 ml/100 g to about 128 ml/100 g or from about 110 ml/100 g to about 130 ml/100 g. The carbon particles (e.g., carbon black) may have N2SA from about 30 $m^2/g$ to about 42 $m^2/g$ and DBP from about 116 ml/100 g to about 128 ml/100 g, or N2SA from about 26 $m^2/g$ to about 46 $m^2/g$ and DBP from about 112 ml/100 g to about 132 ml/100 g. The carbon particles (e.g., carbon black) may have N2SA from about 34 $m^2/g$ to about 46 $m^2/g$ and DBP from about 115 ml/100 g to about 127 ml/100 g, or N2SA from about 30 $m^2/g$ to about 50 $m^2/g$ and DBP from about 111 ml/100 g to about 131 ml/100 g. The carbon particles (e.g., carbon black) described herein (e.g., produced in accordance with the processes described herein, such as, for example, a process including a classifier and/or other size reduction (e.g., air classifier mill, hammer mill, jet mill and/or classifier) process) may have a suitable (e.g., range of) purity/low grit. The carbon particles (e.g., carbon black) described herein may have a given combination of purities, such as, for example, a given combination of the grit, sulfur, ash, nitrogen and oxygen levels described herein (e.g., a given combination of purity, both grit and sulfur, ash, nitrogen and oxygen). Such carbon particle products may provide, for example, suitable properties to meet the needs including, for example, dispersibility, extrudability, low defect rates and iridescence control. Performance metric(s) of such carbon particles in automotive extrusion applications may be, for example, similar or substantially the same as a first reference carbon black, increased, decreased, enhanced or improved compared to a second reference carbon black (e.g., the same or different than the first reference carbon black), or any combination thereof (e.g., a given performance metric may be improved while another performance metric may be substantially the same). The performance metric(s) may include, for example, the aforementioned parameters. For example, a polymer product (e.g., an automotive extrusion) comprising carbon particles of the present disclosure with N2SA from about 17 $m^2/g$ to about 51 $m^2/g$ and structure from about 108 ml/100 g to about 133 ml/100 g, or with N2SA from about 20 $m^2/g$ to about 50 $m^2/g$ and structure from about 110 ml/100 g to about 130 ml/100 g, may have (i) reduced surface imperfections/defects, (ii) reduced iridescence, (iii) enhanced or improved dimensional stability, (iv) enhanced or improved dispersion, (v) enhanced or improved extrusion properties, (v) enhanced or improved extrusion smoothness and/or (vi) increased green strength compared with a polymer product comprising a reference carbon black. The comparison of a given performance metric (e.g., dispersion, extrusion properties, extrusion smoothness, surface imperfections/defects, iridescence, green strength, dimensional stability, etc.) with a reference carbon black may be, for example, as described elsewhere herein (e.g., in %).

The carbon particles (e.g., carbon black) described herein may be used, for example, in cable flooding/insulation for medium voltage power cables. Cable flooding may be a plastic-based compound between the cable and the outer jacketing. The needs/constraints (e.g., of these compounds) may include, for example, ease of stripping, conductivity, processability and/or cleanliness. Multiple competing needs/ constraints may need to be balanced during compounding (e.g., the compounding balance may include needs/constraints), such as, for example, a desire for larger particle size and high structure to promote dispersion and processability, and conductivity needs pushing for a smaller particle size but still high structure. From a cleanliness standpoint, low levels of 325 mesh grit, sulfur, ash and ionic impurities may (e.g., all) contribute to extending cable life. The carbon particles in accordance with the present disclosure (e.g., made using a pure feedstock) may have a 40 $m^2/g$ N2SA and high DBP (e.g., greater than or equal to about 150 ml/100 g) and limited S, O and N in the final carbon particles (e.g., carbon black). The carbon particles (e.g., carbon black) may have N2SA from about 30 $m^2/g$ to about 50 $m^2/g$, and DBP greater than or equal to about 111 ml/100. The carbon particles (e.g., carbon black) may have N2SA from about 30 $m^2/g$ to about 50 $m^2/g$, and DBP greater than or equal to about 120 ml/100. The carbon particles (e.g., carbon black) may have N2SA from about 30 $m^2/g$ to about 50 $m^2/g$, and DBP greater than or equal to about 150 ml/100. The carbon particles (e.g., carbon black) may have N2SA from about 34 $m^2/g$ to about 46 $m^2/g$ and DBP from about 115 ml/100 g to about 127 ml/100 g, or N2SA from about 30 $m^2/g$ to about 50 $m^2/g$ and DBP from about 111 ml/100 g to about 131 ml/100 g. The carbon particles (e.g., carbon black) may have such surface areas and structures in combination with limited S, O and N in the final carbon particles (e.g., carbon black). Additionally, the processes described herein (e.g., including the use of, for example, suitable classifier and/or other size reduction equipment, as described elsewhere herein) may lead to low grit products with the chemical purity. Performance metric(s) of such carbon particles in cable flooding/insulation for medium voltage power cables applications may be, for example, similar or substantially the same as a first reference carbon black, increased, decreased, enhanced or improved compared to a second reference carbon black (e.g., the same or different than the first reference carbon black), or any combination thereof (e.g., a given performance metric may be improved while another performance metric may be substantially the same). The performance metric(s) may include, for example, the aforementioned parameters. For example, a polymer product (e.g., cable flooding/insulation for medium voltage power cables) comprising carbon particles of the present disclosure with N2SA from about 30 $m^2/g$ to about 50 $m^2/g$ and structure greater than or equal to 111 ml/100 g, or with N2SA from about 30 $m^2/g$ to about 50 $m^2/g$ and structure greater than or equal to about 150 ml/100 g, may have (i) enhanced or improved processability, (ii) enhanced or improved ease of stripping, (iii) increased cleanliness, (iv) increased conductivity, (v) enhanced or improved dispersion, and/or (vi) enhanced or improved cable life compared with a polymer product comprising a reference carbon black. The comparison of a given performance metric (e.g., ease of stripping, conductivity, processability, cleanliness, dispersion, cable life, etc.) with a reference carbon black may be, for example, as described elsewhere herein (e.g., in %).

The carbon particles (e.g., carbon black) described herein may be used, for example, in seals/sealing (e.g., rubber seals/sealing). The carbon particles (e.g., carbon black) may have N2SA from about 2 $m^2/g$, 8 $m^2/g$, 10 $m^2/g$, 13 $m^2/g$, 14 $m^2/g$, 17 $m^2/g$ or 19 $m^2/g$ to about 50 $m^2/g$, and DBP from about 33 ml/100 g or 42 ml/100 g to about 131 ml/100 g. The carbon particles (e.g., carbon black) may have N2SA from about 19 $m^2/g$ to about 50 $m^2/g$, and DBP from about 42 ml/100 g to about 131 ml/100 g. The carbon particles (e.g., carbon black) may have N2SA from about 20 $m^2/g$ to about 40 $m^2/g$ and structure from about 45 ml/100 g to about 95 ml/100 g. The carbon particles (e.g., carbon black) may have N2SA from about 2 $m^2/g$ to about 14 $m^2/g$, and DBP from about 37 ml/100 g to about 49 ml/100 g or from about 33 ml/100 g to about 53 ml/100 g. The carbon particles (e.g., carbon black) may have N2SA from about 29 $m^2/g$, 23 $m^2/g$ or 19 $m^2/g$ to about 8 $m^2/g$, 13 $m^2/g$ or 14 $m^2/g$, and DBP from about 65 ml/100 g, 59 ml/100 g or 55 ml/100 g to about 43 ml/100 g, 47 ml/100 g, 49 ml/100 g or 53 ml/100 g. The carbon particles (e.g., carbon black) may have N2SA from about 23 $m^2/g$ to about 35 $m^2/g$ and DBP from about 59 ml/100 g to about 71 ml/100 g, or N2SA from about 19 $m^2/g$ to about 39 $m^2/g$ and DBP from about 55 ml/100 g to about 75 ml/100 g. The carbon particles (e.g., carbon black) may have N2SA from about 24 $m^2/g$ to about 36 $m^2/g$ and DBP from about 66 ml/100 g to about 78 ml/100 g, or N2SA from about 20 $m^2/g$ to about 40 $m^2/g$ and DBP from about 62 ml/100 g to about 82 ml/100 g. The carbon particles (e.g., carbon black) may have N2SA from about 26 $m^2/g$ to about 38 $m^2/g$ and DBP from about 59 ml/100 g to about 71 ml/100 g, or N2SA from about 22 $m^2/g$ to about 42 $m^2/g$ and DBP from about 55 ml/100 g to about 75 ml/100 g. The carbon particles (e.g., carbon black) may have N2SA from about 24 $m^2/g$ to about 37 $m^2/g$ or from about 22 $m^2/g$ to about 42 $m^2/g$, and DBP from about 42 ml/100 g to about 57 ml/100 g or from about 42 ml/100 g to about 62 ml/100 g. The carbon particles (e.g., carbon black) may have N2SA from about 22 $m^2/g$ to about 34 $m^2/g$ or from about 17 $m^2/g$ to about 37 $m^2/g$, and DBP from about 113 ml/100 g to about 128 ml/100 g or from about 110 ml/100 g to about 130 ml/100 g. The carbon particles (e.g., carbon black) may have N2SA from about 29 $m^2/g$ to about 41 $m^2/g$ and DBP from about 84 ml/100 g to about 96 ml/100 g, or N2SA from about 25 $m^2/g$ to about 45 $m^2/g$ and DBP from about 80 ml/100 g to about 100 ml/100 g. The carbon particles (e.g., carbon black) may have N2SA from about 34 $m^2/g$ to about 46 $m^2/g$ and DBP from about 115 ml/100 g to about 127 ml/100 g, or N2SA from about 30 $m^2/g$ to about 50 $m^2/g$ and DBP from about 111 ml/100 g to about 131 ml/100 g. Such carbon particles may have purities as described elsewhere herein. For example, the carbon particles may have high purity. Performance metric(s) of such carbon particles in seals applications may be, for example, similar or substantially the same as a first reference carbon black, increased, decreased, enhanced or improved compared to a second reference carbon black (e.g., the same or different than the first reference carbon black), or any combination thereof (e.g., a given performance metric may be improved while another performance metric may be substantially the same). For example, a polymer product (e.g., a seal/sealing) comprising carbon particles of the present disclosure with N2SA from about 2 $m^2/g$ to about 50 $m^2/g$ and structure from about 33 ml/100 g to about 131 ml/100 g, or with N2SA from about 20 $m^2/g$ to about 40 $m^2/g$ and structure from about 45 ml/100 g to about 95 ml/100 g, may have (i) enhanced or improved heat aged physical properties, and/or (ii) enhanced or improved dynamic performance as measured by flex cycles and resistance to crack initiation. The comparison of a given performance metric (e.g., heat aged physical properties, dynamic performance as measured by flex cycles and resistance to crack initiation, etc.) with a reference carbon black may be, for example, as described elsewhere herein (e.g., in %).

Carbon particles of the present disclosure may be used, for example, in molding applications/molded products (e.g., molded rubber). The carbon particles (e.g., carbon black) may have N2SA from about 2 $m^2/g$, 8 $m^2/g$, 10 $m^2/g$, 13 $m^2/g$, 14 $m^2/g$, 17 $m^2/g$ or 19 $m^2/g$ to about 50 $m^2/g$, and DBP from about 33 ml/100 g or 42 ml/100 g to about 131 ml/100 g. The carbon particles (e.g., carbon black) may have N2SA from about 19 m²/g to about 50 m²/g, and DBP from about 42 ml/100 g to about 131 ml/100 g. The carbon particles (e.g., carbon black) may have N2SA from about 19 m²/g to about 45 m²/g, and DBP from about 42 ml/100 g to about 100 ml/100 g. The carbon particles (e.g., carbon black) may have N2SA from about 19 m²/g to about 45 m²/g, and DBP from about 55 ml/100 g to about 100 ml/100 g. The carbon particles (e.g., carbon black) may have N2SA from about 22 m²/g to about 45 m²/g, and DBP from about 42 ml/100 g to about 100 ml/100 g. The carbon particles (e.g., carbon black) may have N2SA from about 24 m²/g to about 37 m²/g or from about 22 m²/g to about 42 m²/g, and DBP from about 42 ml/100 g to about 57 ml/100 g or from about 42 ml/100 g to about 62 ml/100 g. The carbon particles (e.g., carbon black) may have N2SA from about 22 m²/g to about 34 m²/g or from about 17 m²/g to about 37 m²/g, and DBP from about 113 ml/100 g to about 128 ml/100 g or from about 110 ml/100 g to about 130 ml/100 g. The carbon particles (e.g., carbon black) may have N2SA from about 29 m²/g to about 41 m²/g and DBP from about 84 ml/100 g to about 96 ml/100 g, or N2SA from about 25 m²/g to about 45 m²/g and DBP from about 80 ml/100 g to about 100 ml/100 g. The carbon particles (e.g., carbon black) may have N2SA from about 2 m²/g to about 14 m²/g, and DBP from about 37 ml/100 g to about 49 ml/100 g or from about 33 ml/100 g to about 53 ml/100 g. The carbon particles (e.g., carbon black) may have N2SA from about 29 m²/g, 23 m²/g or 19 m²/g to about 8 m²/g, 13 m²/g or 14 m²/g, and DBP from about 65 ml/100 g, 59 ml/100 g or 55 ml/100 g to about 43 ml/100 g, 47 ml/100 g, 49 ml/100 g or 53 ml/100 g. The carbon particles (e.g., carbon black) may have N2SA from about 23 m²/g to about 35 m²/g and DBP from about 59 ml/100 g to about 71 ml/100 g, or N2SA from about 19 m²/g to about 39 m²/g and DBP from about 55 ml/100 g to about 75 ml/100 g. The carbon particles (e.g., carbon black) may have N2SA from about 24 m²/g to about 36 m²/g and DBP from about 66 ml/100 g to about 78 ml/100 g, or N2SA from about 20 m²/g to about 40 m²/g and DBP from about 62 ml/100 g to about 82 ml/100 g. The carbon particles (e.g., carbon black) may have N2SA from about 26 m²/g to about 38 m²/g and DBP from about 59 ml/100 g to about 71 ml/100 g, or N2SA from about 22 m²/g to about 42 m²/g and DBP from about 55 ml/100 g to about 75 ml/100 g. The carbon particles (e.g., carbon black) may have N2SA from about 34 m²/g to about 46 m²/g and DBP from about 115 ml/100 g to about 127 ml/100 g, or N2SA from about 30 m²/g to about 50 m²/g and DBP from about 111 ml/100 g to about 131 ml/100 g. Such carbon particles may have, for example, purities and/or sieve residues as described elsewhere herein. For example, the carbon particles may high purity and low sieve residue. Improved mold flow and/or increased mold life may be, for example, due to less abrasive compounds. Longer life in dynamic environments may be, for example, due to lower crack initiation and/or failure. Performance metric(s) of such carbon particles in molding applications may be, for example, similar or substantially the same as a first reference carbon black, increased, decreased, enhanced or improved compared to a second reference carbon black (e.g., the same or different than the first reference carbon black), or any combination thereof (e.g., a given performance metric may be improved while another performance metric may be substantially the same). For example, a polymer product (e.g., a molded product) comprising carbon particles of the present disclosure with N2SA from about 2 m²/g to about 50 m²/g and structure from about 33 ml/100 g to about 131 ml/100 g, or with N2SA from about 22 m²/g to about 45 ml/100 g, or with N2SA from about 22 m²/g to about 45 ml/100 g, and structure from about 42 ml/100 g to about 100 ml/100 g, may have (i) enhanced or improved mold flow, (ii) increased mold life, (iii) less abrasive compounds, (iv) longer life in dynamic environments, (v) lower crack initiation, and/or (vi) lower failure. The comparison of a given performance metric (e.g., mold flow, mold life, life in dynamic environments, crack initiation, failure, etc.) with a reference carbon black may be, for example, as described elsewhere herein (e.g., in %).

Carbon particles of the present disclosure may be used, for example, in rubber applications/rubber products. The carbon particles may have, for example, purities and/or grit levels as described elsewhere herein. For example, the carbon particles may be ultra-clean and low grit. Such properties/characteristics (e.g., lower levels of ash, sulfur, 325 mesh grit sieve residue, etc.) of the carbon particles described herein may advantageously improve/enhance performance metrics (e.g., properties/characteristics) of the rubber applications/rubber products (e.g., as described elsewhere herein, for example, in relation to radiator hose, automotive extrusion, seals/sealing and/or molded products/molding applications). For example, the carbon particles (e.g., carbon black) may have an ash content of less than (e.g., about) 2%, 1.5%, 0.05%, 0.03% or 0.01% (e.g., by weight), a sulfur content of less than about 1.5%, 1%, 0.3%, 0.1%, 0.03% 50 ppm, 10 ppm, 5 ppm or 1 ppm (e.g., by weight), and/or less than about 5 ppm or 1 ppm of 325 mesh grit sieve residue. The carbon particles (e.g., carbon black) may have such properties in combination with, for example, $L_c$ greater than about 3.0 nm or 4 nm, d002 less than about 0.35 nm, DBP absorption that is less than or equal to about 1.3 or 1.1 times greater than the CDBP absorption, a DBP to CDBP ratio of less than or equal to about 95% of a DBP to CDBP ratio of a reference carbon black, less than or equal to about 0.4% oxygen by weight, less than about 0.4% hydrogen by weight, affinity to adsorb water from an 80% relative humidity atmosphere of less than about 0.5 ml or 0.05 ml of water per square meter of surface area of the carbon particle, WSP between about 0 and about 8 mJ/m² (e.g., less than about 5 mJ/m²), total surface acid group content of less than or equal to about 0.5 µmol/m² and/or other properties/characteristics (e.g., nitrogen content) as described elsewhere herein. Purity and low grit levels described herein may aid (e.g., enhance or improve), for example, processing, product life and in extrusions, aesthetics (e.g., better aesthetics). Low sulfur, low ash and/or low grit (e.g., as described in greater detail elsewhere herein) may enhance or improve, for example, processing and/or performance (e.g., low crack initiation). Purity (e.g., high purity as described in greater detail elsewhere herein) may enhance or improve, for example, performance, heat age and/or dynamic performance. Application testing may include, for example, testing the number of physical properties impacted by heat testing.

Control of final quality of carbon particles (e.g., carbon black) may be very dependent on process control and process optimization. In some instances (e.g., in the plasma process), the processes herein may operate at temperatures in certain regions of the reactor that may be in excess of 3,400° C. In some implementations, such as, for example, for carbon black, the temperature and mixing conditions may be configured (e.g., fully optimized and controlled) to make one or more (e.g., all) of the various grades of carbon particles (e.g., carbon black), of which there may be several hundred. Materials of construction, in addition to knowledge of the areas to be cooled, may be enacted with knowledge of all of the other parts to affect efficient heating (e.g., efficient production of a plasma) with maximal energy efficiency, utility of functional parts over maximal lifetime, minimal heat loss, maximal hydrogen recycling, maximal mixing and various combinations of the prior characteristics to affect full overall efficiency of the reactor in total.

For the production of high quality, high surface area carbon particles (e.g., carbon black) with minimal coking, rapid mixing of feedstock with hot gas may be required. High quality carbon particles (e.g., carbon black) may possess, for example, tight distribution(s) of surface area and DBP. For example, the sample may be tuned to have particles with a narrow particle size distribution and/or a narrow distribution of branched primary particles. This may be controlled by the time/temperature profile of the hydrocarbon feedstock during conversion to solid carbon (e.g., solid carbon black). Additionally, the amount of polyaromatic hydrocarbons (PAHs) may be held to a minimal amount (e.g., less than 1% by mass). The amount of grit (or any subset thereof) (e.g., 325 mesh) may be, for example, less than about 500 ppm (parts per million) due to, for example, the rapid mixing and high temperatures of the plasma. The surface chemistry may be compatible with that required for high performance in elastomer composites (e.g., specifically as filler material in tread composites). The systems and methods described herein may meet the power (e.g., sufficient unit power to their basic components), corrosion resistance (e.g., reduced or no decay of these components when exposed to, for example, hydrogen plasma), and continuous operation requirements to produce carbon black.

The systems (e.g., apparatuses) and methods of the present disclosure, and processes implemented with the aid of the systems and methods herein, may allow continuous production of carbon black or carbon-containing compounds. The process may include converting a carbon-containing feedstock. The systems and methods described herein may enable continuous operation and production of high quality carbon particles (e.g., carbon black). In some examples, the systems and methods herein may enable carbon particles (e.g., carbon black) with surface area greater than about 15 square meters per gram ($m^2/g$) or 20 $m^2/g$ carbon black to be manufactured (e.g., on a commercial scale). The carbon particles may be made (e.g., in a one-step process) by adding a hydrocarbon to a heated gas to produce the carbon particles (e.g., carbon nanoparticles, such as, for example, carbon black nanoparticles). The hydrocarbon may be mixed with the hot gas to effect removal of hydrogen from the hydrocarbon. In some examples, the carbon particles (e.g., carbon nanoparticles) may be made by (e.g., in a one-step process comprising) adding the hydrocarbon to the heated gas to produce carbon particles (e.g., carbon nanoparticles) that have one or more properties as described in greater detail elsewhere herein (e.g., that are, for example, less than 1 micron volume equivalent sphere diameter and have an $L_c$ greater than 3.0 nm).

The process may include heating a thermal transfer gas (e.g., a plasma gas) with electrical energy (e.g., from a DC or AC source). The thermal transfer gas may be heated by an electric arc. The thermal transfer gas may be heated by Joule heating (e.g., resistive heating, induction heating, or a combination thereof). The thermal transfer gas may be heated by Joule heating and by an electric arc (e.g., downstream of the Joule heating). The thermal transfer gas may be pre-heated prior to the heating (e.g., pre-heated by heat exchange). See, for example, commonly assigned, co-pending Int. Pat. Publication No. WO 2017/034980 ("HIGH TEMPERATURE HEAT INTEGRATION METHOD OF MAKING CARBON BLACK"), which is entirely incorporated herein by reference. The hydrocarbon feedstock may be pre-heated (e.g., from a temperature of about 25° C.) to a temperature from about 100° C. to about 800° C. before coming into contact with the thermal transfer gas (e.g., pre-heated by heat exchange, by Joule heating, or a combination thereof). The process may further include mixing injected feedstock with the heated thermal transfer gas (e.g., plasma gas) to achieve suitable reaction conditions. The reaction zone may not immediately come into contact with any contact surfaces. One or more additional material streams may be provided to the process (e.g., provided to a reactor through injection with or into the thermal transfer gas upstream of the reaction zone, injection with or into the feedstock steam, injection into a mixture of the thermal transfer gas and the feedstock, such as, for example, injection into the reaction zone, injection upstream, in the same plane or downstream of, or adjacent to, feedstock injection, etc.). The one or more additional material streams may comprise one or more suitable compounds (e.g., in a vaporized state; in a molten state; dissolved in water, an organic solvent (e.g., liquid feedstock, ethylene glycol, diethylene glycol, propylene glycol, diethyl ether or other similar ethers, or other suitable organic solvents) or a mixture thereof; etc.). For example, structure (e.g., DBP) may be at least in part controlled with the aid of a suitable ionic compound, such as, for example, an alkali metal salt (e.g., acetate, adipate, ascorbate, benzoate, bicarbonate, carbonate, citrate, dehydroacetate, erythorbate, ethyl para-hydroxybenzoate, formate, fumarate, gluconate, hydrogen acetate, hydroxide, lactate, malate, methyl para-hydroxybenzoate, orthophenyl phenol, propionate, propyl para-hydroxybenzoate, sorbate, succinate or tartrate salts of sodium, potassium, rubidium or caesium). Such compound(s) may be added at a suitable level with respect to (or in relation to) the feedstock and/or thermal transfer gas (e.g., the compound(s) may be added at a ratio or concentration between about 0 ppm and 2 ppm, 0 ppm and 5 ppm, 0 ppm and 10 ppm, 0 ppm and 20 ppm, 0 ppm and 50 ppm, 0 ppm and 100 ppm, 0 ppm and 200 ppm, 0 ppm and 500 ppm, 0 ppm and 1000 ppm, 0 ppm and 2000 ppm, 0 ppm and 5000 ppm, 0 ppm and 1%, 5 ppm and 50 ppm, 10 ppm and 100 ppm, 20 ppm and 100 ppm, 100 ppm and 200 ppm, 100 ppm and 500 ppm, 200 ppm and 500 ppm, 10 ppm and 2000 ppm, 100 ppm and 5000 ppm, 1000 and 2000 ppm, 2000 ppm and 5000 ppm, 2000 ppm and 1%, or 5000 ppm and 1% (e.g., of the cation) on a molar or mass basis with respect to, for example, the feedstock flow rate and/or the thermal gas flow rate, or with respect to the amount of carbon added with the feedstock). The products of reaction may be cooled, and the carbon particles (e.g., carbon black) or carbon-containing compounds may be separated from the other reaction products. The as-produced hydrogen may be recycled back into the reactor. See, for example, Int. Pat. Pub. No. WO 2017/034980 ("HIGH TEMPERATURE HEAT INTEGRATION METHOD OF MAKING CARBON BLACK"), which is entirely incorporated herein by reference.

The thermal transfer gas may in some instances be heated in an oxygen-free environment. The carbon particles may in some instances be produced (e.g., manufactured) in an oxygen-free atmosphere. An oxygen-free atmosphere may comprise, for example, less than about 5% oxygen by volume, less than about 3% oxygen (e.g., by volume), or less than about 1% oxygen (e.g., by volume). The carbon particles (e.g., carbon black) of the present disclosure may in some instances be manufactured (e.g., on a commercial scale) via a substantially oxygen-free process. A substantially oxygen-free process may comprise, for example, less than about 5% oxygen (by volume), or less than about 3% oxygen (e.g., by volume).

The thermal transfer gas may comprise at least about 60% hydrogen up to about 100% hydrogen (by volume) and may further comprise up to about 30% nitrogen, up to about 30% CO, up to about 30% $CH_4$, up to about 10% HCN, up to about 30% $C_2H_2$, and up to about 30% Ar. For example, the thermal transfer gas may be greater than about 60% hydrogen. Additionally, the thermal transfer gas may also comprise polycyclic aromatic hydrocarbons such as anthracene, naphthalene, coronene, pyrene, chrysene, fluorene, and the like. In addition, the thermal transfer gas may have benzene and toluene or similar monoaromatic hydrocarbon components present. For example, the thermal transfer gas may comprise greater than or equal to about 90% hydrogen, and about 0.2% nitrogen, about 1.0% CO, about 1.1% $CH_4$, about 0.1% HCN and about 0.1% $C_2H_2$. The thermal transfer gas may comprise greater than or equal to about 80% hydrogen and the remainder may comprise some mixture of the aforementioned gases, polycyclic aromatic hydrocarbons, monoaromatic hydrocarbons and other components. Thermal transfer gas such as oxygen, nitrogen, argon, helium, air, hydrogen, carbon monoxide, hydrocarbon (e.g., methane, ethane, unsaturated) etc. (used alone or in mixtures of two or more) may be used. The thermal transfer gas may comprise greater than or equal to about 50% hydrogen by volume. The thermal transfer gas may comprise, for example, oxygen, nitrogen, argon, helium, air, hydrogen, hydrocarbon (e.g. methane, ethane) etc. (used alone or in mixtures of two or more). The thermal transfer gas may comprise greater than about 70% $H_2$ by volume and may include at least one or more of the gases HCN, $CH_4$, $C_2H_4$, $C_2H_2$, CO, benzene or polyaromatic hydrocarbon (e.g., naphthalene and/or anthracene) at a level of at least about 1 ppm. The polyaromatic hydrocarbon may comprise, for example, naphthalene, anthracene and/or their derivatives. The polyaromatic hydrocarbon may comprise, for example, methyl naphthalene and/or methyl anthracene. The thermal transfer gas may comprise a given thermal transfer gas (e.g., among the aforementioned thermal transfer gases) at a concentration (e.g., in a mixture of thermal transfer gases) greater than or equal to about 1 ppm, 5 ppm, 10 ppm, 25 ppm, 50 ppm, 0.01%, 0.05%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.5%, 3%, 3.5%, 4%, 4.5%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 55%, 60%, 65%, 70%, 75%, 80%, 85%, 90%, 95% or 99% by weight, volume or mole. Alternatively, or in addition, the thermal transfer gas may comprise the given thermal transfer gas at a concentration (e.g., in a mixture of thermal transfer gases) less than or equal to about 100% 99%, 95%, 90%, 85%, 80%, 75%, 70%, 65%, 60%, 55%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4.5%, 4%, 3.5%, 3%, 2.5%, 2%, 1.9%, 1.8%, 1.7%, 1.6%, 1.5%, 1.4%, 1.3%, 1.2%, 1.1%, 1%, 0.9%, 0.8%, 0.7%, 0.6%, 0.5%, 0.4%, 0.3%, 0.2%, 0.1%, 0.05%, 0.01%, 50 ppm, 25 ppm, 10 ppm, 5 ppm or 1 ppm by weight, volume or mole. The thermal transfer gas may comprise additional thermal transfer gases (e.g., in a mixture of thermal transfer gases) at similar or different concentrations. Such additional thermal transfer gases may be selected, for example, among the aforementioned thermal transfer gases not selected as the given thermal transfer gas. The given thermal transfer gas may itself comprise a mixture. The thermal transfer gas may have at least a subset of such compositions before, during and/or after heating.

The hydrocarbon feedstock may include any chemical with formula $C_nH_x$ or $C_nH_xO_y$, where n is an integer; x is between (i) 1 and 2n+2 or (ii) less than 1 for fuels such as coal, coal tar, pyrolysis fuel oils, and the like; and y is between 0 and n. The hydrocarbon feedstock may include, for example, simple hydrocarbons (e.g., methane, ethane, propane, butane, etc.), aromatic feedstocks (e.g., benzene, toluene, xylene, methyl naphthalene, pyrolysis fuel oil, coal tar, coal, heavy oil, oil, bio-oil, bio-diesel, other biologically derived hydrocarbons, and the like), unsaturated hydrocarbons (e.g., ethylene, acetylene, butadiene, styrene, and the like), oxygenated hydrocarbons (e.g., ethanol, methanol, propanol, phenol, ketones, ethers, esters, and the like), or any combination thereof. These examples are provided as non-limiting examples of acceptable hydrocarbon feedstocks which may further be combined and/or mixed with other components for manufacture. A hydrocarbon feedstock may refer to a feedstock in which the majority of the feedstock (e.g., more than about 50% by weight) is hydrocarbon in nature. The reactive hydrocarbon feedstock may comprise at least about 70% by weight methane, ethane, propane or mixtures thereof. The hydrocarbon feedstock may comprise or be natural gas. The hydrocarbon may comprise or be methane, ethane, propane or mixtures thereof. The hydrocarbon may comprise methane, ethane, propane, butane, acetylene, ethylene, carbon black oil, coal tar, crude coal tar, diesel oil, benzene and/or methyl naphthalene. The hydrocarbon may comprise (e.g., additional) polycyclic aromatic hydrocarbons. The hydrocarbon feedstock may comprise one or more simple hydrocarbons, one or more aromatic feedstocks, one or more unsaturated hydrocarbons, one or more oxygenated hydrocarbons, or any combination thereof. The hydrocarbon feedstock may comprise, for example, methane, ethane, propane, butane, pentane, natural gas, benzene, toluene, xylene, ethylbenzene, naphthalene, methyl naphthalene, dimethyl naphthalene, anthracene, methyl anthracene, other monocyclic or polycyclic aromatic hydrocarbons, carbon black oil, diesel oil, pyrolysis fuel oil, coal tar, crude coal tar, coal, heavy oil, oil, bio-oil, bio-diesel, other biologically derived hydrocarbons, ethylene, acetylene, propylene, butadiene, styrene, ethanol, methanol, propanol, phenol, one or more ketones, one or more ethers, one or more esters, one or more aldehydes, or any combination thereof. The feedstock may comprise one or more derivatives of feedstock compounds described herein, such as, for example, benzene and/or its derivative(s), naphthalene and/or its derivative(s), anthracene and/or its derivative(s), etc. The hydrocarbon feedstock (also "feedstock" herein) may comprise a given feedstock (e.g., among the aforementioned feedstocks) at a concentration (e.g., in a mixture of feedstocks) greater than or equal to about 1 ppm, 5 ppm, 10 ppm, 25 ppm, 50 ppm, 0.01%, 0.05%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.5%, 3%, 3.5%, 4%, 4.5%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 55%, 60%, 65%, 70%, 75%, 80%, 85%, 90%, 95% or 99% by weight, volume or mole. Alternatively, or in addition, the feedstock may comprise the given feedstock at a concentration (e.g., in a mixture of feedstocks) less than or equal to about 100% 99%, 95%, 90%, 85%, 80%, 75%, 70%, 65%, 60%, 55%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4.5%, 4%, 3.5%, 3%, 2.5%, 2%, 1.9%, 1.8%, 1.7%, 1.6%, 1.5%, 1.4%, 1.3%, 1.2%, 1.1%, 1%, 0.9%, 0.8%, 0.7%, 0.6%, 0.5%, 0.4%, 0.3%, 0.2%, 0.1%, 0.05%, 0.01%, 50 ppm, 25 ppm, 10 ppm, 5 ppm or 1 ppm by weight, volume or mole. The feedstock may comprise additional feedstocks (e.g., in a mixture of feedstocks) at similar or different concentrations. Such additional feedstocks may be selected, for example, among the aforementioned feedstocks not selected as the given feedstock. The given feedstock may itself comprise a mixture (e.g., such as natural gas).

The injected hydrocarbon may be cracked such that at least about 80% by moles of the hydrogen originally chemically attached through covalent bonds to the hydrocarbon may be homoatomically bonded as diatomic hydrogen. Homoatomically bonded may refer to the bond being between two atoms that are the same (e.g., as in diatomic hydrogen or $H_2$). C—H may be a heteroatomic bond. A hydrocarbon may go from heteroatomically bonded C—H to homoatomically bonded H—H and C—C. While the $H_2$ from the plasma may still be present, this may just refer to the $H_2$ from the $CH_4$ or other hydrocarbon feedstock.

A system (e.g., an enclosed particle generating system) may comprise a thermal generation section. In some implementations, the thermal generation section may be a plasma generating section containing one or more sets of plasma generating electrodes. The thermal generation section (e.g., plasma generating section) may be connected to a reactor section containing hydrocarbon injectors. In some implementations, the hydrocarbon injectors may be, for example, either at the point of maximum reactor size reduction or further downstream from the plasma generating electrodes. The term reactor, as used herein, may refer to an apparatus (e.g., a larger apparatus comprising a reactor section), or to the reactor section only. The reactor may be configured (e.g., as described elsewhere herein, such as, for example, in relation to FIG. 6) to allow the flow (e.g., at least a portion of the flow or the total flow before, during and/or after injection; at least a portion of or all of the flow during thermal generation, injection and/or reaction; at least a portion or all of the flow of the thermal transfer gas; etc.) in at least a portion of the reactor (e.g., in one or more portions described in relation to FIGS. 2, 3, 4 and 6, such as, for example, in one or more portions configured to implement thermal generation, injection and/or reaction, such as, for example, in a constant diameter region/section, converging region/section, diverging region/section, insert or other additional component, throat, narrowing, or any combination thereof) to be axial (e.g., substantially axial), radial (e.g., substantially radial), or a combination thereof. As described in greater detail elsewhere herein (e.g., in relation to FIGS. 1 and 5), the system may (e.g., additionally) contain, for example, one or more of a heat exchanger connected to the reactor, a filter connected to the heat exchanger, a degas apparatus connected to the filter, a pelletizer connected to the degas apparatus, a binder mixing tank connected to the pelletizer, and a dryer connected to the pelletizer. For example, one or more heat exchangers, filters, degas chambers and/or back end equipment (e.g., one or more of a pelletizer, a binder mixing tank connected to the pelletizer, and/or a dryer connected to the pelletizer) may be used. As described elsewhere herein, a "reactor" may refer to an apparatus (e.g., a larger apparatus comprising a reactor section), or to the reactor section only.

The systems described herein may comprise plasma generators. The plasma generators may utilize a gas or gaseous mixture (e.g., at least 50% by volume gaseous). The plasma generators may utilize a gas or gaseous mixture (e.g., at least 50% by volume gaseous) where the gas is reactive and corrosive in the plasma state. The plasma gas may be, for example, at least 50% by volume hydrogen. The systems described herein may comprise plasma generators energized by a DC or AC source. The hydrogen gas mixture may be supplied directly into a zone in which an electric discharge produced by a DC or AC source is sustained. The plasma may have a composition as described elsewhere herein (e.g., in relation to composition of the thermal transfer gas). The plasma may be generated using arc heating. The plasma may be generated using inductive heating.

The system (e.g., the enclosed particle generating system) may be configured to implement a method of making carbon particles (e.g., carbon black). The method may comprise thermal generation and injection of hydrocarbon. The method may comprise, for example, generating a plasma (e.g., comprising at least about 60% by volume hydrogen) with plasma generating electrodes (e.g., in the reactor), and injecting hydrocarbon (e.g., as described elsewhere herein) to form the carbon particles. In some implementations, the method may comprise generating a plasma (e.g., comprising at least about 60% by volume hydrogen) with plasma generating electrodes (e.g., in the reactor), reducing the interior dimension of the reactor (e.g., as described elsewhere herein), and injecting hydrocarbon (e.g., as described elsewhere herein) to form the carbon particles. The hydrocarbon may be subjected to at least about 1,000° C. but no more than about 3,500° C. in the reactor (e.g., by the heat generated from the plasma). The plasma temperature may be adjusted to tailor the size of primary particles.

The electrodes (e.g., their surfaces exposed to the electric arc (also "arc-spots" herein)) may be in the most intense heating environment. Destruction of the electrodes at their surface may lead to erosion which may reduce the service life of the electrodes. The electrode erosion may be heaviest in plasma generators operating in the presence of chemically active elements such as hydrogen or oxygen. The life of the electrodes may be elongated by, for example, minimizing the thermal effect of the electric arc on the electrodes and/or through adequate protection of the electrode surface against the erosive medium. An electromagnetic field may be applied to reduce the effects of the arc spots by moving the arc spots rapidly over the electrode surface, whereby the mean thermal flux may be reduced in density to the areas of contact between the electrodes and electric arc. The magnetic field may push the plasma outside of the confines of the immediate space between the two electrodes. This means that the erosive medium (e.g., superheated $H_2$ and hydrogen radicals) may be largely separated from the electrode itself. A rotating arc discharge created through the application of a magnetic field to the electrodes may be used (e.g., additionally). The magnetic field may be, for example, from about 20 millitesla (mT) to about 100 mT (e.g., measured at the tip of the torch, radially (around the circumference of the torch) and/or axially (along the axis of the electrodes) at the annulus of the electrodes). The electrode erosion may be controlled through distribution of the current of the main arc discharge among several discharges, whereby the thermal effect on each one of the parallel-connected electrodes of the electrode assembly, for example the anode, may be mitigated. See, for example, U.S. Pat. No. 2,951,143 ("ARC TORCH") and U.S. Pat. No. 3,344,051 ("METHOD FOR THE PRODUCTION OF CARBON BLACK IN A HIGH INTENSITY ARC"), each of which is entirely incorporated herein by reference. The plasma may be generated using AC electrodes. A plurality (e.g., 3 or more) of AC electrodes may be used (e.g., with the advantage of more efficient energy consumption as well as reduced heat load at the electrode surface).

The electrodes may be consumed at a given rate. For example, more than about 70 tons of carbon particles (e.g., carbon black) may be produced per cubic meter of electrode consumed. A ratio of the surface areas of inner and outer electrode may stay constant during plasma generation (e.g., during degradation). In some implementations, the electrodes may be concentrically arranged. The electrodes used to generate the plasma may in some cases become part of the product nanoparticle (e.g., graphite electrodes may become fullerene nanoparticles in the process). The decomposition of the electrodes may be limited as described in greater detail elsewhere herein.

Downstream of the thermal generation (e.g., plasma generation), the thermal activation chamber (e.g., plasma chamber) may in some cases narrow or converge to a conical or square/slot edge and then may optionally straighten before diverging into the reactor. A throat may separate the thermal activation section (e.g., thermal activation chamber) and the reactor section, and/or accelerate the thermal transfer gas so that more intense mixing can take place in a smaller region. The throat may be defined as the narrowest section between the thermal activation section and the reactor section. The length of the throat may be several meters or as small as about 0.5 to about 2 millimeters. The narrowest point of the throat may be defined as the narrowest diameter of the throat. Any cross-section that is within about 10% of the narrowest cross-section may be deemed to be within the scope of the throat. One diameter may be defined as the diameter of the throat at the narrowest point of the throat. Hydrocarbon injection points into the reactor may be positioned, for example, from about 5 diameters upstream of the throat to about 5 diameters downstream of the throat. In some examples, the injection may occur within about +/−2 diameters or about +/−1 diameter of the throat. An injection point of hydrocarbon feedstock may be, for example, downstream of the narrowest point of the throat and toward the onset of the divergence into the reactor. The throat may be a nozzle. The thermal transfer gas (e.g., plasma gas) may be accelerated through the nozzle. A diameter of the nozzle may narrow in the direction (of flow) of the thermal transfer gas (e.g., plasma gas). The desired amount of narrowing (e.g., the diameter of the throat) may be determined based on, for example, recirculation of hydrocarbons and solid carbon particles back into the plasma chamber, optimal mixing, view factor, or any combination thereof. The reduction may be determined based on a balance between minimal recirculation, maximal mixing and increased view factor. The interior dimension of the reactor section may be reduced (e.g., the diameter of the process may be reduced at the throat) by, for example, greater than or equal to about (e.g., at least about) 10%, 20%, 30% or 40% downstream from the thermal generator (e.g., from the plasma generating electrodes). Different carbon particles (e.g., different grades of carbon particles (e.g., carbon black)) may require a fine tuning of this parameter in order to target surface area, structure and/or surface chemistry properties, while at the same time minimizing unreacted polycyclic aromatic hydrocarbons (PAHs) and minimizing large particle contamination (e.g., grit) in the product.

The thermal transfer gas (e.g., plasma gas) may be guided into the reactor area. Feedstock may be injected in the reactor area such that under the prevailing conditions generated by aerodynamic and electromagnetic forces, intense rapid mixing between the plasma gas and feedstock may occur and/or such that limited or substantially no recirculation (e.g., no significant recirculation) of feedstock into the thermal activation chamber (e.g., plasma chamber) may take place. The injection of the hydrocarbon may be controlled such that the area in space where reaction occurs does not come into contact with any surfaces.

The systems and methods described herein may include heating hydrocarbons rapidly to form carbon particles (e.g., carbon nanoparticles). For example, the hydrocarbons may be heated rapidly to form carbon particles (e.g., carbon nanoparticles) and hydrogen. Hydrogen may in some cases refer to majority hydrogen. For example, some portion of this hydrogen may also contain methane (e.g., unspent methane) and/or various other hydrocarbons (e.g., ethane, propane, ethylene, acetylene, benzene, toluene, polycyclic aromatic hydrocarbons (PAH) such as naphthalene, etc.).

Once the feedstock has been injected, at least some of the heat transfer to bring the two gases to an equilibrium (e.g., thermal equilibrium) may occur within less than or equal to about 2 seconds. Sufficient heat may be transferred to the feedstock to form high quality carbon particles (e.g., carbon black). In an example, from about 30% to about 80%, or from about 40% to about 70% of the heat contained in the heated thermal transfer gas may be transferred to the hydrocarbon feedstock within about 2 seconds of initial exposure to the thermal transfer gas. In another example, more than about 60% of the heat contained in the heated thermal transfer gas may be transferred to the hydrocarbon feedstock within about 2 seconds of initial exposure to the thermal transfer gas. In another example, more than about 50% of the contained energy within the thermal transfer gas (e.g., hydrogen) may be transferred to the hydrocarbon effluent stream within the first 500 milliseconds (starting at the point at which the hydrocarbon is injected). For example, at least about 50% of the heat generated by the plasma as measured in Joules may be transferred to the hydrocarbon in about 500 milliseconds or less. The heat may be transferred via radiative, conductive, thermal gas transfer or any other mechanism. In yet another example, the entire reaction to form carbon particles (e.g., fine particle carbon black) may be finished within several milliseconds after injection of hydrocarbon feedstock material.

Intermediate products of carbon particle (e.g., carbon black) reactions may have a tendency to stick to any surface they come into contact with. The intermediate product before carbon particle (e.g., carbon black) formation may be prevented from coming into contact with any surface while maintaining the survival of interior components (e.g., the thermal activation chamber liner, the throat material, the injector materials as well as the reactor itself). The mixing may be controlled in a way that maintains the integrity of the reactor while also attaining the rapid mixing. For example, the mixing may be controlled in a way that improves (e.g., maximizes) the survivability of components, improves (e.g., maximizes) mixing, and/or decreases (e.g., minimizes) coking. In some implementations, the mixing may include mixing of relatively cold hydrocarbon of significant density with exceedingly hot hydrogen with very low density. The two effluent streams may in some instances have different densities, temperatures, velocities, as well as viscosities. Rapid mixing of these effluent streams may achieve a sufficient amount of cracked hydrocarbon.

Feedstock injection may occur in a suitable region as described in greater detail elsewhere herein. For example, the feedstock may be injected (e.g., in a plane) at a location away from the wall of the reactor vessel (e.g., centrally), from the wall of the reactor vessel, through the electrodes, or any combination thereof. Hydrocarbon injection may include one or more injectors (e.g., 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100 or more injectors). Injectors may comprise tips, slots, nozzles with a variety of shapes including, for example, circular or slit shapes. In some implementations, the injector openings may be configured/utilized such that the majority of the hydrogen is trapped within a curtain of hydrocarbon feedstock. The total diameter (e.g., sum of diameters) of such injector openings may be, for example, as described elsewhere herein (e.g., in relation to nozzles). A plurality of injector openings may be located in the same axial plane. The flow of thermal transfer gas may be axial (e.g., substantially axial), radial (e.g., substantially radial), or a combination thereof. The feedstock may be injected (e.g., through one or more openings) into the aforementioned flow of the thermal transfer gas in the same flow direction as the thermal transfer gas, in a flow direction perpendicular to the thermal transfer gas, or a combination thereof (e.g., the feedstock may be injected in an axial (e.g., substantially axial) direction, a radial (e.g., substantially radial) direction, or a combination thereof). The injectors may be oriented with respect to the thermal gas flow tangentially/axially, radially, or a combination thereof. As described in greater detail elsewhere herein, off-axis injection may be used. The off-axis injection may be at an off-axis angle of greater than or equal to about 0.1, 0.5, 1, 2, 5, 10, 15, 20, 25, 30, 35, 40, 45, 50, 55, 60, 65, 70, 75, 80, 85, 89 or 89.5 degrees. Alternatively, or in addition, the off-axis angle may be less than or equal to about 89.9, 89.5, 89, 85, 80, 75, 70, 65, 60, 55, 50, 45, 40, 35, 30, 25, 20, 15, 10, 5, 2, 1 or 0.5 degrees. The off-axis angle may be, for example, from about 5 degrees to about 85 degrees. Tangential flow may be introduced (e.g., additionally) to further intensify mixing between the two effluent streams.

Figure 2:
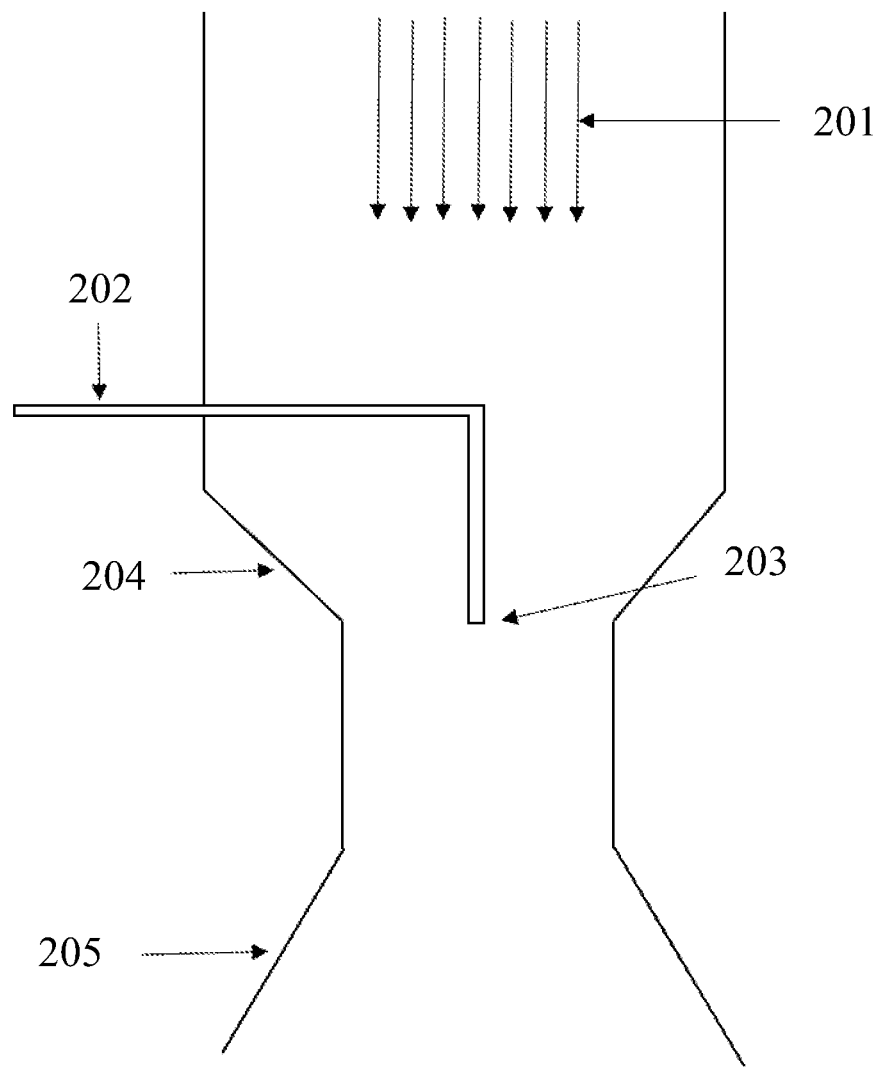
FIG. 2 shows a schematic representation of an example of a reactor/apparatus.

Mixing of hydrocarbon feedstock (e.g., at the throat or just downstream of the throat) may be achieved through the use of multiple injectors that are tangentially oriented to the thermal gas (e.g., plasma) flow. In some implementations, four circular nozzles of a suitable diameter (e.g., with a total diameter of the nozzles of less than about 5% of the circumference of the cross-sectional plane where the injectors are co-located) may be used. In some implementations, greater than or equal to 6 nozzles, or alternatively shaped nozzles (e.g. slit-shaped), of a suitable diameter (e.g., with a sum of the diameters of the nozzles of more than about 5% of the circumference of the cross-sectional plane where the injectors are co-located) may be used. The nozzles (e.g., in the increased nozzle count/adjusted nozzle shape configuration) may be utilized such that the majority of the hydrogen is trapped within a curtain of hydrocarbon feedstock. The hydrocarbon may be injected axially with the thermal gas (e.g., plasma) flow (also "axial hydrocarbon injection" herein). The hydrocarbon may be injected radially. The flow may comprise both axial and radial components ("off-axis" flow). Off-axis injection may be at an off-axis angle of, for example, from about 5 degrees to about 85 degrees. Additionally, tangential flow may be introduced to further intensify mixing between the two effluent streams. In this context, diameter may refer to the largest dimension of an irregular or regular shaped nozzle (e.g., if the shape is a star, the diameter is measured between the two tips of the star that give the largest internal dimension). The feedstock may be injected axially at a substantially central location in the reactor using, for example, an injector that may enter from the side of the reactor (e.g., upstream (before), in (e.g., in the middle of) or downstream (after) a narrowing; anywhere on a plane at or near a throat (e.g., below a converging region) or further downstream of the throat (e.g., in a diverging region of the reactor); etc.), with or without an axial turn as shown in FIG. 2, and may inject hydrocarbons axially downstream from a central injector tip comprising one opening or a plurality of openings (e.g., through one opening or a plurality of openings in the injection plane). Injection of hydrocarbon feedstock may occur radially outwards from a centrally located injector or radially inwards from the wall of the reactor vessel.

The injector(s) may be cooled via a cooling liquid (e.g., water). The injector(s) may be cooled by, for example, water or a non-oxidizing liquid (e.g., mineral oil, ethylene glycol, propylene glycol, synthetic organic fluids such as, for example, DOWTHERM™ materials, etc.). See, for example, commonly assigned, co-pending Int. Pat. Pub. No. WO 2015/116800 ("PLASMA GAS THROAT ASSEMBLY AND METHOD"), which is entirely incorporated herein by reference. The injector(s) may be fabricated from suitable materials such as, for example, copper, stainless steel, graphite and/or other similar materials (e.g., alloys) with high melting points and good corrosion resistance (e.g., to hydrogen free radical environment).

Figure 6:
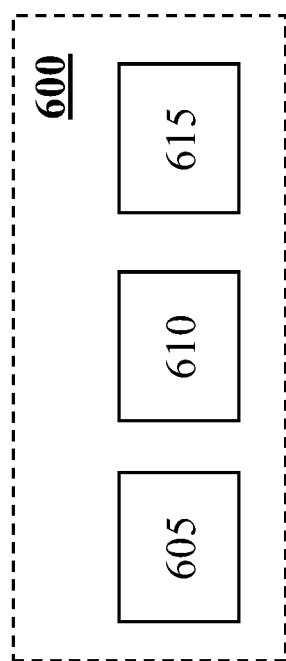
FIG. 6 shows a schematic representation of an example of a reactor/apparatus.

FIG. 6 shows a reactor apparatus (also "apparatus" herein) 600 in accordance with the present disclosure. The apparatus may be configured to enable, for example, thermal generation (e.g., heating) 605, injection 610 and reaction 615. For example, the apparatus may comprise one or more constant diameter regions/sections, one or more converging regions/sections, one or more diverging regions/sections, one or more inserts or other additional components, or any combination thereof. Such regions/sections, and/or inserts or other additional components, may be combined in various ways to implement the thermal generation (e.g., heating) 605, injection 610 and reaction 615. Such implementations may include, but are not limited to, configurations as described in relation to the schematic representations in FIGS. 2, 3 and 4. For example, a region/section where thermal generation 605 is implemented may or may not be separated by a throat from a reaction region/section where reaction 615 is implemented, injection 610 may or may not be downstream from the thermal generation 605, etc.

The thermal transfer gas may be provided to the system (e.g., to a reactor apparatus) at a rate of, for example, greater than or equal to about 1 normal cubic meter/hour ($Nm^3/hr$), 2 $Nm^3/hr$, 5 $Nm^3/hr$, 10 $Nm^3/hr$, 25 $Nm^3/hr$, 50 $Nm^3/hr$, 75 $Nm^3/hr$, 100 $Nm^3/hr$, 150 $Nm^3/hr$, 200 $Nm^3/hr$, 250 $Nm^3/hr$, 300 $Nm^3/hr$, 350 $Nm^3/hr$, 400 $Nm^3/hr$, 450 $Nm^3/hr$, 500 $Nm^3/hr$, 550 $Nm^3/hr$, 600 $Nm^3/hr$, 650 $Nm^3/hr$, 700 $Nm^3/hr$, 750 $Nm^3/hr$, 800 $Nm^3/hr$, 850 $Nm^3/hr$, 900 $Nm^3/hr$, 950 $Nm^3/hr$, 1,000 $Nm^3/hr$, 2,000 $Nm^3/hr$, 3,000 $Nm^3/hr$, 4,000 $Nm^3/hr$, 5,000 $Nm^3/hr$, 6,000 $Nm^3/hr$, 7,000 $Nm^3/hr$, 8,000 $Nm^3/hr$, 9,000 $Nm^3/hr$, 10,000 $Nm^3/hr$, 12,000 $Nm^3/hr$, 14,000 $Nm^3/hr$, 16,000 $Nm^3/hr$, 18,000 $Nm^3/hr$, 20,000 $Nm^3/hr$, 30,000 $Nm^3/hr$, 40,000 $Nm^3/hr$, 50,000 $Nm^3/hr$, 60,000 $Nm^3/hr$, 70,000 $Nm^3/hr$, 80,000 $Nm^3/hr$, 90,000 $Nm^3/hr$ or 100,000 $Nm^3/hr$. Alternatively, or in addition, the thermal transfer gas may be provided to the system (e.g., to the reactor apparatus) at a rate of, for example, less than or equal to about 100,000 Nm³/hr, 90,000 Nm³/hr, 80,000 Nm³/hr, 70,000 Nm³/hr, 60,000 Nm³/hr, 50,000 Nm³/hr, 40,000 Nm³/hr, 30,000 Nm³/hr, 20,000 Nm³/hr, 18,000 Nm³/hr, 16,000 Nm³/hr, 14,000 Nm³/hr, 12,000 Nm³/hr, 10,000 Nm³/hr, 9,000 Nm³/hr, 8,000 Nm³/hr, 7,000 Nm³/hr, 6,000 Nm³/hr, 5,000 Nm³/hr, 4,000 Nm³/hr, 3,000 Nm³/hr, 2,000 Nm³/hr, 1,000 Nm³/hr, 950 Nm³/hr, 900 Nm³/hr, 850 Nm³/hr, 800 Nm³/hr, 750 Nm³/hr, 700 Nm³/hr, 650 Nm³/hr, 600 Nm³/hr, 550 Nm³/hr, 500 Nm³/hr, 450 Nm³/hr, 400 Nm³/hr, 350 Nm³/hr, 300 Nm³/hr, 250 Nm³/hr, 200 Nm³/hr, 150 Nm³/hr, 100 Nm³/hr, 75 Nm³/hr, 50 Nm³/hr, 25 Nm³/hr, 10 Nm³/hr, 5 Nm³/hr or 2 Nm³/hr. The thermal transfer gas may be split into one or more flow paths (e.g., as described, for example, in relation to Examples 1 and 2). The thermal transfer gas may be provided to the system (e.g., to the reactor apparatus) at such rates in combination with one or more feedstock flow rates described herein. The thermal transfer gas may be heated at such flow rates to one or more temperatures described herein.

The feedstock (e.g., hydrocarbon) may be provided to the system (e.g., to a reactor apparatus) at a rate of, for example, greater than or equal to about 50 grams per hour (g/hr), 100 g/hr, 250 g/hr, 500 g/hr, 750 g/hr, 1 kilogram per hour (kg/hr), 2 kg/hr, 5 kg/hr, 10 kg/hr, 15 kg/hr, 20 kg/hr, 25 kg/hr, 30 kg/hr, 35 kg/hr, 40 kg/hr, 45 kg/hr, 50 kg/hr, 55 kg/hr, 60 kg/hr, 65 kg/hr, 70 kg/hr, 75 kg/hr, 80 kg/hr, 85 kg/hr, 90 kg/hr, 95 kg/hr, 100 kg/hr, 150 kg/hr, 200 kg/hr, 250 kg/hr, 300 kg/hr, 350 kg/hr, 400 kg/hr, 450 kg/hr, 500 kg/hr, 600 kg/hr, 700 kg/hr, 800 kg/hr, 900 kg/hr, 1,000 kg/hr, 1,100 kg/hr, 1,200 kg/hr, 1,300 kg/hr, 1,400 kg/hr, 1,500 kg/hr, 1,600 kg/hr, 1,700 kg/hr, 1,800 kg/hr, 1,900 kg/hr, 2,000 kg/hr, 2,100 kg/hr, 2,200 kg/hr, 2,300 kg/hr, 2,400 kg/hr, 2,500 kg/hr, 3,000 kg/hr, 3,500 kg/hr, 4,000 kg/hr, 4,500 kg/hr, 5,000 kg/hr, 6,000 kg/hr, 7,000 kg/hr, 8,000 kg/hr, 9,000 kg/hr or 10,000 kg/hr. Alternatively, or in addition, the feedstock (e.g., hydrocarbon) may be provided to the system (e.g., to the reactor apparatus) at a rate of, for example, less than or equal to about 10,000 kg/hr, 9,000 kg/hr, 8,000 kg/hr, 7,000 kg/hr, 6,000 kg/hr, 5,000 kg/hr, 4,500 kg/hr, 4,000 kg/hr, 3,500 kg/hr, 3,000 kg/hr, 2,500 kg/hr, 2,400 kg/hr, 2,300 kg/hr, 2,200 kg/hr, 2,100 kg/hr, 2,000 kg/hr, 1,900 kg/hr, 1,800 kg/hr, 1,700 kg/hr, 1,600 kg/hr, 1,500 kg/hr, 1,400 kg/hr, 1,300 kg/hr, 1,200 kg/hr, 1,100 kg/hr, 1,000 kg/hr, 900 kg/hr, 800 kg/hr, 700 kg/hr, 600 kg/hr, 500 kg/hr, 450 kg/hr, 400 kg/hr, 350 kg/hr, 300 kg/hr, 250 kg/hr, 200 kg/hr, 150 kg/hr, 100 kg/hr, 95 kg/hr, 90 kg/hr, 85 kg/hr, 80 kg/hr, 75 kg/hr, 70 kg/hr, 65 kg/hr, 60 kg/hr, 55 kg/hr, 50 kg/hr, 45 kg/hr, 40 kg/hr, 35 kg/hr, 30 kg/hr, 25 kg/hr, 20 kg/hr, 15 kg/hr, 10 kg/hr, 5 kg/hr, 2 kg/hr, 1 kg/hr, 750 g/hr, 500 g/hr, 250 g/hr or 100 g/hr.

The thermal transfer gas may be heated to and/or the feedstock may be subjected to a temperature of greater than or equal to about 1,000° C., 1,100° C., 1,200° C., 1,300° C., 1,400° C., 1,500° C., 1,600° C., 1,700° C., 1,800° C., 1,900° C., 2,000° C., 2050° C., 2,100° C., 2,150° C., 2,200° C., 2,250° C., 2,300° C., 2,350° C., 2,400° C., 2,450° C., 2,500° C., 2,550° C., 2,600° C., 2,650° C., 2,700° C., 2,750° C., 2,800° C., 2,850° C., 2,900° C., 2,950° C., 3,000° C., 3,050° C., 3,100° C., 3,150° C., 3,200° C., 3,250° C., 3,300° C., 3,350° C., 3,400° C. or 3,450° C. Alternatively, or in addition, the thermal transfer gas may be heated to and/or the feedstock may be subjected to a temperature of less than or equal to about 3,500° C., 3,450° C., 3,400° C., 3,350° C., 3,300° C., 3,250° C., 3,200° C., 3,150° C., 3,100° C., 3,050° C., 3,000° C., 2,950° C., 2,900° C., 2,850° C., 2,800° C., 2,750° C., 2,700° C., 2,650° C., 2,600° C., 2,550° C., 2,500° C., 2,450° C., 2,400° C., 2,350° C., 2,300° C., 2,250° C., 2,200° C., 2,150° C., 2,100° C., 2050° C., 2,000° C., 1,900° C., 1,800° C., 1,700° C., 1,600° C., 1,500° C., 1,400° C., 1,300° C., 1,200° C. or 1,100° C. The thermal transfer gas may be heated to such temperatures by a thermal generator (e.g., a plasma generator). The thermal transfer gas may be electrically heated to such temperatures by the thermal generator (e.g., the thermal generator may be driven by electrical energy). Such thermal generators may have suitable powers. The thermal generators may be configured to operate continuously at such powers for, for example, several hundred or several thousand hours in a corrosive environment.

Thermal generators may operate at suitable powers. The power may be, for example, greater than or equal to about 0.5 kilowatt (kW), 1 kW, 1.5 kW, 2 kW, 5 kW, 10 kW, 25 kW, 50 kW, 75 kW, 100 kW, 150 kW, 200 kW, 250 kW, 300 kW, 350 kW, 400 kW, 450 kW, 500 kW, 550 kW, 600 kW, 650 kW, 700 kW, 750 kW, 800 kW, 850 kW, 900 kW, 950 kW, 1 megawatt (MW), 1.05 MW, 1.1 MW, 1.15 MW, 1.2 MW, 1.25 MW, 1.3 MW, 1.35 MW, 1.4 MW, 1.45 MW, 1.5 MW, 1.6 MW, 1.7 MW, 1.8 MW, 1.9 MW, 2 MW, 2.5 MW, 3 MW, 3.5 MW, 4 MW, 4.5 MW, 5 MW, 5.5 MW, 6 MW, 6.5 MW, 7 MW, 7.5 MW, 8 MW, 8.5 MW, 9 MW, 9.5 MW, 10 MW, 10.5 MW, 11 MW, 11.5 MW, 12 MW, 12.5 MW, 13 MW, 13.5 MW, 14 MW, 14.5 MW, 15 MW, 16 MW, 17 MW, 18 MW, 19 MW, 20 MW, 25 MW, 30 MW, 35 MW, 40 MW, 45 MW, 50 MW, 55 MW, 60 MW, 65 MW, 70 MW, 75 MW, 80 MW, 85 MW, 90 MW, 95 MW or 100 MW. Alternatively, or in addition, the power may be, for example, less than or equal to about 100 MW, 95 MW, 90 MW, 85 MW, 80 MW, 75 MW, 70 MW, 65 MW, 60 MW, 55 MW, 50 MW, 45 MW, 40 MW, 35 MW, 30 MW, 25 MW, 20 MW, 19 MW, 18 MW, 17 MW, 16 MW, 15 MW, 14.5 MW, 14 MW, 13.5 MW, 13 MW, 12.5 MW, 12 MW, 11.5 MW, 11 MW, 10.5 MW, 10 MW, 9.5 MW, 9 MW, 8.5 MW, 8 MW, 7.5 MW, 7 MW, 6.5 MW, 6 MW, 5.5 MW, 5 MW, 4.5 MW, 4 MW, 3.5 MW, 3 MW, 2.5 MW, 2 MW, 1.9 MW, 1.8 MW, 1.7 MW, 1.6 MW, 1.5 MW, 1.45 MW, 1.4 MW, 1.35 MW, 1.3 MW, 1.25 MW, 1.2 MW, 1.15 MW, 1.1 MW, 1.05 MW, 1 MW, 950 kW, 900 kW, 850 kW, 800 kW, 750 kW, 700 kW, 650 kW, 600 kW, 550 kW, 500 kW, 450 kW, 400 kW, 350 kW, 300 kW, 250 kW, 200 kW, 150 kW, 100 kW, 75 kW, 50 kW, 25 kW, 10 kW, 5 kW, 2 kW, 1.5 kW or 1 kW.

Carbon particles may be generated at a yield (e.g., yield of carbon particles based upon feedstock conversion rate, based on total hydrocarbon injected, on a weight percent carbon basis, or as measured by moles of product carbon vs. moles of reactant carbon) of, for example, greater than or equal to about 1%, 5%, 10%, 25%, 50%, 55%, 60%, 65%, 70%, 75%, 80%, 85%, 90%, 91%, 92%, 93%, 94%, 95%, 96%, 97%, 98%, 99%, 99.5% or 99.9%. Alternatively, or in addition, the carbon particles may be generated at a yield (e.g., yield of carbon particles based upon feedstock conversion rate, based on total hydrocarbon injected, on a weight percent carbon basis, or as measured by moles of product carbon vs. moles of reactant carbon) of, for example, less than or equal to about 100%, 99.9%, 99.5%, 99%, 98%, 97%, 96%, 95%, 94%, 93%, 92%, 91%, 90%, 85%, 80%, 75%, 70%, 65%, 60%, 55%, 50%, 25% or 5%. In some examples (e.g., in a one-step process), the yield of carbon particles (e.g., carbon nanoparticles) may be at least about 90%. In some examples (e.g., in a one-step process), the yield of carbon particles (e.g., carbon nanoparticles) based upon hydrocarbon feedstock (e.g., methane) conversion rate may be greater than about 94% or 95%. In some examples, more than about 90% of the hydrocarbon feedstock may be converted into carbon particles (e.g., carbon black) on a weight percent carbon basis. In some examples, the yield of carbon particles (e.g., carbon black) based on total hydrocarbon injected into the reactor may be greater than about 80% as measured by moles of product carbon vs. moles of reactant carbon.

Figure 3:
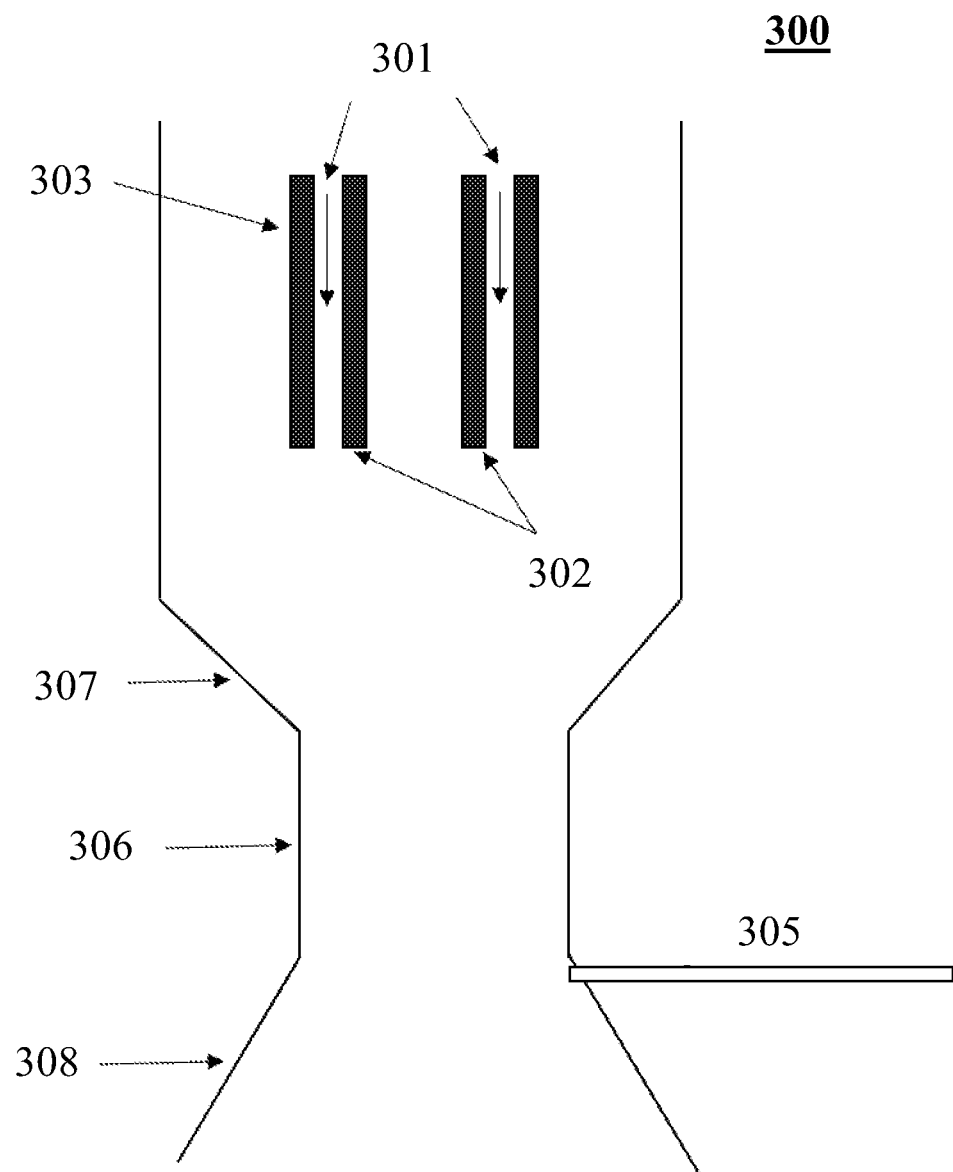
FIG. 3 shows a schematic representation of another example of a reactor/apparatus.
Figure 4:
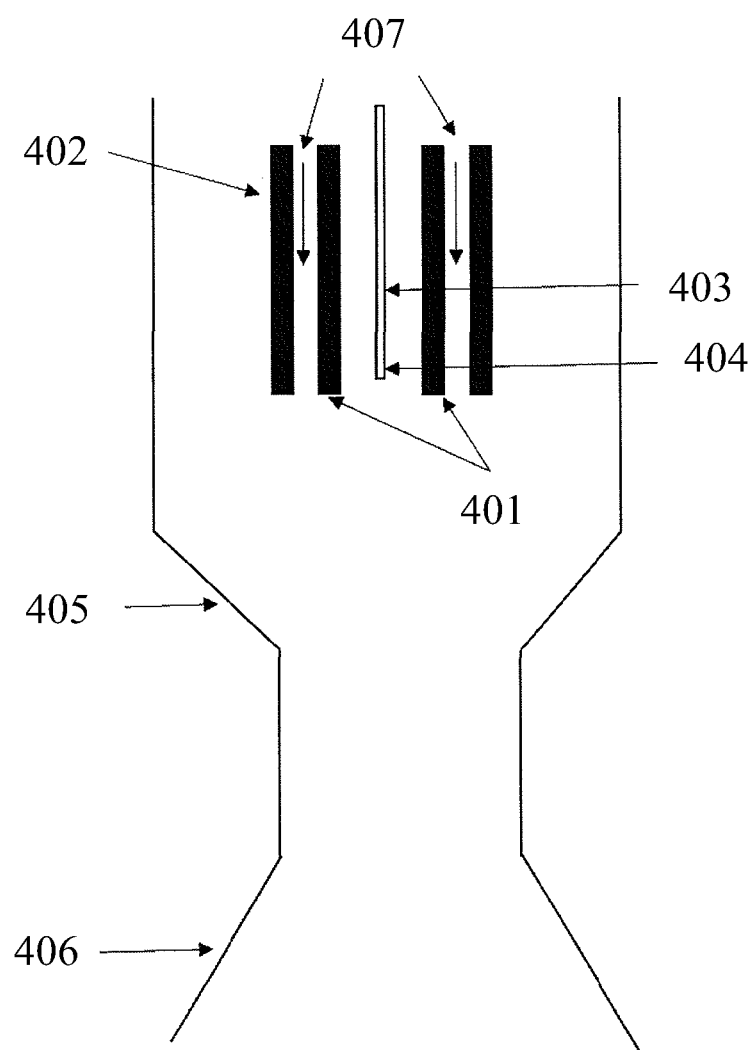
FIG. 4 shows a schematic representation of another example of a reactor/apparatus.

FIG. 2 shows a cross-section of an example of (a part of) a reactor 200. In this example, hot thermal transfer gas 201 may be generated in an upper portion of the reactor through the use of three or more AC electrodes, through the use of concentric DC electrodes (e.g., as shown in FIGS. 3 and 4), or through the use of a resistive or inductive heater. The hot thermal transfer gas may comprise, for example, at least about 50% hydrogen by volume that may be at least about 2,400° C. A hydrocarbon injector 202 may be cooled (e.g., water-cooled). The hydrocarbon injector 202 may enter from the side of the reactor (e.g., as shown, or at a suitable location as described elsewhere herein), and may then optionally turn into an axial position with respect to the thermal transfer gas (hot gas) flow. A hydrocarbon injector tip 203 may comprise or be one opening or a plurality of openings (e.g., that may inject hydrocarbons in clockwise or counter-clockwise flow patterns (e.g., to optimize mixing)). The reactor may comprise converging region(s) 204. The converging region(s) 204 may lead to a narrowing of the reactor. The converging region(s) 204 may lead to a narrowing of the reactor and then and then diverging region(s) 205 downstream of the converging region(s). See, for example, commonly assigned, co-pending Int. Pat. Pub. Nos. WO 2017/044594 ("CIRCULAR FEW LAYER GRAPHENE") and WO 2017/048621 ("CARBON BLACK FROM NATURAL GAS"), each of which is entirely incorporated herein by reference.

FIG. 3 shows a schematic representation of another example of an apparatus 300. A thermal transfer gas (e.g., plasma gas) 301 such as, for example, oxygen, nitrogen, argon, helium, air, hydrogen, carbon monoxide, hydrocarbon (e.g. methane, ethane, unsaturated) etc. (used alone or in mixtures of two or more) may be injected into an annulus created by two electrodes that are positioned in an upper chamber in a concentric fashion. Plasma forming electrodes may comprise an inner electrode 302 and an outer electrode 303. A sufficiently large voltage may be applied between the two electrodes. The electrodes may comprise or be made of copper, tungsten, graphite, molybdenum, silver etc. The thus-formed plasma may enter into a reaction zone where it may react/interact with a hydrocarbon feedstock that is fed at hydrocarbon injector(s) 305 to generate a carbon particle product (e.g., a carbon black product). The walls of the vessel (e.g., comprising or constructed of refractory, graphite, cooled etc.) may withstand the plasma forming temperatures. The hydrocarbon injector(s) 305 may be located anywhere on a plane at or near a throat 306 below a converging region 307 or further downstream of the throat in a diverging region 308 of the reactor. Hydrocarbon injector tips may be arranged, for example, concentrically around the injection plane. There may be at least 6 injectors and up to 18 tips of this sort, or a slot, or a continuous slot, as non-limiting examples.

FIG. 4 shows a schematic representation of another example of an apparatus 400. FIG. 4 shows a two-dimensional cutout of a reactor comprising inner and outer electrodes, 401 and 402, respectively, that consist of concentric rings of electrically conductive material (e.g., graphite). Thermal transfer gas (e.g., plasma gas) 407 may flow through the annulus between the two electrodes where an arc may then excite the gas into the plasma state. The arc may be controlled through the use of a magnetic field which moves the arc in a circular fashion rapidly around the electrode tips. In this example, the hydrocarbon may be injected at a hydrocarbon injector 403 (e.g., at a hydrocarbon injector tip 404) through the center of the concentric electrodes via the hydrocarbon injector 403. In some examples, the hydrocarbon injector 403 may be, for example, water-cooled. The hydrocarbon injector tip may be placed to a point above the bottom plane of the electrodes, or it can be below the plane, or in the same plane (e.g., at the same height as the plane). In some implementations (e.g., optionally), the apparatus may comprise converging region(s) 405 leading to a narrowing of the reactor and then diverging region(s) 406 downstream of the converging region(s).

While the examples of reactors shown in FIGS. 2, 3 and 4 each have a vertical orientation with downward flow, an upward flow or a horizontal reactor orientation may also be used.

Thermal generators (e.g., plasma generators), thermal generation sections (e.g., plasma generating sections), thermal activation sections (e.g., thermal activation chambers such as, for example, plasma chambers), throat and/or injection zones of the present disclosure (or portions thereof) may comprise or be made of, for example, copper, tungsten, graphite, molybdenum, rhenium, boron nitride, nickel, chromium, iron, silver, or alloys thereof.

Systems of the present disclosure may comprise reactor apparatuses. The reactor apparatuses may be as described elsewhere herein (e.g., in relation to FIGS. 2, 3, 4 and 6). Some modifications and/or adjustments to the systems and methods described herein may be necessary to realize some of the particle properties and/or combinations of properties described herein.

A system of the present disclosure may be configured to implement an enclosed process. Such an enclosed particle generating system may include, for example, an enclosed particle generating reactor. The enclosed process may include a thermal generator (e.g., a plasma generator), a reaction chamber, a main filter, and a degas chamber. The enclosed process may include, for example, a thermal generator (e.g., a plasma generator), a reaction chamber, a throat and/or other region (e.g., as described in relation to FIG. 6), a main filter, and a degas chamber. These components may be substantially free of oxygen and other atmospheric gases. The process (or portions thereof) may allow only a given atmosphere. For example, oxygen may be excluded or dosed at a controlled amount of, for example, less than about 5% by volume in the enclosed process. The system (the process) may include one or more of a thermal generator (e.g., a plasma generator), a thermal activation chamber (e.g., a plasma chamber), a throat and/or other region (e.g., as described in relation to FIG. 6), a furnace or reactor, a heat exchanger (e.g., connected to the reactor), a main filter (e.g., connected to the heat exchanger), a degas (e.g., product inerting) apparatus (e.g., chamber) (e.g., connected to the filter), and a back end. The back end may include one or more of a pelletizer (e.g., connected to the degas apparatus), a binder mixing (e.g., binder and water) tank (e.g., connected to the pelletizer), and a dryer (e.g., connected to the pelletizer). As non-limiting examples of other components, a conveying process, a process filter, cyclone, classifier and/or hammer mill may be added (e.g., optionally). Further examples of back end components may be as provided elsewhere herein. See also, for example, U.S. Pat. No. 3,981,659 ("APPARATUS FOR DRYING CARBON BLACK PELLETS"), 3,309,780 ("PROCESS AND APPARATUS FOR DRYING WET PARTICULATE SOLIDS") and U.S. Pat. No. 3,307,923 ("PROCESS AND APPARA- TUS FOR MAKING CARBON BLACK"), each of which is entirely incorporated herein by reference.

FIG. 1 shows an example of a system 100 configured to implement a process of the present disclosure. The system may comprise a thermal activation chamber (e.g., a plasma chamber) 105, a throat and/or other region 110, a reactor 115, a heat exchanger 120, a filter 125, a degas 130, a back end 135, or combinations thereof.

Figure 5:
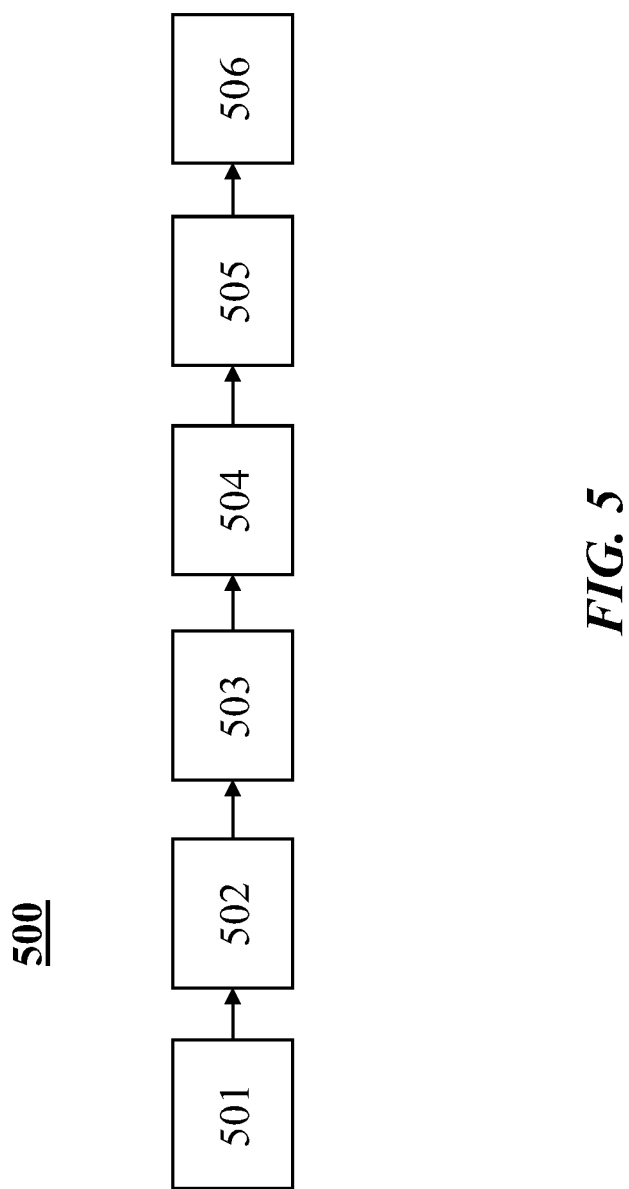
FIG. 5 shows a schematic representation of an example of a process.

FIG. 5 shows an example of a flow chart of a process 500. The process may begin through addition of hydrocarbon to hot gas (e.g., heat+hydrocarbon) 501 (e.g., as described, for example, in relation to the examples of methods of combining the hot gas and the hydrocarbon (e.g., hydrocarbon precursor) in FIGS. 2, 3, 4 and 6). The process may include one or more of the steps of heating the gas (e.g., thermal transfer gas), adding the hydrocarbon to the hot gas (e.g., 501), passing through a reactor 502, and using one or more of a heat exchanger 503, filter 504, degas (e.g., degas chamber) 505 and back end 506. The hot gas may be a stream of hot gas at an average temperature of over about 2,200° C. The hot gas may have a composition as described elsewhere herein (e.g., the hot gas may comprise greater than 50% hydrogen by volume). In some implementations, the process(es) described herein may be substantially free of atmospheric oxygen (also "substantially oxygen-free" herein). The process may include heating a gas (e.g., comprising 50% or greater by volume hydrogen) and then adding this hot gas to a hydrocarbon at 501. Heat may (e.g., also) be provided through latent radiant heat from the wall of the reactor. This may occur through heating of the walls via externally provided energy or through the heating of the walls from the hot gas. The heat may be transferred from the hot gas to the hydrocarbon feedstock. This may occur immediately upon addition of the hydrocarbon feedstock to the hot gas in the reactor or the reaction zone 502. The hydrocarbon may begin to crack and decompose before being fully converted into carbon particles (e.g., carbon black). The degas (e.g., degas unit) 505 may be, for example, as described in commonly assigned, co-pending Int. Pat. Pub. No. WO 2016/126599 ("CARBON BLACK GENERATING SYSTEM"), which is entirely incorporated herein by reference. The back end 506 may include, for example, one or more of a pelletizer, a binder mixing tank (e.g., connected to the pelletizer), and a dryer (e.g., connected to the pelletizer).

In some examples, the systems/processes described herein may comprise a filter at the front end of the reactor or system (e.g., at the reactors 115 and/or 502). The front end filter may remove, for example, sulfur impurities from one or more of the material streams entering the reactor. Such sulfur impurities may comprise, for example, hydrogen sulfide, carbonyl sulfide, sulfur in mercaptans, iron sulfide and/or other sulfur compounds. The filter may remove such impurities using, for example, amine scrubbing and/or other techniques. The filter may remove sulfur impurities from a feedstock stream. The filter may be coupled, for example, to a feedstock injector (e.g., to an inlet of a reactor feedstock injector). The filter may remove, for example, at least about 1%, 2%, 5%, 10%, 15%, 20%, 25%, 30%, 35%, 40%, 45%, 50%, 55%, 60%, 65%, 70%, 75%, 80%, 85%, 90%, 95%, 99%, 99.9% or 100% of the sulfur content (e.g., by mass) present in the material stream (e.g., feedstock stream) prior to the filter. In addition, the filter may in some cases remove at most about 99.9%, 99%, 95%, 90%, 85%, 80%, 75%, 70%, 65%, 60%, 55%, 50%, 45%, 40%, 35%, 30%, 25%, 20%, 15%, 10% or 5% of the sulfur content (e.g., by mass) present in the feedstock stream prior to the filter. After passing through the filter, the material stream (e.g., feedstock) may comprise, for example, less than or equal to about 5%, 2%, 1%, 0.75%, 0.5%, 0.4%, 0.3%, 0.2%, 0.1%, 0.09%, 0.08%, 0.07%, 0.06%, 0.05%, 0.04%, 0.03%, 0.02%, 0.01%, 50 ppm, 45 ppm, 40 ppm, 35 ppm, 30 ppm, 25 ppm, 20 ppm, 15 ppm, 10 ppm, 5 ppm, 1 ppm, 0.5 ppm or 0.1 ppm sulfur (e.g., by weight). Alternatively, or in addition, after passing through the filter, the material stream (e.g., feedstock) may comprise, for example, greater than or equal to about 0 ppm, 0.1 ppm, 0.5 ppm, 1 ppm, 5 ppm, 10 ppm, 15 ppm, 20 ppm, 25 ppm, 30 ppm, 35 ppm, 40 ppm, 45 ppm, 50 ppm, 0.01%, 0.02%, 0.03%, 0.04%, 0.05%, 0.06%, 0.07%, 0.08%, 0.09%, 0.1%, 0.2%, 0.3%, 0.4%, 0.5%, 0.75%, 1% or 2% sulfur (e.g., by weight). The systems/processes described herein may be used to produce particles with elemental sulfur contents as described elsewhere herein. In some examples, the systems/processes described herein may be used to produce particles with elemental sulfur contents less than or equal to about 5 ppm or 1 ppm.

The reaction products may be cooled after manufacture. A quench may be used to cool the reaction products. For example, a quench comprising a majority of hydrogen gas may be used. The quench may be injected in the reactor portion of the process. A heat exchanger may be used to cool the process gases. In the heat exchanger, the process gases may be exposed to a large amount of surface area and thus allowed to cool, while the product stream may be simultaneously transported through the process. The heat exchanger in the reactor in the processes of the present disclosure may be more efficient than, for example, in the furnace process (e.g., due to the elevated temperatures in the processes described herein). The heat exchanger (e.g., heat exchanger 120) may be configured, for example, as described in Int. Pat. Pub. Nos. WO 2016/126599 ("CARBON BLACK GENERATING SYSTEM") and WO 2017/034980 ("HIGH TEMPERATURE HEAT INTEGRATION METHOD OF MAKING CARBON BLACK"), each of which is entirely incorporated herein by reference. For a given configuration, energy removed may depend, for example, on operating conditions and/or grade.

The carbon particles (e.g., carbon black particles) may be produced in an admixture of/with an effluent stream of hot gas which exits the reactor into contact with a heat exchanger. The heat exchanger may reduce the thermal energy of the effluent stream of gases and carbon particles (e.g., carbon black particles) by greater than about 5000 kilojoules/kilogram (kJ/kg) of carbon particles (e.g., carbon black particles). The effluent stream of gases and carbon particles (e.g., carbon black particles) may be (e.g., subsequently) passed through a filter which allows more than 50% of the gas to pass through, capturing substantially all of the carbon particles (e.g., carbon black particles) on the filter. At least about 98% by weight of the carbon particles (e.g., carbon black particles) may be captured on the filter.

The carbon particles (e.g., carbon black particles) may be produced in an admixture of an effluent stream of hot gas containing combustible gas which exits the reactor into contact with a heat exchanger. The effluent stream of hot gas containing combustible gas may be (e.g., subsequently) passed through a filter, capturing substantially all of the carbon particles (e.g., carbon black particles) on the filter. The gas may (e.g., subsequently) pass through a degas apparatus where the amount of combustible gas is reduced to less than about 10% by volume. The combustible gas may comprise or be hydrogen.

The carbon particles (e.g., carbon black particles) may be produced in an admixture of an effluent stream of hot gas containing combustible gas which exits the reactor into contact with a heat exchanger. The admixture may be (e.g., subsequently) passed through a filter, capturing substantially all of the carbon particles (e.g., carbon black particles) on the filter. The carbon particles (e.g., carbon black) with residual gas may (e.g., subsequently) pass through a degas apparatus where the amount of combustible gas is reduced to less than about 10% by volume. The carbon particles (e.g., carbon black particles) may be (e.g., subsequently) mixed with water with a binder and then formed into pellets, followed by removal of the majority of the water in a dryer.

Hydrogen and/or other combustible gases may be separated (e.g., in the degas 130) from the pores and/or interstitial spaces of a carbon particle and/or carbon particle agglomerate (e.g., carbon black agglomerate) production stream (e.g., formed in a plasma torch reactor system, or other system for making carbon particles that results in the gases made in forming the carbon particles containing more than about 40% combustible gases). Such processes may produce carbon (e.g., black) that may be filtered or otherwise separated from the bulk of the tail gas, leaving the pores and/or interstitial spaces of the particles and/or agglomerates full of combustible gases (e.g., presenting a significant safety hazard to downstream atmospheric equipment). Such combustible gases may be removed from the pores and/or interstitial spaces of the carbon (e.g., black) particles and/or agglomerates (e.g., to protect the downstream equipment that processes the carbon (e.g., black) in air or air mixtures).

A one-step process may contain the reactants and products up until a degas step has been completed to remove the combustible gas(es) (e.g., hydrogen) produced from the cracking of the hydrocarbon feedstock (e.g., methane). Hydrogen, a highly combustible gas, may be separated from the as-produced carbon particles (e.g., carbon nanoparticles) in order to manipulate the carbon nanoparticles. A degas may be considered to be complete, for example, if the hydrogen level has been reduced to less than, for example, 20 percent by volume.

The carbon particles and/or agglomerates (e.g., carbon black) produced may contain a high concentration of combustible gases in its pores and/or interstitial spaces, which may be subsequently removed by replacement with, for example, inert gas (e.g., thereby rendering the carbon particles (e.g., carbon black) safe to process in downstream equipment). The inert gas may be, for example, nitrogen, a noble gas, steam or carbon dioxide. The inert gas may be a mixture of two or more of noble gases, nitrogen, steam, and/or carbon dioxide. Removing the combustible gases (e.g., hydrogen) from the carbon particles (e.g., the carbon black), particularly the small amount that remains in the pores and/or interstitial spaces and structure of the carbon particles and/or agglomerates (e.g., carbon black) after it has been bulk separated in a cyclone, bag house or other primary separation device, may be challenging. The concentration of combustible gases may be greater than about 30% by volume on a dry basis.

The combustible gases may be removed from the pores and/or interstitial spaces of the particles and/or particle agglomerates (e.g., black agglomerates) by, for example, varying the pressure or temperature, or discharging the carbon particles (e.g., carbon black) produced into an upward flowing stream of inert gas. The carbon particles (e.g., carbon black) produced may be discharged into an upward flowing stream of inert gas causing the combustible gases (e.g., hydrogen) contained in the pores and/or interstitial spaces (e.g., of the particle and/or agglomerate) to diffuse into the inert gas. The combustible gases (e.g., hydrogen) entrapped within the pores and/or interstitial spaces of the carbon particles and/or carbon particle (e.g., carbon black) agglomerates (e.g., produced in a plasma torch system and/or other high intensity system for making carbon particles) may be recovered by counter-current flow of inert gas (e.g., nitrogen). In some examples, the counter-current configuration may set up an upward flowing inert gas that the carbon particles (e.g., carbon black) fall(s) through. When discharging the carbon particles (e.g., carbon black) from the main unit filter (e.g., the filter 125), the carbon particles (e.g., carbon black) may be sent into an upward flowing stream of inert gas. As the carbon particles (e.g., carbon black) fall(s) down through the inert gas, the hydrogen may diffuse out of the pores and/or interstitial spaces of the particle and/or agglomerate into the inert gas. The buoyancy of the hydrogen and other combustible gases may assist with this process. In some examples, the counter-current configuration may result in the least use of inert gas (e.g., nitrogen), the highest concentration of combustible gases in the evolved gas stream from the process and the process being completed continuously. Changes in absolute pressure may be used to replace the combustible gases with inert gas. The combustible gas(es) (e.g., hydrogen) may be removed by pressure swing with nitrogen or another inert gas so that each change in pressure (e.g., from multiple atmospheres down to a lower pressure or even a vacuum) may displace at least a portion of the combustible gas(es) with an inert gas. Pressure swing degassing may require a pressure vessel to contain the change in pressure necessary for the use of a pressure swing. Pressure swing degassing may require a pressure vessel if the pressure swing uses a vacuum instead of or supplemental to the pressure swing. While discontinuous, such pressure swings may take place over a short period of time and so result in inertion of the product in a relatively short period of time. The inert gas used to vary the pressure or provide the upward flowing inert gas may be, for example, nitrogen, a noble gas (helium, neon, argon, krypton, xenon etc.), or any combination thereof. The combustible gases may be removed by changes in temperature (e.g., temperature swings). Temperature swings may (e.g., also) effectively displace the pore and/or interstitial combustible gases, but may take longer than pressure swings or counter-current methods. The combustible gas(es) (e.g., hydrogen) may be removed by just leaving the product in filters overnight so that the combustible gas(es) (e.g., hydrogen) diffuse(s) out over time. The combustible gas(es) may be removed by flowing gas through a mass of particles (e.g., carbon black), or through fluidized particles (e.g., fluidized carbon particles (e.g., carbon black), such as, for example, a fluid bed of carbon particles (e.g., carbon black)). The combustible gas(es) may be removed by dilution with an inert gas (e.g., argon). Inertion may refer to the removal of combustible gases to a safe level (e.g., where an explosion cannot take place). Inertion may refer to creating an inert environment. In some examples, removing the combustible gas(es) may refer to reducing the combustible gas(es) (e.g., to an acceptable volume percentage).

The back end of the reactor (e.g., the back end 135) may comprise a pelletizer, a dryer and/or a bagger as non-limiting example(s) of components. More components or fewer components may be added or removed. For instance, examples of a pelletizer may be found in U.S. Pat. Pub. No. 2012/0292794 ("PROCESS FOR THE PREPARATION OF CARBON BLACK PELLETS"), which is entirely incorporated herein by reference. For the pelletizer, water, binder and carbon particles (e.g., carbon black) may be added together in a pin type pelletizer, processed through the pelletizer, and then dried. The binder:carbon particle (e.g., binder:carbon black) ratio may be less than about 0.1:1 and the water:carbon particle (e.g., water:carbon black) ratio may be within the range from about 0.1:1 to about 3:1. The binder may be, for example, as described elsewhere herein (e.g., ash free binder). The carbon particles (e.g., black) may also pass through classifiers, hammer mills and/or other size reduction equipment (e.g., so as to reduce the proportion of grit in the product). In an example, energy flow may be about 3500 kJ/kg for carbon particles (e.g., a black) requiring about 1.2 kg water/kg carbon particles (e.g., carbon black) (e.g., 120 DBP). Lower DBP carbon particles (e.g., blacks) may use less water to make acceptable quality pellets and so may need less heat. The pelletizing medium (e.g., water) may be heated (e.g., so that the carbon (e.g., black) goes in to the dryer at a higher temperature). Alternatively, the process may use a dry pelletisation process in which a rotating drum densifies the product. For some uses, unpelletized carbon particles (e.g., unpelletized black), so called fluffy carbon particles (e.g., fluffy black), or pelletized carbon particles (e.g., pelletized black) that have been ground back to a fluffy state, may also be acceptable.

The pelletizer may use an oil pelletization process. An example of the oil pelletization process may be found in U.S. Pat. No. 8,323,793 ("PELLETIZATION OF PYROLYZED RUBBER PRODUCTS"), which is entirely incorporated herein by reference. Oil pelletization may advantageously be used to produce the low ash/low grit carbon particles described in greater detail elsewhere herein (e.g., carbon particles with less than about 0.05% ash and/or less than about 5 ppm grit (e.g., 325 mesh)). Oil pelletization may not add any ash to the carbon particles. A binder oil (e.g., at least one of a highly aromatic oil, a naphthenic oil, and a paraffinic oil) and carbon particles may be added to together in the pelletizer. The binder oil may be added into a mixer (e.g., in an amount of up to about 15 percent by weight binder oil) with the carbon particles to form pelletized carbon particles (e.g., a pelletized carbon black). Alternatively, distilled water and ash free binder, such as sugar, may be used to produce the low ash/low grit carbon particles described in greater detail elsewhere herein (e.g., carbon particles with less than about 0.05% ash and/or less than about 5 ppm grit (e.g., 325 mesh)). Pelletization with distilled water and ash free binder, such as sugar, may not add any ash to the carbon particles. Other examples of ash free binder may include, but are not limited to, polyethylene glycol, and/or polyoxyethylene (e.g., polymers of ethylene oxide such as, for example, TWEEN® 80 and/or TWEEN® 20 materials).

The dryer may be, for example, an indirect (e.g., indirect fired or otherwise heated, such as, for example, by heat exchange with one or more fluids of the system in lieu of combustion) rotary dryer. The dryer may use one or more of air, process gas and purge gas to heat the (e.g., pelletized) carbon particles. In some examples, only purge gas may be used. In some examples, air, with or without purge gas, may be used. In some examples, process gas, with or without purge gas, may be used. In some examples, air and process gas, with or without purge gas, may be used. The dryer may be configured for co-current or counter-current operation (e.g., with a purge gas).

The dryer may be, for example, an indirect fired rotary dryer with co-current purge gas (direct gas addition to the dryer). The purge gas may be provided to the dryer in co-current with hot air. The wet carbon particles (e.g., black) may be dried without being exposed to the full oxygen content of the hot air (e.g., since such exposure may result in a fire). Providing the purge gas and hot air to the dryer in co-current may limit the maximum temperature of the exterior of the carbon particles (e.g., black), which may otherwise get too hot while the interior is wet. Counter-current operation of the dryer may in some cases be more energy and capacity efficient. Adding air to the barrel may make the dryer more thermally efficient and may also result in higher capacity. However, if dryer barrel velocity gets too high, it may sweep the pellets out of the dryer and so result in high recycle to the purge filter, and back to the pelletizer (e.g., thereby reducing efficiency and capacity). It may also add too much oxygen to the surface of the carbon particles (e.g., black). The addition of spent (e.g., cooler) air to the dryer barrel may be limited (e.g., so as to provide limited oxidation in a substantially steam atmosphere). After giving up heat to the dryer, the air may still contain a lot of energy. In some examples, the air may be at a temperature of the order of about 350° C. This gas may get directed, for example, to a boiler (e.g., for energy efficiency purposes). As described elsewhere herein, process gas (e.g., from the degas unit) may be used to dry the particles (e.g., in combination with air and/or purge gas). For example, the process gas may be used to dry the particles in lieu of the hot air (e.g., in co-current with purge gas) or in combination with the hot air.

The carbon particles (e.g., carbon black) may be dried to a temperature from about 150° C. to about 400° C. In some examples, the carbon particles (e.g., carbon black) may be dried to at least about 250° C. (e.g., to ensure the center is dry). The atmosphere in the dryer may be controlled. The atmosphere in the dryer may be controlled, for example, to affect oxidation at the surface of the carbon particles (e.g., carbon black) or to maintain the pristine "dead" surface of the carbon particles (e.g., black). The "dead" surface may be characterized as not having a substantial amount of water uptake when exposed to a range of relative humidity (RH) conditions (e.g., from about 0% to about 80% RH). As described in greater detail elsewhere herein, carbon particles (e.g., carbon black) from the processes of the present disclosure may be pristine as made (e.g., surface functional groups may not form, and the material may have a "dead" surface) and may contain, for example, less than about 0.2% by weight oxygen (e.g., there may be no surface oxygen functional groups in the final product). An oxidizing (e.g., not oxygen-free) atmosphere may comprise, for example, greater than about 5% or 10% oxygen by volume. For a small amount of oxidation the atmosphere may be controlled, for example, from about 1% to about 10% oxygen by volume. Therefore, the carbon particles (e.g., carbon black) of the present disclosure may have added capability and tailorability compared to process(es) in which the particles as made are not pristine (e.g., compared to furnace black, which, while it can be further oxidized in this step, it cannot be made more pristine in the dryer, as the temperatures required to remove the native oxygen from the surface of carbon black are greater than 700° C.). Alternatively, or in addition, the systems and methods described herein may be adapted to control and/or modify (e.g., impart a degree and/or density of functionalization onto carbon particles such as, for example, carbon black particles) the surface chemistry (e.g., surface composition, WSP, amount or density of surface functional groups, etc.) of the carbon particles (e.g., carbon black) as described, for example, in commonly assigned, co-pending Int. Pat. Pub. No. WO 2017/027385 ("METHOD OF MAKING CARBON BLACK"), which is entirely incorporated herein by reference.

The present disclosure may provide extreme high purity product (e.g., the processes described herein may provide products with low contamination and/or impurities, such as, for example, with the surface and bulk of the particles without high amounts of sulfur, oxygen, transition metal and/or refractory furnace (e.g., e.g., silica, alumina) impurities in the final product). An even more pure product may be made at scale through the careful consideration of all materials of construction (e.g., an even more pure product may be achieved at scale through the use of natural gas as described herein in combination with careful manipulation of materials of construction), such as, for example, replacing given parts made from or comprising carbon steel with parts made from or comprising stainless steel, lining ceramic parts with high abrasion ceramic, lining specific areas with carbonaceous material(s) (e.g., hardened epoxy, graphite and/or other such non-porous materials that do not contribute to impurities in the product), replacing hardened stainless steel with tungsten carbide and/or other suitable material, etc.

EXAMPLES

Example 1

Carbon particles are manufactured using a setup similar to that shown in FIG. 4 where a hydrocarbon injector is inserted into the center of two concentric electrodes. The injector tip is 14 inches above the plane of the electrodes and the electrodes are operating at 650 kW. The hydrogen flow rate in the annulus between the electrodes is 90 Nm$^3$/hr (normal cubic meters/hour) and the shield flow around the outside of the electrodes is 242 Nm$^3$/hr. Natural gas is injected at a rate of 88 kg/hour. Yield of carbon nanoparticles based upon methane conversion rate is greater than 95%.

A sample of the carbon particles (e.g., carbon nanoparticles) in this example has N2SA of 24.5 m$^2$/g, STSA of 26.5 m$^2$/g, DBP of 70 ml/100 g, $L_c$ of 6.8 nm, d002 of 0.347 nm, S content of 0.13 (percent of total sample), H content of 0.09 (percent of total sample), N content of 0.16 (percent of total sample) and O content of 0.16 (percent of total sample). A sample of a reference carbon black (e.g., furnace black counterpart) has N2SA of 26.2 m$^2$/g, STSA of 25.6 m$^2$/g, DBP of 65 ml/100 g, $L_c$ of 2.6 nm, d002 of 0.358 nm, S content of 1.57 (percent of total sample), H content of 0.26 (percent of total sample), N content of 0.08 (percent of total sample) and O content of 0.52 (percent of total sample).

Example 2

Carbon particles are manufactured using a setup similar to that shown in FIG. 4 where a hydrocarbon injector is inserted into the center of two concentric electrodes. The injector tip is 14 inches above the plane of the electrodes and the electrodes are operating at 850 kW. The hydrogen flow rate in the annulus between the electrodes is 235 Nm$^3$/hr (normal cubic meters/hour) and the shield flow around the outside of the electrodes is 192 Nm$^3$/hr. Natural gas is injected at a rate of 103 kg/hour. Yield of carbon nanoparticles based upon methane conversion rate is greater than 94%.

A sample of the carbon particles (e.g., carbon nanoparticles) in this example has N2SA of 45.6 m$^2$/g, STSA of 48.8 m$^2$/g, DBP of 135 ml/100 g, $L_c$ of 6.9 nm, d002 of 0.346 nm, S content of 0.15 (percent of total sample), H content of 0.09 (percent of total sample), N content of 0.2 (percent of total sample) and O content of 0.11 (percent of total sample). A sample of a reference carbon black (e.g., furnace black counterpart) has N2SA of 38.8 m$^2$/g, STSA of 38.4 m$^2$/g, DBP of 120 ml/100 g, $L_c$ of 2.5 nm, d002 of 0.359 nm, S content of 2.10 (percent of total sample), H content of 0.27 (percent of total sample), N content of 0.12 (percent of total sample) and O content of 0.87 (percent of total sample).

Systems and methods of the present disclosure may be combined with or modified by other systems and/or methods, such as chemical processing and heating methods, chemical processing systems, reactors and plasma torches described in U.S. Pat. Pub. No. US 2015/0210856 and Int. Pat. Pub. No. WO 2015/116807 ("SYSTEM FOR HIGH TEMPERATURE CHEMICAL PROCESSING"), U.S. Pat. Pub. No. US 2015/0211378 ("INTEGRATION OF PLASMA AND HYDROGEN PROCESS WITH COMBINED CYCLE POWER PLANT, SIMPLE CYCLE POWER PLANT AND STEAM REFORMERS"), Int. Pat. Pub. No. WO 2015/116797 ("INTEGRATION OF PLASMA AND HYDROGEN PROCESS WITH COMBINED CYCLE POWER PLANT AND STEAM REFORMERS"), U.S. Pat. Pub. No. US 2015/0210857 and Int. Pat. Pub. No. WO 2015/116798 ("USE OF FEEDSTOCK IN CARBON BLACK PLASMA PROCESS"), U.S. Pat. Pub. No. US 2015/0210858 and Int. Pat. Pub. No. WO 2015/116800 ("PLASMA GAS THROAT ASSEMBLY AND METHOD"), U.S. Pat. Pub. No. US 2015/0218383 and Int. Pat. Pub. No. WO 2015/116811 ("PLASMA REACTOR"), U.S. Pat. Pub. No. US2015/0223314 and Int. Pat. Pub. No. WO 2015/116943 ("PLASMA TORCH DESIGN"), Int. Pat. Pub. No. WO 2016/126598 ("CARBON BLACK COMBUSTIBLE GAS SEPARATION"), Int. Pat. Pub. No. WO 2016/126599 ("CARBON BLACK GENERATING SYSTEM"), Int. Pat. Pub. No. WO 2016/126600 ("REGENERATIVE COOLING METHOD AND APPARATUS"), U.S. Pat. Pub. No. US 2017/0034898 and Int. Pat. Pub. No. WO 2017/019683 ("DC PLASMA TORCH ELECTRICAL POWER DESIGN METHOD AND APPARATUS"), U.S. Pat. Pub. No. US 2017/0037253 and Int. Pat. Pub. No. WO 2017/027385 ("METHOD OF MAKING CARBON BLACK"), U.S. Pat. Pub. No. US 2017/0058128 and Int. Pat. Pub. No. WO 2017/034980 ("HIGH TEMPERATURE HEAT INTEGRATION METHOD OF MAKING CARBON BLACK"), U.S. Pat. Pub. No. US 2017/0066923 and Int. Pat. Pub. No. WO 2017/044594 ("CIRCULAR FEW LAYER GRAPHENE"), U.S. Pat. Pub. No. US20170073522 and Int. Pat. Pub. No. WO 2017/048621 ("CARBON BLACK FROM NATURAL GAS"), U.S. Pat. No. 1,339,225 ("PROCESS OF MANUFACTURING GASEOUS FUEL"), U.S. Pat. No. 7,462,343 ("MICRO-DOMAIN GRAPHITIC MATERIALS AND METHOD FOR PRODUCING THE SAME"), U.S. Pat. No. 6,068,827 ("DECOMPOSITION OF HYDROCARBON TO CARBON BLACK"), U.S. Pat. No. 7,452,514 ("DEVICE AND METHOD FOR CONVERTING CARBON CONTAINING FEEDSTOCK INTO CARBON CONTAINING MATERIALS, HAVING A DEFINED NANOSTRUCTURE"), U.S. Pat. No. 2,062,358 ("CARBON BLACK MANUFACTURE"), U.S. Pat. No. 4,199,545 ("FLUID-WALL REACTOR FOR HIGH TEMPERATURE CHEMICAL REACTION PROCESSES"), U.S. Pat. No. 5,206,880 ("FURNACE HAVING TUBES FOR CRACKING HYDROCARBONS"), U.S. Pat. No. 4,864,096 ("TRANSFER ARC TORCH AND REACTOR VESSEL"), U.S. Pat. No. 8,443,741 ("WASTE TREATMENT PROCESS AND APPARATUS"), U.S. Pat. No. 3,344,051 ("METHOD FOR THE PRODUCTION OF CARBON BLACK IN A HIGH INTENSITY ARC"), U.S. Pat. No. 2,951,143 ("ARC TORCH"), U.S. Pat. No. 5,989,512

("METHOD AND DEVICE FOR THE PYROLYTIC DECOMPOSITION OF HYDROCARBONS"), U.S. Pat. No. 3,981,659 ("APPARATUS FOR DRYING CARBON BLACK PELLETS"), U.S. Pat. No. 3,309,780 ("PROCESS AND APPARATUS FOR DRYING WET PARTICULATE SOLIDS"), U.S. Pat. No. 3,307,923 ("PROCESS AND APPARATUS FOR MAKING CARBON BLACK"), U.S. Pat. No. 8,501,148 ("COATING COMPOSITION INCORPORATING A LOW STRUCTURE CARBON BLACK AND DEVICES FORMED THEREWITH"), PCT Pat. Pub. No. WO 2013/185219 ("PROCESSES FOR PRODUCING CARBON BLACK"), U.S. Pat. No. 8,486,364 ("PRODUCTION OF GRAPHENIC CARBON PARTICLES UTILIZING METHANE PRECURSOR MATERIAL"), Chinese Pat. Pub. No. CN103160149 ("CARBON BLACK REACTION FURNACE AND CARBON BLACK PRODUCTION METHOD"), U.S. Pat. Pub. No. 2012/0292794 ("PROCESS FOR THE PREPARATION OF CARBON BLACK PELLETS"), U.S. Pat. Pub. No. 2005/0230240 ("METHOD AND APPARATUS FOR CARBON ALLOTROPES SYNTHESIS"), UK Pat. Pub. No. GB1400266 ("METHOD OF PRODUCING CARBON BLACK BY PYROLYSIS OF HYDROCARBON STOCK MATERIALS IN PLASMA"), U.S. Pat. No. 8,771,386 ("IN-SITU GASIFICATION OF SOOT CONTAINED IN EXOTHERMICALLY GENERATED SYNGAS STREAM"), and U.S. Pat. No. 8,323,793 ("PELLETIZATION OF PYROLYZED RUBBER PRODUCTS"), each of which is entirely incorporated herein by reference.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. Carbon particles, having (i) a surface area from about 15 m²/g (square meters per gram) to about 300 m²/g, (ii) an $L_c$ greater than 3.0 nm, d002 less than 0.35 nm, less than 0.3% sulfur, or any combination thereof, and (iii) a purity of less than 0.05% ash, less than 5 ppm 325 mesh grit, or a combination thereof.

2. The carbon particles of claim 1, wherein the carbon particles comprise carbon black particles.

3. The carbon particles of claim 1, wherein a transmission of toluene extract (tote) of the carbon particles is greater than or equal to 99%.

4. The carbon particles of claim 1, wherein the carbon particles comprise less than or equal to 0.03% ash.

5. The carbon particles of claim 1, wherein the carbon particles comprise less than or equal to 1 ppm 325 mesh grit.

6. The carbon particles of claim 1, wherein the carbon particles comprise less than or equal to 0.4% oxygen.

7. The carbon particles of claim 1, wherein the carbon particles comprise greater than or equal to 99% carbon.

8. The carbon particles of claim 1, wherein the carbon particles comprise less than 0.4% hydrogen.

9. The carbon particles of claim 1, wherein the carbon particles have an affinity to adsorb water from an 80% relative humidity atmosphere of less than 0.5 milliliters (mL) of water per square meter of surface area of the carbon particles.

10. The carbon particles of claim 1, wherein the carbon particles have a total surface acid group content of less than or equal to 0.5 µmol/m².

11. The carbon particles of claim 1, wherein the carbon particles have a dibutyl phthalate (DBP) absorption that is less than or equal to 1.3 times greater than a compressed dibutyl phthalate (CDBP) absorption of the carbon particle.

12. A carbon particle, having (i) a nitrogen surface area (N2SA) greater than or equal to 15 square meters per gram (m²/g) and (ii) less than 5 ppm sulfur.

13. The carbon particle of claim 12, wherein the carbon particle comprises less than 1 ppm sulfur by weight.

14. The carbon particle of claim 12, wherein the N2SA is less than or equal to 300 m²/g.

15. The carbon particle of claim 12, wherein the N2SA is greater than or equal to 20 m²/g.

16. The carbon particle of claim 12, wherein the carbon particle comprises less than or equal to 0.4% oxygen, greater than or equal to 99% carbon, less than or equal to 0.4% hydrogen, or any combination thereof.

17. The carbon particle of claim 16, wherein the carbon particle comprises less than or equal to 0.4% oxygen.

18. The carbon particle of claim 16, wherein the carbon particle comprises less than or equal to 0.4% hydrogen.

19. The carbon particle of claim 16, wherein the carbon particle comprises greater than or equal to 99% carbon.

20. The carbon particle of claim 12, wherein a transmission of toluene extract (tote) of the carbon particles is greater than or equal to 99%.

21. The carbon particle of claim 12, wherein the carbon particle has a total surface acid group content of less than or equal to 0.5 µmol/m².

22. The carbon particle of claim 12, wherein the carbon particle has a dibutyl phthalate (DBP) absorption that is less than or equal to 1.3 times greater than a compressed dibutyl phthalate (CDBP) absorption of the carbon particle.

* * * * *